(12) United States Patent
Chan et al.

(10) Patent No.: US 11,915,238 B2
(45) Date of Patent: Feb. 27, 2024

(54) BLOCKCHAIN-IMPLEMENTED SYSTEMS AND METHODS FOR CONCURRENT BYTECODE INTERPRETATION

(71) Applicant: nChain Licensing AG, Zug (CH)

(72) Inventors: Ying Chan, Cambridge (GB); Dean Kramer, London (GB)

(73) Assignee: nChain Licensing AG, Zug (CH)

( * ) Notice: Subject to any disclaimer, the term of this patent is extended or adjusted under 35 U.S.C. 154(b) by 247 days.

(21) Appl. No.: 16/772,145

(22) PCT Filed: Dec. 7, 2018

(86) PCT No.: PCT/IB2018/059757
§ 371 (c)(1),
(2) Date: Jun. 11, 2020

(87) PCT Pub. No.: WO2019/116184
PCT Pub. Date: Jun. 20, 2019

(65) Prior Publication Data
US 2021/0073811 A1 Mar. 11, 2021

(30) Foreign Application Priority Data
Dec. 13, 2017 (GB) .................................... 1720767

(51) Int. Cl.
*G06Q 20/40* (2012.01)
*G06Q 20/06* (2012.01)
*H04L 9/32* (2006.01)

(52) U.S. Cl.
CPC ....... *G06Q 20/401* (2013.01); *G06Q 20/0658* (2013.01); *G06Q 20/405* (2013.01); *H04L 9/32* (2013.01)

(58) Field of Classification Search
CPC ............. G06Q 20/401; G06Q 20/0658; G06Q 20/405; H04L 9/32
See application file for complete search history.

(56) References Cited

U.S. PATENT DOCUMENTS

2016/0260171 A1 9/2016 Ford et al.
2017/0115976 A1 4/2017 Mills
(Continued)

FOREIGN PATENT DOCUMENTS

CN 106548330 A 3/2017
CN 106598579 A 4/2017
(Continued)

OTHER PUBLICATIONS

Dickerson et al., "adding Concurrency to Smart Contracts," Feb. 15, 2017, 18 pages. (Year: 2017).*
(Continued)

*Primary Examiner* — Eric T Wong
(74) *Attorney, Agent, or Firm* — Davis Wright Tremaine LLP

(57) ABSTRACT

Computer implemented methods are provided that create and/or validate a spending blockchain transaction that includes i) a plurality of locking scripts each representing an instance of an execution thread (which can be execution threads that are forked from an execution thread represented by a locking script of a previous blockchain transaction and/or execution threads of at least one previous blockchain transaction that are managed and/or controlled for inter-thread communication and control) or ii) a locking script representing an instance of an execution thread joined from a plurality of execution threads represented at least one previous blockchain transaction. Once created and/or validated, the spending blockchain transaction can be communicated on a blockchain network for storage in a blockchain ledger. The blockchain transactions can implement thread-specific locking scripts and associated fork, join and barrier constructs for concurrent or asynchronous threads of execution. The transactions can be validated and stored in a (Continued)

blockchain ledger. The blockchain transactions can be used as part of a smart contract.

17 Claims, 17 Drawing Sheets

(56) References Cited

U.S. PATENT DOCUMENTS

| | | | |
|---|---|---|---|
| 2017/0180469 A1 | 6/2017 | Ford et al. | |
| 2017/0212781 A1* | 7/2017 | Dillenberger | G06F 9/5038 |
| 2017/0344988 A1 | 11/2017 | Cusden et al. | |
| 2017/0345011 A1 | 11/2017 | Salami et al. | |
| 2018/0089041 A1* | 3/2018 | Smith | H04L 9/3239 |
| 2019/0087793 A1* | 3/2019 | Dickerson | G06Q 20/0655 |

FOREIGN PATENT DOCUMENTS

| | | |
|---|---|---|
| JP | 2001092647 A | 4/2001 |
| WO | 2017139688 A1 | 8/2017 |
| WO | 2017145007 A1 | 8/2017 |
| WO | 2017145019 A1 | 8/2017 |
| WO | 2017148527 A1 | 9/2017 |
| WO | 2017161417 A1 | 9/2017 |
| WO | 2017173399 A1 | 10/2017 |

OTHER PUBLICATIONS

Antonopoulos, "Mastering Bitcoin—Unlocking Digital Cryptocurrencies," O'Reilly Media, Inc., Dec. 20, 2014, 282 pages. (Year: 2014).*
Antonopoulos, "Mastering Bitcoin—Unlocking Digital Cryptocurrencies," O'Reilly Media, Inc., Dec. 20, 2014, 282 pages.
CryptoKernel History, "History of CryptoKernel," retrieved from https://github.com/mitdci/CryptoKernel/commits/master/src/kernel/contract.h, Jul. 24, 2017, 2 pages.
CryptoKernel, "CryptoKernel C++ Library," retrieved from https://github.com/mit-dci/CryptoKernel/blob/master/src/kernel/contract.h, Jul. 24, 2017, 2 pages.
Dai et al., "Smart-Contract Value-Transfer Protocols on a Distributed Mobile Application Platform," retrieved from https://qtum.org/uploads/files/a2772efe4dc8ed1100319c6480195fb1.pdf, Mar. 2017, 27 pages.
Dickerson et al., "Adding Concurrency to Smart Contracts," Feb. 15, 2017, 18 pages.
Ethereum, "White Paper," retrieved from https://web.archive.org/web/20170729062422/https://github.com/ethereum/wiki/wiki/White Paper, Jul. 29, 2017, 23 pages.
Ibmledger, "Blockchain-Samples/Contracts/Basic/Simple_Contract," retrieved from https://github.com/ibm-watson-iot/blockchainsamples/tree/master/contracts/basic/simple_contract, Nov. 4, 2016, 11 pages.
International Search Report and Written Opinion dated Feb. 26, 2019, Patent Application No. PCT/IB2018/059757, 14 pages.
Lebing et al., "Turing Complete Language vs Non-Turing Complete (Ethereum vs Bitcoin)," Bitcoin Forum, https://bitcointalk.org/index.php?topic=431513.0;all, 33 pages.
Lerner, "Lumino Transaction Compression Protocol (LTCP)," retrieved from https://uploads.strikinglycdn.com/files/9dcb08c5-f5a9-430e-b7ba 6c35550a4e67/LuminoTransactionCompressionProtocolLTCP.pdf, Feb. 24, 2017, 10 pages.
Medium Dotcom, "Ethereum Direct," retrieved from https://ether.direct/2017/08/06/diving-into-the-ethereum-vm/, Aug. 6, 2017, 17 pages.
Mizrahi, "[bitcoin-dev] Building Blocks of the State Machine Approach to Consensus," retrieved from https://lists.linuxfoundation.org/pipermail/bitcoin-dev/2016-June/012777.html, Jun. 20, 2016, 3 pages.
Nakamoto, "Bitcoin: A Peer-to-Peer Electronic Cash System," Bitcoin, Oct. 31, 2008, https://bitcoin.org/bitcoin.pdf, 9 pages.
Poon et al., "Plasma: Scalable Autonomous Smart Contracts," retrieved from https://plasma.io/plasma.pdf, Aug. 11, 2017, 47 pages.
Qtum2, "What is UTXO ?? ," retrieved from https://forum.qtum.org/topic/86/what-is-utxo/3, Apr. 3, 2017, 4 pages.
Satoshi et al., "Connection Limits," Bitcoin Forum, Aug. 9, 2010, https://bitcointalk.org/index.php?topic=741.0;prev_next=prev, 2 pages.
Schoenfeld, "Ethereum/Research Chat Logs," retrieved from https://gitter.im/ethereum/research/archives/2016/04/27, Apr. 27, 2016, 32 pages.
Seijas et al., "Scripting smart contracts for distributed ledger technology," Cryptology ePrint Archive, Report 2016/1156, Dec. 16, 2016, 30 pages.
Smart Contracts, "Smart Contracts—Web3j 2.1.0 Documentation," retrieved from https://web.archive.org/web/20170505090036/https://web3j.readthedocs.io/en/latest/smart_c ontracts.html, May 5, 2017, 4 pages.
UK Commercial Search Report dated Apr. 30, 2018, Patent Application No. GB1720767.1, 12 pages.
UK IPO Search Report dated Jun. 22, 2018, Patent Application No. GB1720767.1, 3 pages.
Ydtm et al., "Why Turing-complete smart contracts are doomed: 'Kurt Gödel and Alan Turing both posed the same question: 'Can we find a universal procedure to prove that a mathematical theory is true or false?' They each, in their own way, answered 'NO': there exist some mathematical truths that cannot be proven.'," Reddit, https://www.reddit.com/r/btc/comments/4p0gq3/why_turingcomplete_smart_contracts_are_doomed/, Jun. 20, 2016, 13 pages.

* cited by examiner

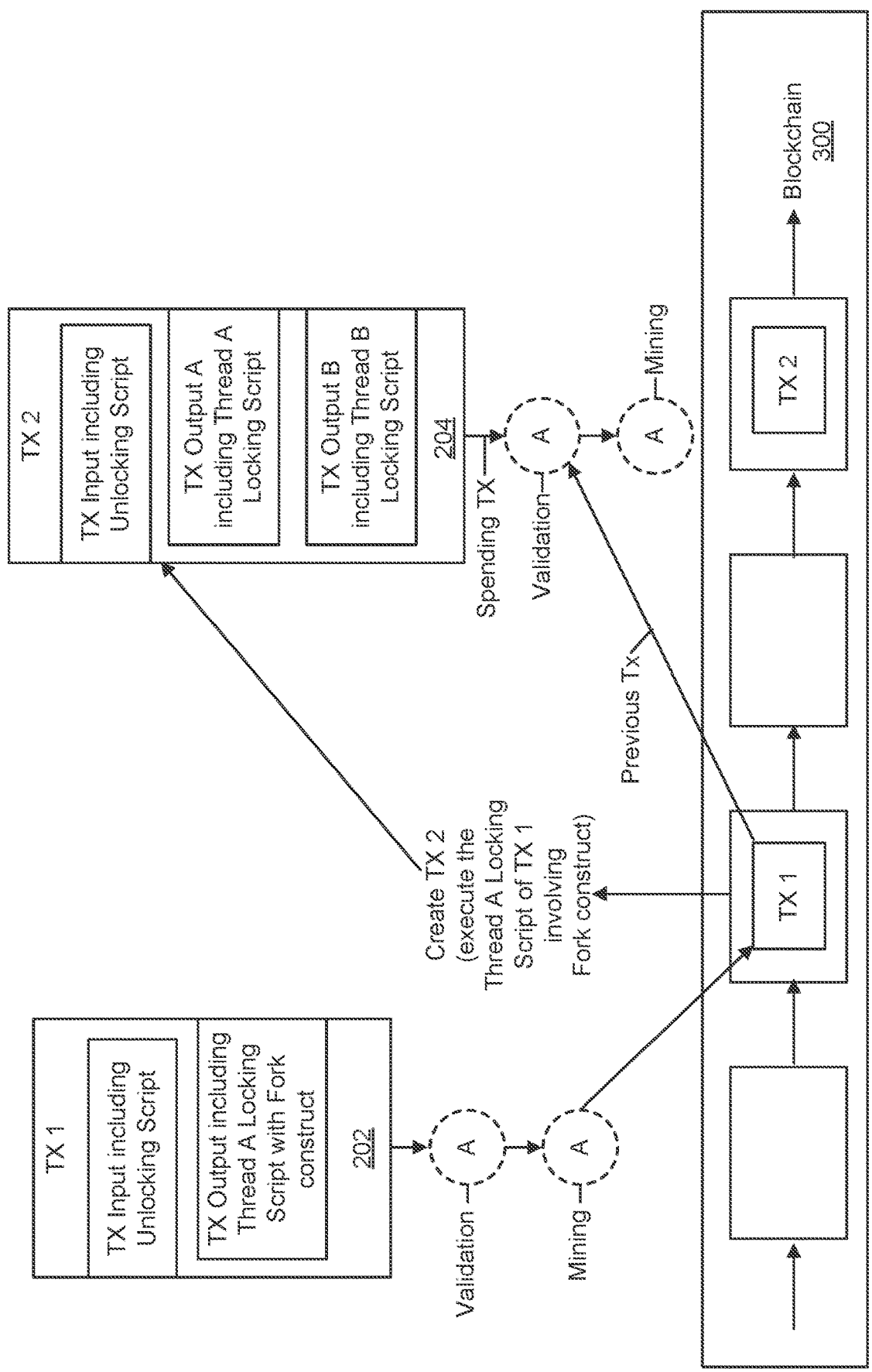

BLOCKCHAIN-IMPLEMENTED SYSTEMS AND METHODS FOR CONCURRENT BYTECODE INTERPRETATION

BACKGROUND OF INVENTION

This invention relates generally to computer-implemented methods of processing blockchain transactions, and more particularly to implementing locking scripts within the structure of blockchain transaction processing to support concurrent and/or asynchronous thread execution. This invention is particularly suited to, but not limited to, use in methods and apparatus that process and transact in smart contract transactions.

In this document, the term "blockchain" refers to any of several types of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin blockchain, although other blockchain implementations have been proposed and developed. While the example of Bitcoin may be referred to herein for the purpose of convenience and illustration in the present disclosure, it should be noted that the invention is not limited to use with the Bitcoin blockchain; and alternative blockchain implementations and protocols fall within the scope of the present invention. For example, the invention may be useful in other blockchain implementations that have limitations similar to Bitcoin regarding what constraints can be encoded within transactions. The term "Bitcoin" is used herein to include any variant of the Bitcoin protocol.

A blockchain is a peer-to-peer, electronic ledger that is implemented as a computer-based, decentralised, distributed system made up of blocks, which in turn are made up of transactions and other information. A blockchain system or blockchain network comprises a plurality of blockchain nodes and a set of operations. A blockchain node might be configured to perform some or all of the operations in the set of operations. Various blockchain nodes might be implemented as computer hardware, computer software, or a combination of both, operated by a node operator, wherein node operators can be independent and unrelated to other node operators. Blockchain nodes might each maintain a copy of the blockchain ledger, or some portion of it. The set of operations might include creating transactions, propagating transactions, reading the blockchain ledger, evaluating the blockchain ledger, generating (mining) a new block for proposed addition to the blockchain ledger, communicating with other blockchain nodes, and providing wallet functions for a user to manage blockchain assets.

The blockchain ledger is decentralised, in that there is no single blockchain node or entity that decides when the ledger gets modified. Instead, the blockchain nodes each are programmed with knowledge of rules of the blockchain protocol in order to verify the blockchain ledger and verify that actions taken by other blockchain nodes are consistent with those rules. The term "blockchain" may refer to the fact that a blockchain ledger comprises a series of chained blocks, each representable as a data structure in computer memory, readable by a computer process and transmittable as a data transmission. A block comprises one or more transactions, also representable as data structures in computer memory, readable by a computer process and transmittable as a data transmission. The blocks are chained, in that each new block that is officially added to the blockchain contains immutable references to an immediately previous block, which contains immutable references to its immediate prior block, and so on.

One of the rules of the blockchain protocol would be that once a block is added to the blockchain, it cannot be changed, i.e., it is immutable, and the only modification possible of the blockchain ledger is the addition of a new block. Since blockchain nodes are programmed with that as a rule, they would not modify blocks in their copy of the blockchain ledger, but only add blocks, and even then, only add blocks after running a verification process on the proposed block to ensure it complies with the blockchain protocol. Since blocks are immutable once added to the ledger, transactions in a block are also immutable.

Some of the nodes of the blockchain network operate to create transactions. It is contemplated that the creation of transactions can involve operations involving an electronic wallet node, an agent node, or some other node of the blockchain network. When a blockchain node creates a transaction, it creates a data object that contains the details of the transaction and then sends or broadcasts that data object to other blockchain nodes that it can connect to over the blockchain network, in a peer-to-peer fashion typically. Some blockchain nodes operate as "miners" and collect one or more transactions, form a data structure corresponding to a block, perform some computations to validate the transactions that are put into the block, solve a puzzle, place the solution to the puzzle into the data structure and attempt to propagate the block to other blockchain nodes. The puzzle might be in the form of a nontrivial computation that is specific to the data of the transactions and the present state of the blockchain ledger, such as the number of blocks in the ledger and data from the last block added.

By having the puzzle be dependent on the transactions, a rogue blockchain node cannot propagate a block that was made up ahead of time. By having a nontrivial puzzle to solve, a rogue blockchain node cannot simply inject blocks into the blockchain network, but requires that a blockchain node do some significant computational task to prove that it put in the effort (in effect, showing a solution to a hard problem is a "proof-of-work"). Preferably, in a blockchain protocol, the proof-of-work is nontrivial, but verification that the puzzle was solved and the work was done is easy. That means that the other blockchain nodes do not necessarily have to trust the blockchain node that is proposing the new block to add to the ledger. If verified by another blockchain node, that blockchain node will add the new block to the end of its copy of the blockchain ledger and propagate the new block to other blockchain nodes. As other blockchain nodes perform the same verification, they will also conclude that the block is valid and is to be added to the blockchain ledger, so they will add it to their copy of the blockchain ledger. If a blockchain node determines that the proposed new block is not valid, it will not add it to its copy of the blockchain ledger and will not propagate it. Because validity in the blockchain is consensus-based, a transaction is considered valid if a majority of nodes agree that a transaction is valid.

A blockchain system typically operates such that node owners and operators do not necessarily trust other node owners and operators. Instead, the protocols make it computationally infeasible to perform certain operations that are not permitted by the protocol, such as modifying earlier blocks, proposing a new block without a corresponding proof-of-work, or including invalid transactions. Specific trust is not needed when it is computationally infeasible to perform an operation that is not allowed by the blockchain protocol in a manner that would go unnoticed by other nodes.

In order for a transaction to be included in a block that gets written to the blockchain, (1) the mining blockchain node (or a validation node) would validate the transaction, (2) the mining blockchain node would attempt to propagate a block that contained that transaction, and (3) the other nodes would verify the validity of the block and validity of the transactions in that block. As the mining blockchain node would be programmed or configured with those rules in mind, the mining blockchain node would not likely include a transaction that failed to verify into a block, as such a block would not be accepted by other nodes and the mining node would obtain no benefit. One such benefit of mining for some blockchain systems is that if a block is accepted, the block is allowed to include a "reward" transaction, wherein a specified amount of value is allocated to the operator of that node without the need for a corresponding reduction of value from some other entity. In this manner, successful miners are compensated by value created with the block. In addition, as explained below, transactions can include transaction fees, which would also go to the miner controlling the mining blockchain node and which also require that the transaction be verifiable as valid in order for that miner to see any compensation.

A transaction in a blockchain network contains various data elements, including a transaction value and other data elements. In a decentralised, distributed ledger system, the ledger is public, so anyone can view the ledger and see transactions. In a blockchain ledger, there is a genesis transaction that starts the blockchain and ascribes some unit of value to that genesis transaction. In examples herein, for explanatory purposes, the unit of value is a cryptocurrency, but other variations that employ other digital assets are possible.

A transaction other than the genesis transaction and reward transactions involves "spending" the value of one or more existing transactions on the blockchain ledger, and when such a transaction is added to the blockchain ledger, it in turn can be spent. Each unspent transaction specifies, in a public manner, the requirements needed in order to spend the value of that transaction. A simple requirement might be "You must first prove that you are Alice, and then you can spend this". Alice might then create a new transaction that "spends" that transaction's value, where Alice's new transaction proves that it came from Alice and has a pointer to that previous transaction. For reward transactions, there is a transaction value but the reward transaction does not "spend" a previous transaction. Of course, for Alice's transaction to be accepted by the blockchain network, it cannot refer to an already spent transaction and must actually prove that Alice created it.

By the blockchain protocol and thus by agreement of the blockchain nodes, a transaction is not valid if it points to a previous transaction output that has already been spent, i.e., for which the ledger contains a valid existing transaction input that points to that previous transaction output. To prevent any interloper from creating a new transaction input that "spends" the value represented by a previous unspent transaction output, each transaction output includes data representing requirements imposed on any claimant who would create such a transaction and since unspent transaction outputs are immutable, that data cannot be altered. Of course, spent transactions are also immutable.

In the example above, Alice might have created the spending transaction so that the value in the previous transaction that she alone had the ability to unlock could be transferred to Bob, i.e., so that there would now be a new unspent transaction that only Bob had the ability to unlock and thereby spend. Alice's created spending transaction might include data corresponding to the following requirement: "Anyone is free to point to this transaction—and thereby spend all of its value—if they can supply sufficient information to prove that they know Bob's private key." Assuming Bob is careful, Bob would be the only person able to create a valid transaction that spends that transaction. In effect, Bob owns that value and is the only one who could spend that value. Note that this does not require that Bob trust any of the operators of blockchain nodes or trust any other party who has the ability to create transactions. All Bob needs to trust is that a rogue party cannot entirely take over a majority of the blockchain nodes.

In a specific case, one transaction entirely spends exactly one previous unspent transaction and that one transaction can be entirely spent by a later transaction or not at all. In the general case, a transaction has one or more transaction inputs and one or more transaction outputs, where each transaction input references a transaction output of a previous transaction (and that transaction output has a spendable value), and each transaction output has a spendable value (that remains unspent until it is spent/referenced by a transaction input of a future transaction). A transaction output of a transaction specifies a spendable unit of the transaction in that it is spent entirely or not at all. In some examples described herein, a transaction is referred to as being "spent," and it should be understood that where a transaction has multiple transaction outputs, the description might cover cases where fewer than all of the transaction's outputs are spent.

Where a transaction can have multiple transaction outputs, different transaction outputs of that transaction can be spent at different times. When the transaction is created, its transaction outputs are considered unspent. Each transaction output can be spent by a transaction input of a later transaction or remains unspent. If a transaction has a transaction input that attempts to spend a transaction output of a previous transaction after the transaction output of the previous transaction has already been spent, blockchain nodes would reject that as being an invalid transaction.

In the case where a party, Alice, controls an unspent transaction output valued at X and wants to spend only a part, Y, of that transaction output, Alice can specify a new transaction that has multiple transaction outputs, one that is a transaction output with value Y that can only be spent by Bob, and one that is a transaction output with value X-Y that can only be spent by Alice. In effect, the original transaction output is entirely spent, but there is a new transaction output "making change" that belongs to Alice.

The number of transaction inputs of a transaction and the number of transaction outputs of that transaction need not be the same. However, in order to be a valid transaction, the sum of the values specified in the transaction output(s) of the transaction should not exceed the sum of the values of the previous transaction output(s) that are spent by the transaction input(s) of the transaction, and in some cases will be less, with some exceptions. For the genesis transaction and reward transactions, the sum of the values of the transaction output(s) can be greater than the sum of the values of the transaction input(s), or there need not be any inputs at all, but for regular transactions, the transaction would be invalid if the sum of the values of its transaction output(s) exceeded the sum of the values of its transaction input(s). For some transactions, the sum of the values of its transaction output(s) can be less than the sum of the values of its transaction input(s), in which case, the successful miner adds a transaction fee transaction for the difference, thus balancing and creating an incentive for the miner to process the transaction. In the Bitcoin protocol, this is a Coin base transaction that is added to a block and has spendable outputs equal to the sum of the transaction fees of all of the other transactions included in a Bitcoin block (i.e., the sum of the differences of all the inputs and outputs of all the included transactions), plus the reward for creating a new block.

Each transaction output of a transaction includes the constraints that must be met in order to spend that output's value. In some blockchain protocols, the constraints are embedded in a "locking script" that specifies data and script commands that define what those constraints are. The locking script acts as an encumbrance on the value represented in a transaction output, in that another actor cannot "spend" the value represented in a transaction output unless they can "unlock" the locking script of that transaction output.

Each transaction input to a spending transaction spends a transaction output of a previous transaction. An "unlocking script" of the spending transaction input specifies data and script commands for satisfying the constraints specified by the locking script of the previous transaction output. Only by satisfying these constraints can that spending transaction spend that transaction output of the previous transaction. Thus, a valid transaction specifies at least one input, and each input of a valid spending transaction includes a pointer to a previous transaction output (the one being spent) and an unlocking script that "unlocks" the locking script of the previous transaction output. A blockchain node that operates according to the corresponding blockchain protocol will execute the locking script and the unlocking script together to verify the transaction input. In a particular system, the scripts are stack-based and a verifying blockchain node will start with an empty stack, execute the unlocking script, which may leave data objects on the stack, then execute the locking script, which may use data objects on the stack.

When the verifying blockchain node combines the locking script and the unlocking script and executes the combination, the result after execution will either be "TRUE" or "FALSE." In some cases, execution of the scripts ends with a FALSE result before the script is completely executed. For example, suppose that for a given script execution, there are two values that are always equal in a valid script execution regardless of what else happens in the script. If partway through execution of that script, a comparison is done between those two values and they are not equal, execution of the script can stop right after that comparison and return a FALSE result. The rest of the script need not be executed.

If the verifying blockchain node combines the locking script and the unlocking script, executes the combination, and the result is TRUE (i.e., the unlocking script contains everything necessary to unlock the transaction output), then the verifying blockchain node would verify the transaction to be valid (assuming other requirements are met, such as a proper timestamp, proper formatting, not pointing to an already spent transaction output, etc.). If the verifying blockchain node verifies the transaction to be valid, it will propagate it for mining. Other blockchain nodes will do the same computation to conclude that the transaction is valid. In this manner, valid transactions that have inputs that point only to unspent transaction outputs and have unlocking scripts that unlock those unspent transaction outputs will propagate and eventually become part of a block that eventually becomes part of the ledger.

On the other hand, if a rogue node tries to propagate an invalid transaction, other nodes will find it invalid and not propagate it.

Once a transaction is valid and accepted into the blockchain, its contents cannot be changed. That means that the locking script is fixed at the time of creation of the transaction. The unlocking script, however, is not necessarily fixed at that time, as the unlocking script is contained within a later spending transaction and need not be created until the later spending transaction is created.

In the typical case, the unlocking script cannot just be created by anyone, but only by a party that is authorised to spend the previous transaction output. As in the example above, the locking script might be "Anyone is free to point to this transaction output—and thereby spend all of its stated value—if they can supply sufficient information to prove that they know Bob's private key," and the unlocking script might be of the form "Bob has signed the transaction with his private key and here is the result: <sig_Bob>." Then the verifying blockchain node will process those two statements and reach a conclusion of TRUE or FALSE. This process works well when it is easy to verify that <sig_Bob> is a valid signature for Bob, it is easy for Bob (or someone else with knowledge of Bob's private key) to generate such a signature, and very difficult for someone else to generate a valid signature without knowing Bob's private key. As a result, value can be transferred in a trustless system. The originator of the transaction that Bob is about to spend need not trust the system or trust Bob, as it is cryptographically difficult to form a valid and verifiable result that would be accepted by a consensus of the blockchain nodes without first knowing Bob's private key.

A blockchain node can easily verify that Bob signed the transaction and verify that the signature is the only requirement of the locking script. Of course, there might be rogue nodes that do not verify where other nodes do verify and could verify where other nodes do not verify, but as long as the rogue nodes cannot overpower the well-behaved nodes on the blockchain network, the rogue nodes would be unable to push through invalid transactions or stop valid transactions from being propagated or mined.

When validating a spending transaction, a node executes the unlocking script(s) of one more transaction inputs and corresponding locking scripts of one or more previous transaction outputs. When such script execution evaluates as TRUE, and other validation conditions, if applicable, are met, the transaction is valid as far as that node is concerned. That node would then propagate the validated transaction to other network nodes, whereupon a miner node can choose to include the transaction in a block. Thus, in order for a transaction to be written to the blockchain, it must (1) be validated by a node that receives the transaction, (2) be relayed (but only if the transaction is validated) to the other nodes in the network, (3) be added to a new block built by a miner, (4) be propagated as part of the proposed block, and (5) have that proposed block accepted as an addition to the public ledger of past transactions by consensus of the nodes.

The transaction is considered to be confirmed when a sufficient number of blocks are added to the blockchain to make the transaction practically irreversible. Since a transaction is immutable, the blockchain protocol can block unilateral reversals of a transaction. Of course, if Alice transfers value X to Bob and Alice wants that value X back, she can get it if Bob agrees, in which case the Alice-to-Bob-for-X transaction is not reversed or cancelled, but there is a new transaction that Bob initiates, the Bob-to-Alice-for-X transaction.

Once a transaction is included in a block, the transaction is considered immutable, and once a block is committed to the blockchain, the block is considered immutable. There may be short periods of time where forks in the blockchain exist and there is some ability to roll back the blockchain, but generally, the more time that passes, the less likely any rolling back would be possible. Herein, unless otherwise indicated, it is assumed that transactions and blocks are immutable after being fully committed to the blockchain.

One method of ensuring immutability is through the use of cryptographic techniques. For example, there are cryptographic operations, such as hashes and digital signatures, that take as their input some data sequence and provide an output data sequence that corresponds in some way to that input data sequence. The operations are such that, for a given cryptographic output (e.g., a hash or digital signature) that was generated from a given cryptographic input (e.g., a transaction or block), it is computationally infeasible or impossible using available computing resources to find a different cryptographic input that results in the same cryptographic output. Consequently, a verifier can assume that if a cryptographic input is consistent with a cryptographic output, it is the cryptographic input that was used to generate the cryptographic output and not some other modified cryptographic input.

In a blockchain network, where each node is not required to trust each other node, transactions are so verified and blocks are so verified, and unverifiable transactions and blocks are ignored and unused, the transactions and blocks are deemed to be effectively immutable and this might be a consequence of an assumption that if a hash or a digital signature corresponds correctly to a transaction or a block, the transaction or block has not been modified from its original.

Some blockchain nodes will store the entire ledger, whereas others might store only the unspent transaction outputs (UTXO, for the Bitcoin ledger). The unspent transaction outputs correspond to the value that is spendable, and preferably, each unspent transaction output has a locking script for which a verifiable unlocking script cannot be easily generated by anyone other than the "owner" of that value. Of course, that is not a requirement, but it would be expected that any transaction output for which a verifiable unlocking script can be easily generated by anyone will quickly be spent in a transaction that transfers its value to another transaction output that is only spendable by the person who first notices it. As a result, the blockchain can be used to transfer control of a cryptocurrency value, and more generally, a digital asset from one participant in the blockchain system to another participant in the blockchain system and records of transactions, comprising spent transaction outputs and unspent transaction outputs, are recorded in a public, immutable ledger, making it easy to verify flows of digital assets and prevent double spending of those digital assets.

As used herein, a "digital asset" may refer to one or more digital assets. A digital asset whose control is transferred may be, in this example, a collection of multiple digital assets, the collection itself being a digital asset. In an embodiment, a cryptocurrency is a token-based cryptocurrency where each token represents a share of an asset (e.g., a share of a company) and a single transaction involves multiple types of tokens (e.g., involves shares in one or more different companies).

Transactions contain locking scripts and unlocking scripts, which can form computational objects. Once committed to the blockchain, the transactions become immutable, and that feature has uses beyond just the immutable transfer of control over digital assets in the form of cryptocurrency. In addition to transferring value, immutable transactions can be used to implement other operations, such as notary recording of events, implementation of smart contracts wherein rights and obligations of parties are encoded in the transactions and transfer value according to the terms of the smart contract according to the blockchain protocol.

On the Bitcoin platform, the scripts are written using a stack-based scripting language, but other approaches might be used instead. When executing instructions of a stack-based scripting language, a processor (such as a part of a blockchain node) stores data on a first-in, last-out data structure called a stack. The processor can push values onto the top of the stack or pop values from the top of the stack or possible access (read/write) other values stored in the stack. Various operations performed to the stack can result in pushing or popping or otherwise accessing one or more of the values on the stack, performing operations thereon, and changing the order of elements on the stack (which might be equivalent to two pop operations and two pushes with the first push being the first item popped). For example, an OP_EQUAL operation might pop the top two items from the stack, compare them, and push a result (e.g., 1 if equal or 0 if unequal) to the top of the stack. In some scripting languages employed by some of the present embodiments, there may be at least two stacks: a main stack and an alternate stack. Some operations of the scripting language can move items from one stack to another stack. For example, executing an OP_TOALTSTACK operation causes the processor to move a value from the top of the main stack to the top of the alternate stack.

With the scripts that are included in a transaction, a smart contract can be implemented wherein the terms of the contract are encoded into the scripts. An example might be of the form "If Bob has paid Carol X and Dave has granted permission for the transaction, Alice will pay Bob half of X," and that can be encoded as part of a locking script that would only evaluate to TRUE if (among other conditions) there is a prior transaction where Bob paid Carol and a prior transaction where Dave encoded his permission. As used herein, "prior transaction" might refer to any transaction that has already been added to the blockchain, not necessarily the previous transaction that has an output that a spending transaction spends. In effect, a smart contract can represent a machine-executable program that comprises rules that define inputs in order to produce results, which can then cause actions to be performed dependent upon those results.

In addition to the transfer of values, transactions might also transfer other objects of value or possessory interests. For example, a transaction might transfer some nominal cryptocurrency value but also include data corresponding to the assertion that "whoever is able to spend this transaction is also the rightful owner of the house and land at 123 Marley Circle." The possessory interest might be obscured in the public record, to the same effect. For example, the transaction might include data corresponding to the assertion that "whoever is able to spend this transaction is also the rightful owner of that certain property held in trust under trust number 12345 held at Central Bank of Trust." Herein, this is referred to as a token, which represents and effects transfer of real-world entities via the blockchain. A potentially sensitive or secret item can be represented by the token which has no discernible meaning or value. The token thus serves as an identifier that allows the real-world item to be referenced from the blockchain.

As explained herein, a smart contract is "smart" in the sense that the creator, or some other specific entity, is not tasked with enforcement and/or execution of the smart contract. Instead, interaction with specific entities can be encoded at specific steps in the smart contract, and the smart contract can otherwise be automatically self-executing and self-enforced. In some examples, automatic execution refers to any entity being able to spend an unspent transaction output for their benefit. Note that, in such examples, the "any entity" that is able to spend the unspent transaction output refers to an entity that is able to create the unlocking script without being required to prove knowledge of some secret. In other words, the spending transaction can be validated without verifying that the source of the data has access to a cryptographic secret (e.g., private asymmetric key, symmetric key, etc.). Also, in such examples, self-enforcement occurs as a consequence of validation nodes of the blockchain network validating a spending transaction according to the constraints of the smart contract. In some examples, "spending" an unspent transaction output refers to creating a spending transaction output that references the unspent transaction output and executes as valid. A side effect of spending such a transaction output is that the blockchain network will process a locking script and an unlocking script to validate a new transaction, the spending transaction. If valid, that previous transaction output is considered spent. By including certain value in a transaction output and making it so that anyone can spend that output, there is an incentive for parties to create such spending transactions, and thus is it likely that steps of the smart contract will be performed, if not by participants in the smart contract, then by others operating blockchain nodes.

The scripts that form the locking script and unlocking script that are recorded as part of a transaction are immutable, and so the locking script cannot normally be modified or reference portions of future transactions, as those are unknown at the time the transaction is fixed. An unlocking script of a transaction input can refer to portions of the previous transaction output pointed to by the transaction input or prior transactions in the blockchain other than the previous transaction. This may limit how a transaction can be used.

It is desirable to provide additional functionality and improved methods and systems for using blockchain technology in one or more of these aspects. Thus, in accordance with the present invention, there is provided a system and/or method as defined in the appended claims.

SUMMARY OF INVENTION

In various embodiments, a computer-implemented method is provided that creates and/or validates a spending blockchain transaction that includes i) a plurality of locking scripts each representing an instance of an execution thread (which can be execution threads forked from an execution thread represented by a locking script of a previous blockchain transaction and/or execution threads of at least one previous blockchain transaction that are managed and/or controlled for inter-thread communication and control) or ii) a locking script representing an execution thread joined from a plurality of execution thread instances represented by at least one previous blockchain transaction. Once created and/or validated, the spending blockchain transaction can be communicated on a blockchain network for storage in a blockchain ledger.

Additionally or alternatively, the computer-implemented method may create and/or validate blockchain transactions that implement thread-specific locking scripts and associated fork, join and barrier constructs for concurrent or asynchronous execution threads of execution. Such blockchain transactions can be validated and communicated on a blockchain network for storage in a blockchain ledger. The blockchain transactions can be used as part of a smart contract.

Additionally or alternatively, a spending blockchain transaction may be created by a node of the blockchain network. The spending blockchain transaction can point to a locking script of a previous blockchain transaction which represents an execution thread. The spending blockchain transaction can further include a plurality of locking scripts each representing an instance of an execution thread forked from the thread of execution represented by the locking script of the previous blockchain transaction.

In one embodiment, the execution thread represented by the locking script of the previous blockchain transaction may include a bytecode sequence, and at least one execution thread instance represented by plurality of locking scripts of the spending blockchain transaction can be generated by replicating the bytecode sequence of the locking script of the previous blockchain transaction.

In another embodiment, the execution thread represented by the locking script of the previous transaction may include a bytecode sequence and interpreter code, and at least one execution thread instance represented by plurality of locking scripts of the spending blockchain transaction can be generated by replicating the bytecode sequence and the interpreter code of the locking script of the previous blockchain transaction.

In yet another embodiment, the method can store or access a collection of valid bytecode sequences, and at least one execution thread instance represented by plurality of locking scripts of the spending blockchain transaction can be generated by replicating a valid bytecode sequence of the collection.

In still another embodiment, the method can store or access a collection of valid bytecode sequences and valid interpreter code, and at least one execution thread instance represented by plurality of locking scripts of the spending blockchain transaction may be generated by replicating a valid bytecode sequence and valid interpreter code of the collection.

In another embodiment, the spending blockchain transaction may be created by generating execution state information (such as next execution pointers) for the execution thread instances represented by the plurality of locking scripts of the spending blockchain transaction and including the execution state information (such as next execution pointers) into the plurality of locking scripts of the spending blockchain transaction. Once created and/or validated, the spending blockchain transaction can be communicated on a blockchain network for storage in a blockchain ledger.

Additionally or alternatively, a spending blockchain transaction may be received by a node of the blockchain network. The spending blockchain transaction may include a plurality of locking scripts each representing an instance of an execution thread forked from a thread of execution represented by the locking script of a previous blockchain transaction. The node may validate the spending blockchain transaction by verifying the locking script of the spending blockchain transaction against one or more conditions. The verifying may involve matching at least one of the plurality of locking scripts of the spending blockchain transaction to the locking script of the previous blockchain transaction. The verifying may also involve using next execution pointers for the plurality of locking scripts of the spending blockchain transaction that represent the execution thread instances to execute the plurality of locking scripts of the spending blockchain transaction and generate resultant execution state information and checking such resultant execution state information for validity.

In one embodiment, the execution thread represented by the locking script of the previous blockchain transaction may include a bytecode sequence and possibly interpreter code, and the plurality of locking scripts of the spending blockchain transaction can be required to include the same bytecode sequence and possibly the same interpreter code for validation of the spending blockchain transaction to succeed. In this case, the verifying can involve matching the bytecode sequence and possibly interpreter code for each one of the plurality of locking scripts of the spending blockchain transaction to the bytecode sequence and possibly interpreter code of the locking script of the previous blockchain transaction. Validation of the spending blockchain transaction can be determined based on the results of such matching.

In another embodiment, the execution thread represented by the locking script of the previous blockchain transaction may include a bytecode sequence and possibly interpreter code, and the plurality of locking scripts of the spending blockchain transaction can be i) the same bytecode sequence and possibly the same interpreter code of the locking script of the previous blockchain transaction or ii) a distinct bytecode sequence and possibly interpreter code that belongs to a collection of valid locking scripts for validation of the spending blockchain transaction to succeed. In this case, the verifying can involve generating a hash data value that corresponds the locking script of the previous blockchain transaction and adding the hash data value to a collection of hash data values that correspond to the collection of valid locking scripts. A hash data value can be generated for each locking script of the spending transaction and compared to the collection of hash data values. Validation of the spending blockchain transaction can be determined based on the results of such hash data value comparisons.

Additionally or alternatively, a spending blockchain transaction can be created by a node of the blockchain network. The spending blockchain transaction can point to a plurality of locking scripts of one or more previous blockchain transactions, wherein the plurality of locking scripts each represent an instance of an execution thread. The spending blockchain transaction can also include a locking script representing an execution thread joined from the execution thread instances pointed to by the spending blockchain transaction. Once created and/or validated, the spending blockchain transaction can be communicated on a blockchain network for storage in a blockchain ledger.

In one embodiment, the locking script representing the execution thread joined from the execution thread instances pointed to by the spending blockchain transaction can be generated by replicating a bytecode sequence of the plurality of locking scripts of the one or more previous blockchain transactions.

In another embodiment, the locking script representing the execution thread joined from the execution thread instances pointed to by the spending blockchain transaction can be generated by replicating a bytecode sequence and interpreter code of the plurality of locking scripts of the one or more previous blockchain transactions.

In yet another embodiment, the method can store or access a collection of valid bytecode sequences, and the locking script representing the execution thread joined from the execution thread instances pointed to by the spending blockchain transaction can be generated by replicating a valid bytecode sequence of the collection.

In still another embodiment, the method can store or access a collection of valid bytecode sequences and valid interpreter code, and the locking script representing the execution thread joined from the execution thread instances pointed to by the spending blockchain transaction can be generated by replicating a valid bytecode sequence and valid interpreter code of the collection.

In another embodiment, the spending blockchain transaction can be created by generating execution state information (such as a next execution pointer) for the execution thread joined from the execution thread instances pointed to by the spending blockchain transaction and including the execution state information (such as the next execution pointer) into the locking script of the spending blockchain transaction.

Additionally or alternatively, a spending blockchain transaction can be received by a node of the blockchain network. The spending blockchain transaction can point to a plurality of locking scripts of one or more previous blockchain transactions, wherein the plurality of locking scripts each represent an instance of an execution thread. The spending blockchain transaction can also include a locking script representing an execution thread joined from the execution thread instances pointed by the spending blockchain transaction. The node can validate the spending blockchain transaction by verifying the locking script of the spending blockchain transaction against one or more conditions. The verifying can involve matching the locking script of the spending blockchain transaction to the plurality of locking scripts of the one or more previous blockchain transactions. The verifying can also involve executing the plurality of locking scripts of the one or more previous blockchain transactions to generate resultant execution state information and then merging or combining such resultant execution state information.

In one embodiment, the plurality of locking scripts of the at least one previous blockchain transaction can include a common bytecode sequence and possibly interpreter code, and the locking script of the spending blockchain transaction can be required to include the common bytecode sequence and possibly the same interpreter code for validation of the spending blockchain transaction to succeed. In this case, the verifying can involve matching the bytecode sequence and possibly interpreter code for the locking script of the spending blockchain transaction to the bytecode sequence and possibly interpreter code of each one of the plurality of locking scripts of the previous blockchain transaction. Validation of the spending blockchain can be determined based on the results of such matching.

In another embodiment, the locking script of the spending blockchain transaction can be the same bytecode sequence and possibly the same interpreter code of the plurality of locking scripts of the one or more previous blockchain transactions, or can be a different bytecode sequence and possibly interpreter code that corresponds to a collection of valid locking scripts. In this case, the verifying can involve generating a hash data value that corresponds the locking script of the previous blockchain transaction and adding the hash data value to a collection of hash data values that correspond to the collection of valid locking scripts. A hash data value is generated for each locking script of the spending transaction and compared to the collection of hash data values. Validation of the spending blockchain can be determined based on the results of such hash data value comparisons.

Additionally or alternatively, a spending blockchain transaction can be created by a node of the blockchain network. The spending blockchain transaction can point to a plurality of locking scripts of one or more previous blockchain transactions each of which represents an instance of an execution thread. The spending blockchain transaction can also include a corresponding plurality of locking scripts whose execution involves inter-thread communication or control between the execution thread instances pointed to by the spending blockchain transaction. Once created and/or validated, the spending blockchain transaction can be communicated on a blockchain network for storage in a blockchain ledger.

In one embodiment, the plurality of locking scripts of the spending blockchain transaction can be generated by replicating bytecode sequences of the plurality of locking scripts of the one or more previous blockchain transactions.

In another embodiment, the plurality of locking scripts of the spending blockchain transaction can be generated by replicating a bytecode sequences and interpreter code of the plurality of locking scripts of the one or more previous blockchain transactions.

In yet another embodiment, the spending blockchain transaction can be created by generating execution state information (such as next execution pointers) for the execution thread instances represented by the plurality of locking scripts of the spending blockchain transaction and including the execution state information (such as next execution pointers) into the plurality of locking scripts of the spending blockchain transaction.

Additionally or alternatively, a spending blockchain transaction can be received by a node of the blockchain network. The spending blockchain transaction can point to a plurality of locking scripts of one or more previous blockchain transactions each of which represents an instance of an execution thread. The spending blockchain transaction can also include a corresponding plurality of locking scripts whose execution involves inter-thread communication or control between the execution thread instances. The node can validate the spending blockchain transaction by verifying the plurality of locking scripts of the spending blockchain transaction against one or more conditions. The verifying can involve matching the plurality of locking scripts of the spending blockchain transaction to the plurality of locking scripts of the one or more previous blockchain transactions. The verifying can also involve executing the execution thread instances represented by the plurality of locking scripts of the one or more previous blockchain transactions in order to provide the inter-thread communication and/or control between the execution thread instances.

In one embodiment, the plurality of locking scripts of the at least one previous blockchain transaction can include a bytecode sequence and possibly interpreter code, and the plurality of locking scripts of the spending blockchain transaction can be required to include the bytecode sequence and the interpreter code of the plurality of locking scripts of the one or more previous blockchain transactions for validation of the spending blockchain transaction to succeed. In this case, the verifying can involve matching the bytecode sequence and possibly interpreter code for each locking script of the spending blockchain transaction to the bytecode sequence and possibly interpreter code of the corresponding locking script of the one or more previous blockchain transactions. Validation of the spending blockchain can be determined based on the results of such matching.

Additionally or alternatively, the operations of the spending blockchain transactions can encode operations for a smart contract implemented using the blockchain.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

BRIEF DESCRIPTION OF THE DRAWINGS

These and other aspects of the present invention will be apparent from and elucidated with reference to the embodiment described herein. An embodiment of the present invention will now be described, by way of example only, and with reference to the accompanying drawings, in which:

FIGS. 2 and 3A-3D illustrate a sequence of blockchain transactions (TX1, TX2, TX3, TX4, TX5, TX6) of a smart contract, wherein the sequence of blockchain transactions i) forks execution of an execution thread to generate multiple execution threads under control of a fork construct or operation and ii) employs inter-thread communication and cooperation between the multiple execution threads under control of a barrier construct or operation and iii) merges the multiple execution threads under control of a join construct or operation. Note that the blockchain transactions TX3 and TX4 when committed to the blockchain can represent concurrent or asynchronous execution of the multiple execution threads (e.g., Thread A Locking Script of TX3 and the Thread B Locking Script of TX4) represented by the sequence of blockchain transactions.

DETAILED DESCRIPTION

Figure 1A:
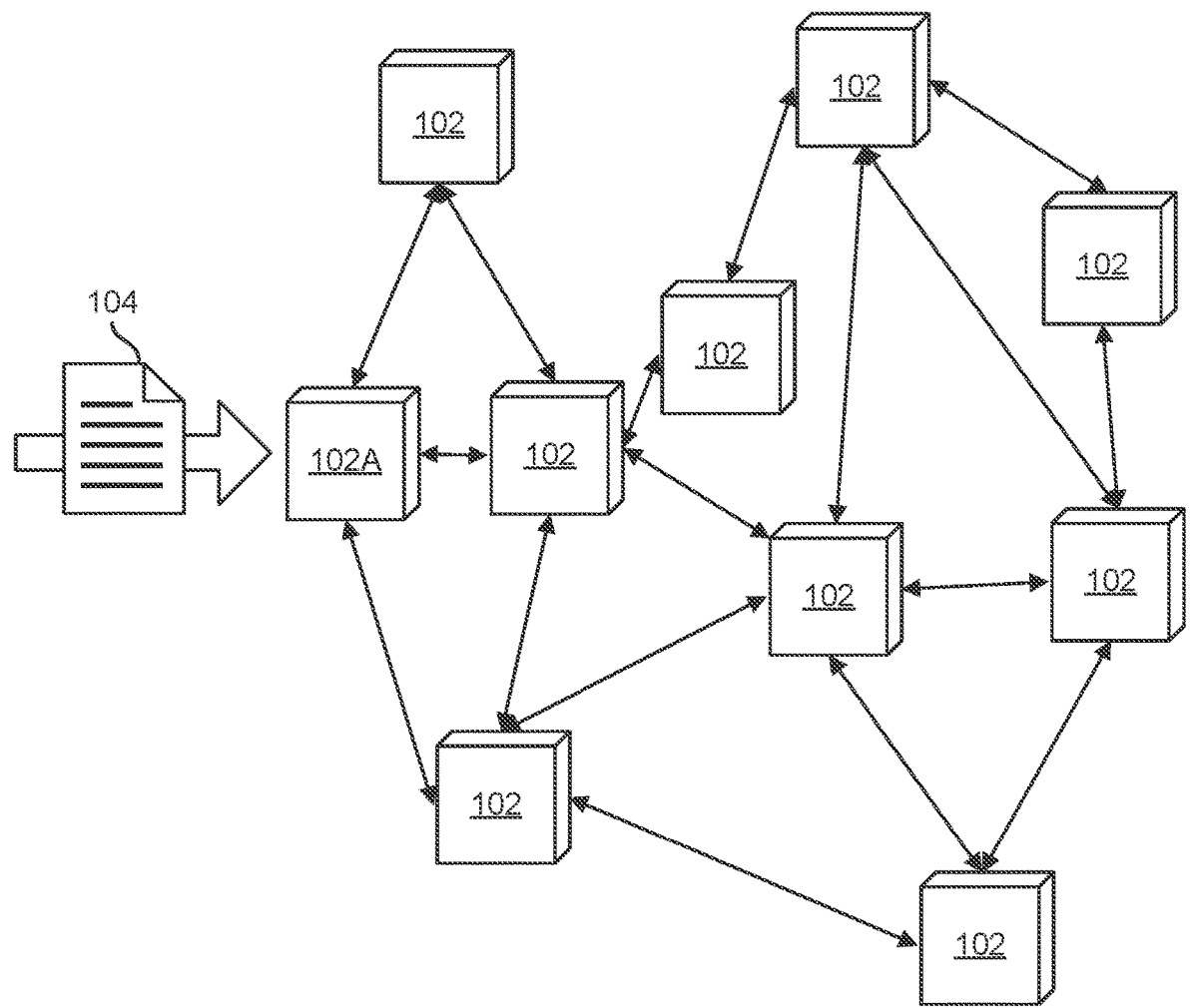
FIG. 1A illustrates a blockchain network in which various embodiments can be implemented.

Reference will first be made to FIG. 1A, which illustrates an example blockchain network 100 associated with a blockchain in accordance with an embodiment of the present disclosure. In the embodiment, the blockchain network 100 comprises blockchain nodes that might be implemented as peer-to-peer distributed electronic devices each running an instance of software and/or hardware that performs operations that follow a blockchain protocol that is, in whole or in part, agreed to among operators of blockchain nodes. In some examples, these distributed electronic devices are simply referred to as "nodes," such as nodes 102 in FIG. 1A. An example of a blockchain protocol is the Bitcoin protocol.

Figure 12:
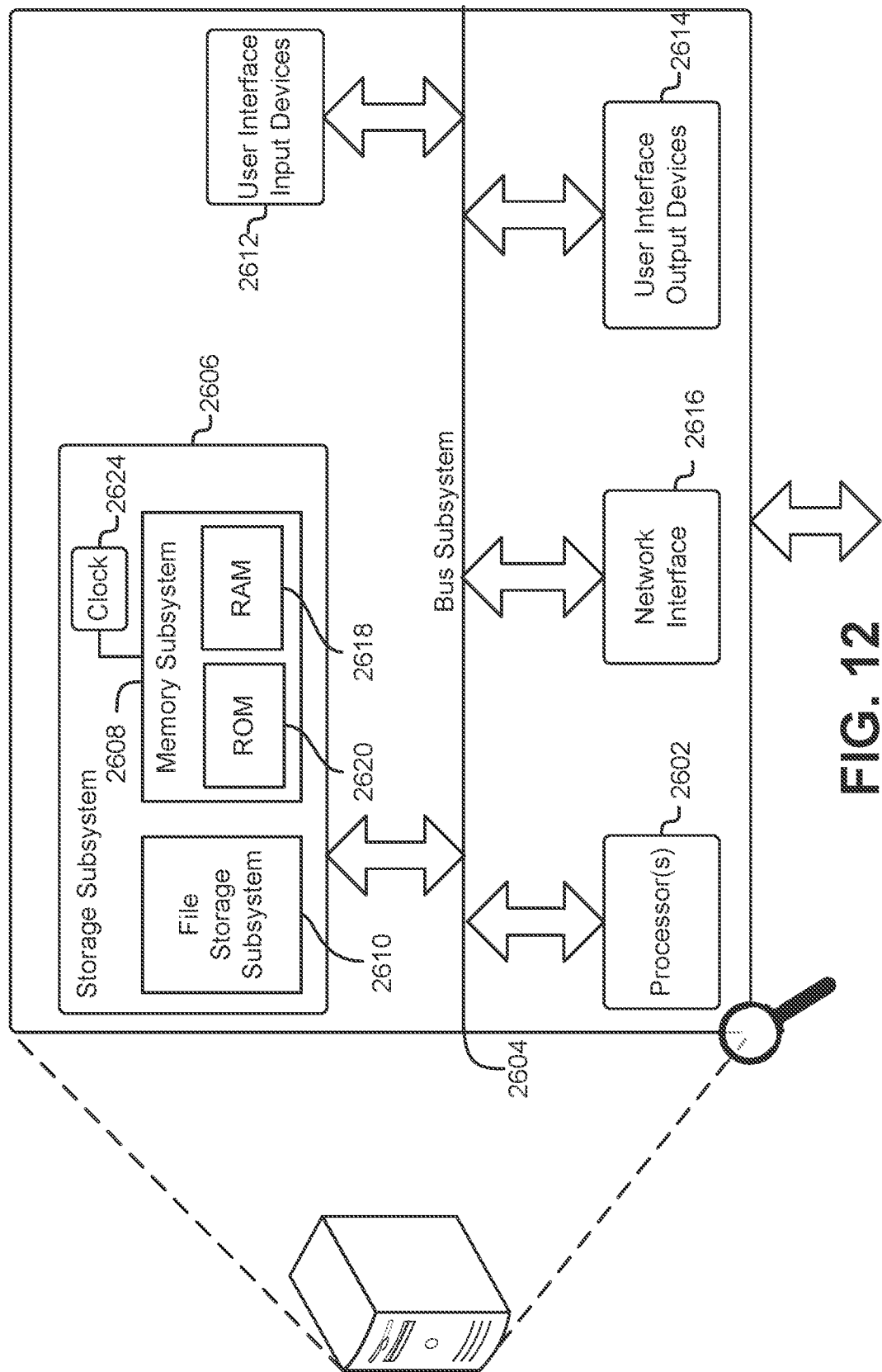
FIG. 12 illustrates a computing environment in which various embodiments can be implemented.

A node 102 may comprise any suitable computing device (e.g., a server in a data centre, a client computing device such as a desktop computer, laptop computer, tablet computer, smartphone, etc.), by multiple computing devices in a distributed system of a computing resource service provider, or by any suitable electronic client device such as the computing device 2600 of FIG. 12. Nodes 102 can have inputs to receive data messages or objects representative of proposed transactions, such as a transaction 104. Nodes 102 might be queryable for information they maintain, such as their understanding of the state of a transaction.

As shown in FIG. 1A, some nodes 102 are communicatively coupled to one or more other of the nodes 102. As for which nodes 102 can communicate with which other nodes, those details need not be centrally determined. It can be sufficient that active nodes in the blockchain network 100 are able to communicate with one or more other nodes 102 such that a message that is passed from one node 102 to another node 102 can propagate throughout the blockchain network 100 (or some significant portion of it), assuming that the message is one that the blockchain protocol indicates should be forwarded. One such message might be the publication of a proposed transaction by one of the nodes 102A, which would then propagate along a path such as a path 106. Another such message might be the publication of a new block proposed for inclusion onto a blockchain.

The nodes 102 can maintain a blockchain ledger that contains data corresponding to blocks in the blockchain. The blocks are cryptographically immutable in that a subsequent block relies on a value that is computed on a block when it becomes immutable and any modifications to an immutable block can be easily recognised by other blockchain nodes as an invalid block. The blockchain ledger can also contains data corresponding to transactions that are possibly mutable and are not yet committed to the blockchain. The blockchain ledger might be a complete copy of the blockchain ledger of the blockchain network or a portion thereof. Some nodes might maintain only unspent transactions, while others might maintain the entire ledger. In this manner, the ledger is a distributed ledger, as each node can have its own copy. A node preferably only modifies its copy according to rules of the protocol and for all nodes that fully follow those rules, their copy should, at times, be the same as other nodes, save for some propagation time for blocks and transactions. A node 102 should include the ability to verify blocks it receives and transactions in those blocks. A rule of the blockchain protocol might be that a node is not to propagate a block or a transaction to other nodes if it determines that the block or transactions is invalid. With that rule, blocks and transactions that are valid and verified to be valid will propagate the blockchain network, whereas invalid ones will not.

Some of the nodes 102 in a blockchain network are miner nodes that perform the operation of collecting transactions and creating blocks of transactions so that a new block can be committed to the blockchain. A miner node might be expected to perform some operation that is both complex (to avoid rogue nodes from easily creating improper blocks) and that is dependent on the data of the included transactions (so that a rogue node cannot perform the complex operation ahead of time), where the performance of those tasks is easily verified by other nodes. As those other nodes verify the work of the miner node and, upon verification, they accept the block into their copy of the blockchain and propagate it. This commits the new block to the distributed ledger of the blockchain. In some examples, a block is a group of transactions, often marked with a timestamp and a "fingerprint" (e.g., a hash) of the previous block. In this manner, each block becomes linked to a previous block, thereby creating the "chain" that links the blocks in the blockchain. In embodiments, valid blocks are added to the blockchain by a consensus of the nodes in the blockchain network. Also, in some examples, a blockchain comprises a list of validated blocks.

In an embodiment, at least some of the nodes operate as validating nodes that validate transactions as described in the present disclosure. In some examples, the blockchain evidences value in the form of digital assets and together the transactions of the blockchain provide a chain from a genesis transaction (that starts the blockchain) or from reward transactions that generate newly "mined" digital assets as an incentive to miner node operators, to subsequent transactions. The end of one part of the chain would be an unspent transaction, or portion thereof, and each transaction on the blockchain specifies one or more outputs, some of which might be spent and some unspent, where an output comprises a specification of a value of that output and the requirements needed for someone to "spend" that output by inserting a valid transaction (i.e., one that at least meets the specified requirements) that would extend that part of the chain. As used herein, an unspent transaction output might be referred to as a UTXO.

The requirements needed for someone to spend a UTXO are specified in the locking script of the UTXO. A valid spending transaction would be one that (i) specifies one or more previous UTXOs as the transaction's inputs, where the specification could be with pointers to the UTXOs, (ii) satisfies the requirements of the locking script(s) for each of those UTXOs, and (iii) has inputs such that the sum of the values of all of the UTXOs pointed to by those inputs is less than or equal to the sum of the values of all of the outputs of the transaction. The data representing the satisfaction of the requirements of a locking script can be provided by an unlocking script. A validating node can process the unlocking script, followed by the locking script and an output of that process is either an invalid result or a validation of the spending transaction.

The process can be a stateless process, so that if one node runs that unlocking script and that locking script and the result is a validation that would be the outcome at other nodes. Therefore, a spending transaction that satisfies the locking script of the output of a previous transaction already on the blockchain that has not been already spent will propagate and eventually be committed to the blockchain. The node that created the spending transaction that gets committed would in turn have specified the requirements, in its own locking script(s), that are required for anyone to spend that new transaction's output's value(s). The process is considered stateless in that the scripts need not refer to references outside the script and are not dependent on variables or other state outside of those scripts, with some small exceptions. As a result, an unlocking script and a locking script can be evaluated in isolation.

In other variations, the blockchain system might include functionality that allows for external data to be included in the script evaluation process. In such cases, the external data can be controlled and/or secured in such a way that when an unlocking script and a locking script are evaluated using the external data, the evaluation is consistent across nodes performing the evaluation.

Figure 1B:
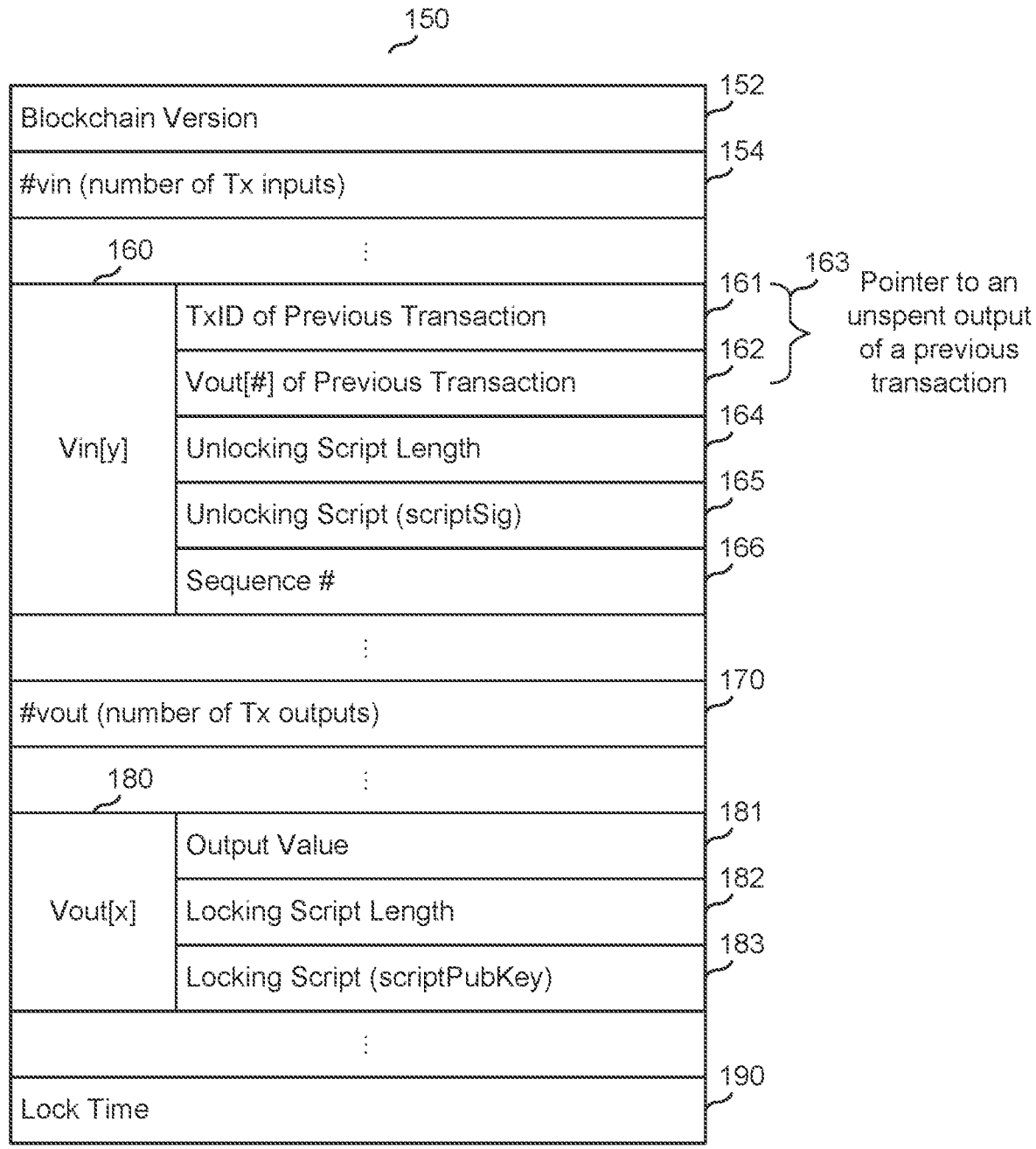
FIG. 1B illustrates an example of a blockchain transaction, specific to a Bitcoin blockchain environment.

FIG. 1B illustrates an example of a transaction 150 as might be stored in a blockchain ledger used by the blockchain nodes 102 of FIG. 1A. Other variations with similar functionality are possible. The data elements or fields of a transaction might be as shown in FIG. 1B and might include additional fields beyond those described in this disclosure. As shown, there is a blockchain version field 152 that has a value to indicate a blockchain protocol version of the transaction 150. A #vin field 154 indicates how many transaction inputs (explained below) are present in the transaction 150. Other fields might be present and not illustrated, but for each transaction input (illustrated here as the example Vin[y] 160), there is a set of fields including a transaction ID (TxID) 161 of a previous transaction, an index number of a transaction output Vout 162 (illustrated here as the example Vout[#] 162) to one of the transaction outputs of that previous transaction (the transaction that supplies the transaction output to match transaction input 160), where the TxID 161 and the index number 162 together form a pointer 163 that references the transaction output of the previous transaction. As used herein, the term "previous transaction" when used in context with respect to a current or present transaction refers to a specific prior transaction (or transactions) having a transaction output that is referred to (and "spent") by the current or present transaction. In examples, the current or present transaction might be referred to as the "spending transaction."

In some blockchain implementations, there is no centralised mechanism for assigning unique TxID values and instead, there is a decentralised mechanism for generating a unique TxID for a transaction, such as by generating a hash of the contents of the transaction itself. Since a valid transaction cannot have all of the exact same content as another valid transaction, each valid transaction will have a unique hash for its TxID (aside from the astronomically low probability of a hash collision). However implemented, it is assumed herein that each transaction has a unique transaction ID. Due to the nature of hashing, once a TxID is generated from a transaction's content, none of that content can be changed and have the TxID remain valid for that transaction.

As shown in FIG. 1B, the set of fields for the transaction input Vin[y] 160 also includes an Unlocking_Script_Length field 164 indicating a length of an unlocking script that follows, an Unlocking_Script field 165 containing an unlocking script (commonly referred to as "scriptSig" in the Bitcoin protocol) for the vin[y] 160 that "unlocks" a corresponding locking script of the transaction output pointed to by the pointer 163, and a sequence #field 166 that might be used to constrain the transaction 150.

Although FIG. 1B only explicitly shows one transaction input and one transaction output, more than one of each are possible. Following the transaction inputs, there is a #vout field 170 that indicates how many transaction outputs (also explained below) are present in the transaction 150. For each transaction output (illustrated here as the example Vout[x] 180), there is a set of fields including an output value field 181 that indicates the transaction value provided by this transaction output Vout[x] 180, a Locking_Script_Length field 182 indicating a length of a locking script that follows, and a Locking_Script_field 183 containing a locking script (commonly referred to as "scriptPubKey" in the Bitcoin protocol) for this transaction output Vout[x] 180. As explained, the transaction value of this transaction output can be "spent" by anyone able to create a spending transaction that has a transaction input that has an unlocking script that a blockchain node will verify as TRUE when performing a verification using that unlocking script and that locking script. Other fields might follow the transaction output fields, such as a lock time field 190 that can constrain the transaction 150 to be not active prior to a specified future time or prior to a specified future block. Where each transaction input of a spending transaction points to a corresponding transaction output of a previous transaction output and the previous transaction output includes the transaction value, the transaction input need not contain a field indicating that transaction value.

In the present disclosure, various script operation codes (or op_codes) and keywords are referenced for performing various operations. The Bitcoin protocol uses a scripting system called "Script" for performing various operations. However, it is contemplated that other blockchain technologies could implement different instruction sets, and therefore the operation codes described in the present disclosure are considered illustrative of the operations performed by the operation code rather than the specific operation code in Script. In some embodiments, the scripting system is a Turing incomplete instruction set (e.g., lacks support for loops, recursion, goto statements, etc.). In other embodiments, the scripting system can be a Turing complete instruction set.

Certain embodiments of the present disclosure can operate under the assumption that the scripting system or other system for implementing the sets of instructions described allow for more than 200 instructions (e.g., operation codes or op_codes) in a single script. Likewise, certain embodiments of the present disclosure further assume that:

the functionality provided by certain low-level operation codes (or low-level bytecode operations) are present and enabled in the system that executes the operation codes scripts/sets of instructions; and/or the functionality provided by certain high-level operation codes (or high-level bytecode operations) can be implemented by the creation of customized functions which are written to provide the desired behavior. These customized functions might be written to implement the functionality of op_codes which are present in the language but have been disabled, or may be "new" op_codes which provide specific functionality not natively provided for in the scripting language.

Examples of low-level operation codes that can be supported by the scripting system include:

OP_1SUB, in which the value "1" is subtracted from the top stack item

OP_2DUP, which duplicates the top two stack items

OP_ADD, which adds the top two items on the stack

OP_CAT, which concatenates the top two items on the stack

OP_CHECKSIG, in which a public key and signature are popped from the stack and verified against a signature of the transaction fields according to the SIGHASH type. If the signature is valid, 1 is returned, 0 otherwise.

OP_CHECKSIGVERIFY, which functions the same as OP_CHECKSIG, but OP_VERIFY is executed afterward OP_DROP, which removes or pops the top item of the stack OP_DUP, which duplicates the top stack item OP_ELSE, which, if the preceding OP_IF or OP_NOTIF or OP_ELSE was not executed, then these statements are executed; otherwise, if the preceding OP_IF or OP_NOTIF or OP_ELSE was executed, then these statements are not executed OP_ENDIF, which ends an if/else block OP_EQUAL, which returns 1 if the inputs are exactly equal, 0 otherwise OP_EQUALVERIFY, which is the same as OP_EQUAL, but runs OP_VERIFY afterward OP_FROMALTSTACK, which puts the input onto the top of the main stack and removes it from the alternate stack OP_HASH256, in which the input is hashed twice: first with SHA-256 and then with RIPEMD-160

OP_IF, which, if the top stack value is not False, the statements are executed and the top stack value is removed OP_LEFT, which keeps only characters left of the specified point in a string OP_MUL, which multiplies the top two items on the stack OP_NOTIF, which, if the top stack value is False, the statements are executed and the top stack value is removed OP_RIGHT, which keeps only characters right of the specified point in a string OP_ROLL, in which the item that is n items deep in the stack is moved to the top OP_ROT, which rotates the top three items on the stack to the left OP_SIZE, which pushes the string length of the top element of the stack (without popping it)

OP_SUBSTR, which returns a section of a string

OP_SWAP, in which the top two items on the stack are swapped

OP_TOALTSTACK, which puts the input onto the top of the alternate stack and removes it from the main stack OP_TUCK, in which the item at the top of the stack is copied and inserted before the second-to-top item OP_VERIFY, which marks the transaction as invalid if top stack value is not true These low-level operation codes are currently supported by the scripting system of the Bitcoin protocol.

Examples of high-level operation codes that can be supported by the methods and systems of the present disclosure include:

OP_ECPX, which returns the x-coordinate of the elliptic curve point

OP_BIGMOD, which returns the remainder after dividing the top two items on the stack OP_BIGMODADD, which performs modulus addition of the top two items of the stack modulus the third item of the stack OP_BIGMODINVERSE, which performs modulus negative exponent operation OP_BIGMODMUL, which performs modulus multiplication of the top two items of the stack modulus third item of the stack OP_DERENCODE, which encodes the top two items on the stack in DER format OP_ECPMULT, which performs elliptic curve point multiplication (also referred to as elliptic curve scalar multiplication) of the top two items on the stack These high-level operation codes can provide specific functionality not natively provided for in the scripting system of the Bitcoin protocol.

The validation of a spending transaction can involve verification of a locking script (scriptPubKey) of the unspent output of a previous transaction pointed to by the pointer 163 of the transaction input Vin[x] 160 of the spending transaction against the unlocking script (scriptSig) 165 of the same transaction input Vin[x] 160 of the spending transaction. In a more general case, each transaction can have multiple inputs and/or multiple outputs, in which case the locking script might be the locking script for one of a plurality of transaction outputs of the previous transaction and the unlocking script might be the unlocking script for one of a plurality of transaction inputs of the spending transaction. Such validation can be performed by stack-based transaction verifier that outputs a TRUE or FALSE result depending on whether its inputs are valid. In other variations, the transaction verifier can refer to external trusted data or state. The teachings here might also apply to blockchain systems that do not use stack-based transaction verifiers.

With a stack-based transaction verifier, the locking script and the unlocking script are processed in isolation and not dependent on variables or other state outside of those scripts, with some small exceptions. As a result, the locking script will not refer to fields of the previous transaction outside of the locking script itself. The locking script also cannot refer to fields of the spending transaction, because the spending transaction did not exist at the time that the previous transaction, and therefore also the locking script, were created and made immutable. Furthermore, the unlocking script cannot operate directly on fields of the spending transaction. These restrictions are useful in that they ensure that any properly programmed blockchain node would come to the same result given that same locking script and the same unlocking script. One exception to this is that a script might have the ability to check a signature in one of the scripts against a signature generated from the transaction as a whole. In an embodiment, scripts can use the OP_CHECKSIG op_code for this purpose.

In a stack-based operation, the transaction verifier executes the unlocking script by processing each op_code in the script in turn. Some op_codes result in processing, some result in data being accessed on a stack, or some combination. Once execution of the unlocking script is complete, there may be data remaining on the stack. If the execution of the unlocking script is without scripting errors or op_codes that terminate execution, the transaction verifier then executes the locking script, which can use that data that is present on the stack. Where the locking script and the unlocking script are written using the same set of op_codes, this is similar in effect to executing a single script comprising a concatenation of the unlocking script followed by the locking script. However, having a check for scripting errors at the end of the execution of the unlocking script's op_codes and before execution of the locking script's op_codes can prevent problems caused by malformed unlocking scripts. Once the execution of the scripts is complete, the result that remains at the top of the stack is the result of the verification. If TRUE is on the top of the stack, that is considered a verification that the unlocking script actually unlocks the locking script. In this regard, the unlocking script satisfies all of the requirements of the locking script.

Note that the locking scripts for the blockchain transactions can impose, via signatures and other cryptographic techniques, constraints on what must be in the corresponding unlocking scripts of the blockchain transactions. One such constraint is that the unlocking script must contain some arbitrary data. Some constraints might be "weak constraints" or more general constraints, such as a constraint that the unlocking script must contain some data that has a length of four bytes, or some specific number of bytes without constraining those bytes to be any particular values. A stronger, or more specific constraint is that the data must produce a specific hash value when the data is hashed. This latter constraint typically requires that the data be of a specific length and be a specific value for the data as it might be nearly impossible for someone to determine a different value that would result in the same hash. The constraint might be implemented in a script by the unlocking script pushing that data onto the stack, or pushing on a hash of that data onto the stack, having the locking script push the needed hash onto the stack and then executing the OP_EQUAL op_code and then the OP_VERIFY op_code. Those op_codes would return true if those two pushed items matched and return false if they did not. In the more general case, constraints can be imposed that require certain data to be present or data with certain characteristics to be present.

An example of a weak constraint is that the unlocking script must include certain data that might comprise the serialized set of spending transaction fields without necessarily requiring that those fields be any specific values. In this manner, a locking script can constrain the script of an unlocking script that unlocks that locking script's output to include fields of the spending transaction from where the unlocking script came. This effectively allows the locking script to perform operations on the fields of the spending transaction that the unlocking script leaves on the stack. Another example of a weak constraint is that the unlocking script must contain certain data, possibly obtained from a specified place, but where there is not a constraint on the value of the data. This allows for some weak constraints that can be imposed even if the value of the data is not determined until well after the locking script is immutable.

The operations of locking scripts and unlocking scripts of blockchain transactions, including specifying certain constraints and the data that the constraints might include, can be used to implement a "smart contract." A smart contract can define terms and conditions of a contract involving who can do what, when they can do it, and who gets paid what and when. Where the terms and conditions can be represented as constraints, weak or strong, on an unlocking script or other parts of a spending transaction, those terms and conditions of a smart contract can be enforced by the blockchain protocol.

In an illustrative example, Alice loans Bob some money and Bob agrees to pay Alice back. The locking scripts and unlocking scripts of a sequence of blockchain transactions can be implemented as a smart contract to represent the payments that Bob makes to Alice. For example, the smart contract could be constructed such that Bob makes a payment to Alice every month for the next three months, and, if a payment is missed, Bob's debt goes into debt collection phase. In the debt collection phase, Alice can release the transaction and turn it over to a debt collector who will collect the debt from Bob. Such a smart contract can be created using variations on the locking scripts and unlocking scripts described herein.

In another example, Alice is a very charitable person who is giving away 1 unit of a digital asset every month. Her rules are that anyone can claim the digital asset, but only 1 unit can be claimed per month. Alice creates a smart contract in the manner described in the present disclosure and seeds it with an initial pool of 3 units of the digital asset. Alice can construct a script that allows any entity to take 1 unit of the digital asset per month, which is replicated to allow the remaining portion of the digital asset to be claimed over a sequence of blockchain transactions for each month.

The unlocking scripts and locking scripts of a sequence of blockchain transactions can embody bytecode sequences that implement a trustless deterministic state machine that represents the states of a smart contract over time. More specifically, the bytecode sequences can be thought of as a computer program that embodies a state machine with a set of state rules and a well-defined set of states, whereby execution of the bytecodes of the bytecode sequences (computer program) provide for transitions between the states of the state machine. Some of the state rules can be quite complex and have multiple paths. In such cases, some of the computations or operations that the bytecode sequences perform can be done concurrently or asynchronously with respect to other computations or operations.

A locking script can contain constraints that are imposed on an unlocking script and can thus require injection of certain data into a spending transaction input's unlocking script, such as serialized fields of the spending transaction itself, serialized fields of the previous transaction that contains the locking script being executed, a current state value, input from a determined source (optional), and execution data that specifies the conditions and operations of the state machine required to calculate a next state from the current state and other inputs.

The locking script can include interpreter code and a sequence of bytecodes. The interpreter code can be configured to incrementally and sequentially interpret and execute the sequence of bytecodes. The execution of the sequence of bytecodes can be seen as to forming a thread of execution, similar to traditional programs. In traditional software programs, new execution threads can be created and later joined together using a Fork-Join Model. This can enable new threads to continue executing until the containing program terminates, the thread is requested to stop, or it naturally finishes executing. The execution program can wait for a thread to finish, and continue execution using a Join operation. The present disclosure adapts this model of execution for use in blockchain transactions in the context of smart contracts. To allow this behaviour, the locking script being interpreted employs certain markers or constructs that allows the interpreter code to determine when the different functionality (including fork, join, and barrier constructs) is required. These constructs support state machines that perform operations or computations concurrently or asynchronously with respect to other computations or operations. The fork construct creates multiple distinct execution paths (or "threads of execution" or "execution threads" or "execution thread instances") from one state or execution path (or "thread of execution" of "execution thread" or "execution thread instance")). The execution threads spawned by the fork construct can be referred to as child execution threads. The one execution thread that spawns the child execution threads can be referred to as a parent execution thread. The fork construct can be used to perform computations or operations in parallel with one another (such as in a common map/reduce workflow) or spawn a new contract. The join construct joins together multiple distinct execution paths (or "threads of execution" or "execution threads" or "execution thread instances") into one execution path (or "thread of execution" or "execution thread" or "execution thread instance"). The one execution thread spawned by the join construct can be referred to as a child execution thread. The multiple execution threads that are joined to form the child execution thread can be referred to as parent execution threads. The join construct can be used to merge together multiple execution threads of a smart contract or construct another smart contract from the results of multiple smart contracts. The barrier construct is used to manage and control communication and cooperation between multiple distinct execution paths (or "threads of execution" or "execution threads" or "execution thread instances").

Figure 2:
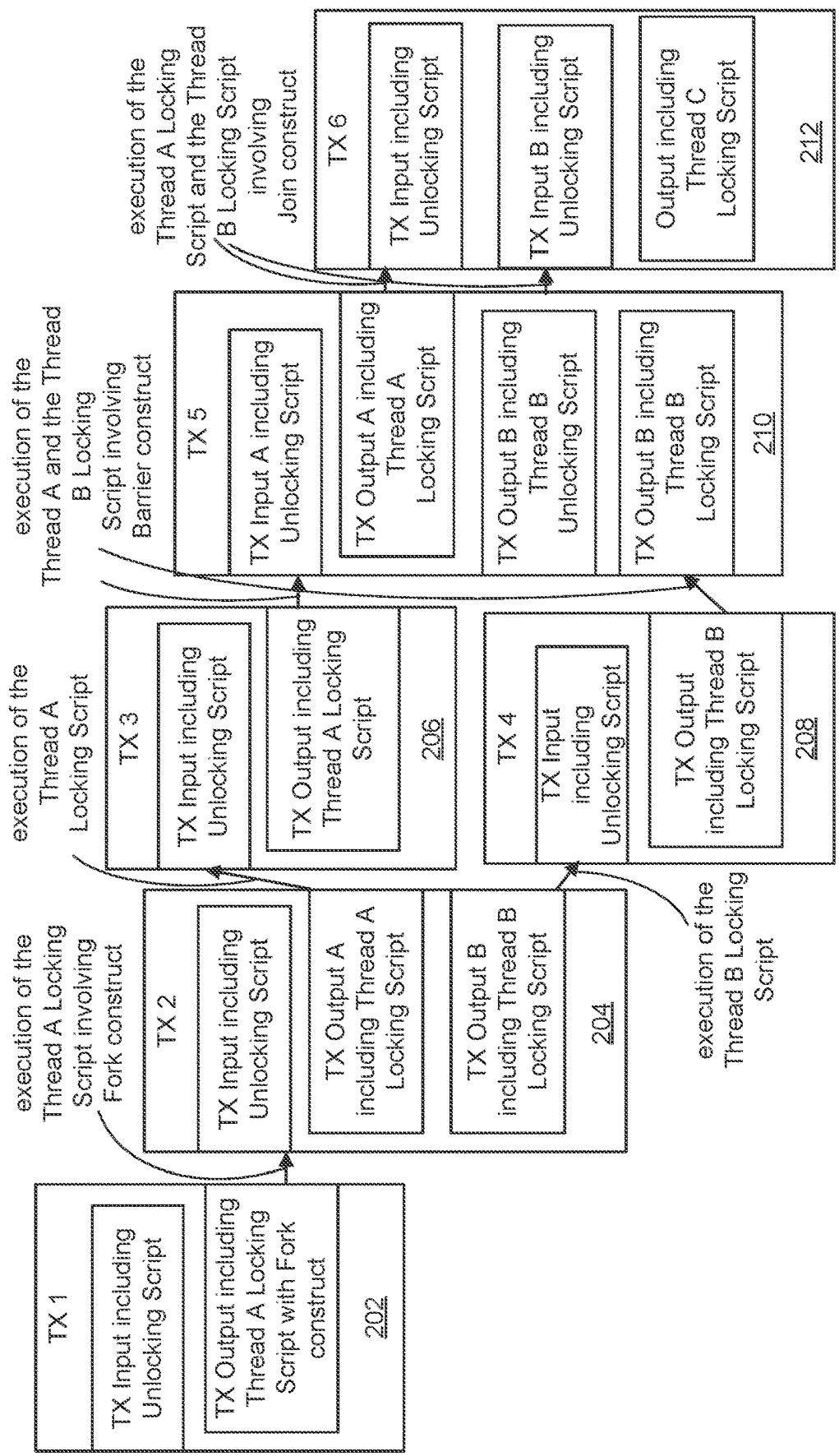

FIG. 2 illustrates an example embodiment of a sequence of blockchain transactions TX1 202, TX2 204, TX3 206, TX4 208, TX5 210, TX6 212. The sequence of blockchain transactions i) forks execution of an execution thread to generate multiple execution threads under control of a fork construct and ii) employs inter-thread communication and cooperation between the multiple execution threads under control of a barrier construct and iii) merges the multiple execution threads under control of a join construct. The execution threads are execution paths of one or more state machines that can be part of a smart contract or parts of different smart contracts.

Note that the blockchain transactions TX3 206 and TX4 208 when committed to the blockchain can represent concurrent or asynchronous execution of the multiple execution threads (e.g., Thread A Locking Script of TX3 206 and the Thread B Locking Script of TX4 208) represented by the sequence of blockchain transactions. This might be useful where a smart contract needs to be executed in multiple concurrent or asynchronous steps. Specifically, over the course of a contract, tasks can sometimes be carried out concurrently or asynchronously in the course of contracting. For example, a contract to build a house might have various stages of completion for tile work and various stages of completion for landscaping, which might be doable in parallel. By allowing the smart contract to employ blockchain transactions that are executed concurrently or asynchronously with respect to one another, distinct fragments of the contact can be executed independently of each other, in an asynchronous way.

The fork construct is encoded as part of the locking script of the blockchain transaction TX1 202. The fork construct forks or clones the execution thread (or execution thread instance) of blockchain transaction TX1 202 through the use of constraints on the locking scripts of the spending blockchain transaction TX2 204. At a transactional level, the fork construct requires that for a given locking script, there needs to be at least two or more locking scripts in the spending blockchain transaction. In the example shown, the fork construct of the locking script of the blockchain transaction TX1 202 supports the creation of multiple execution threads through the corresponding Thread A Locking Script and the Thread B Locking Script of the two transaction outputs of the blockchain transaction TX2 204.

The barrier construct is encoded as part of the Thread A Locking Script of the blockchain transaction TX3 206 and/or the Thread B Locking Script of the blockchain transaction TX4 208. The barrier construct provides for control over inter-thread communication and cooperation between the Thread A Locking Script and the Thread B Locking Script. Such controls can involve constraining an execution thread to be at a specific point of execution, or stalling (waiting) or sleeping the execution of one execution thread (e.g., Thread B Locking Script) until released by another execution thread (e.g., Thread A Locking Script), or other thread synchronization conditions. Such controls can be used to avoid race conditions where the multiple execution threads race against one other to complete their tasks. At a transactional level, the barrier construct requires that, for each one of the thread-specific locking scripts to be managed or controlled, there needs to be a pointer to the thread-specific locking script as well as a corresponding thread-specific locking script in the spending blockchain transaction.

The join construct is encoded as part of the Thread A Locking Script of and/or the Thread B Locking Script and used to create the blockchain transaction TX6 212. The join construct can ensure that the Thread A Locking Script and the Thread B Locking Script have terminated and can combine or merge the resulting execution states of the Thread A Locking Script and the Thread B Locking Script into a single thread of execution (e.g., Thread C Locking Script). This can be useful where the smart contract needs to process the result data produced by the multiple execution threads. At a transactional level, the join construct requires that, for each one of the thread-specific locking scripts to be joined, there needs to be a pointer to the corresponding locking script in the spending blockchain transaction.

FIG. 3A illustrates the creation, validation and mining of the blockchain transaction TX2 204 of FIG. 2 where the locking script of the previous blockchain transaction TX1 202 encodes a fork construct. This exemplary fork construct forks the execution of the Thread A Locking Script of the previous blockchain transaction TX1 202 to generate two execution threads (or execution thread instances) as the locking scripts of the two transaction outputs A, B of the blockchain transaction TX2 204 (e.g., transaction output A includes a continuation of the Thread A Locking Script of the previous blockchain transaction TX1 202, and transaction output B includes a new Thread B Locking Script). In this case, the blockchain transaction TX2 204 is created as shown, which includes a single transaction input and two transaction outputs for the continuation of the Thread A Locking Script and the new Thread B Locking Script. The single transaction input includes an unlocking script for the Thread A Locking Script for the previous blockchain transaction TX1 202. The transaction output A for the continuation of the Thread A Locking Script (or part thereof) is replicated from the transaction output of the previous blockchain transaction TX1 202. The transaction output B for the new Thread B Locking Script is determined from the execution of the fork construct. It is contemplated that there can be different scenarios for new Thread B Locking Script as described below in more detail. Once created, the blockchain transaction TX2 204 is sent or broadcast to the blockchain network for validation. Upon successful validation, the blockchain transaction TX2 204 can be mined by the mining nodes of the blockchain network for storage in the blockchain 300 as shown.

In one scenario (referred to as "Fork with Replicated Threads"), the operations for the new Thread B Locking Script of the transaction output B are replicated from the operations of the Thread A Locking Script. In this case, two distinct execution threads that share the same operations might execute with different input data. This is variant useful in common MapReduce type situations. In this "Fork with Replicated Threads" scenario, the creation and/or validation of the blockchain transaction TX2 204 can involve processing each transaction output of the blockchain transaction TX2 204 to check that the locking script of the transaction output of the blockchain transaction TX2 204 matches the locking scripting of the single transaction output of the previous blockchain transaction TX1 202. If this check fails for any one of the transaction outputs of the blockchain transaction TX2 204, a failure condition can be raised and the blockchain transaction TX2 204 can be deemed invalid. If this check passes, the fork construct can continue where the execution state of the locking script of the transaction output of the blockchain transaction TX2 204 can be checked to ensure that it corresponds to a specified execution state, which can be the same or different for the locking scripts of the transaction outputs of the blockchain transaction TX2 204. If this further check fails for any one of the transaction outputs of the blockchain transaction TX2 204, a failure condition can be raised and the blockchain transaction TX2 204 can be deemed invalid. If this further check passes for all transaction outputs of the blockchain transaction TX2 204 and any additional checks are satisfied, the blockchain transaction TX2 204 can be deemed valid.

In another scenario (referred to as "Fork supporting Distinct Threads"), the operations for the new Thread B Locking Script of output B can be the same of different (or distinct) from the operations of the Thread A Locking Script. In this case, a collection of valid hash values corresponding to valid locking scripts can be statically stored (e.g., as part of the interpreter code of the locking script) or dynamically stored (e.g., in the bytecode sequence being interpreted as part of the locking script). The creation and/or validation of the blockchain transaction TX2 204 can involve determining the hash value for the locking script of the previous blockchain transaction pointed to by the transaction input of the blockchain transaction TX2 204, and adding this hash value to the collection of hash values if desired. Each transaction output of the blockchain transaction TX2 204 is processed to check that hashing the locking script of the transaction output of the blockchain transaction TX2 204 produces a hash value that matches one of the valid hash values of the collection. If this check fails for any one of the transaction outputs of the blockchain transaction TX2 204, a failure condition can be raised and the blockchain transaction TX2 204 can be deemed invalid. If this check passes, the fork construct can continue where the execution state of the locking script of the transaction output of the blockchain transaction TX2 204 can be checked to ensure that it corresponds to a specified execution state, which can be the same or different for the locking scripts of the transaction outputs of the blockchain transaction TX2 204. If this further check fails for any one of the transaction outputs of the blockchain transaction TX2 204, a failure condition can be raised and the blockchain transaction TX2 204 can be deemed invalid. If this further check passes for all the transaction outputs of the blockchain transaction TX2 204 and any additional checks are satisfied, the blockchain transaction TX2 204 can be deemed valid.

Figure 3B:
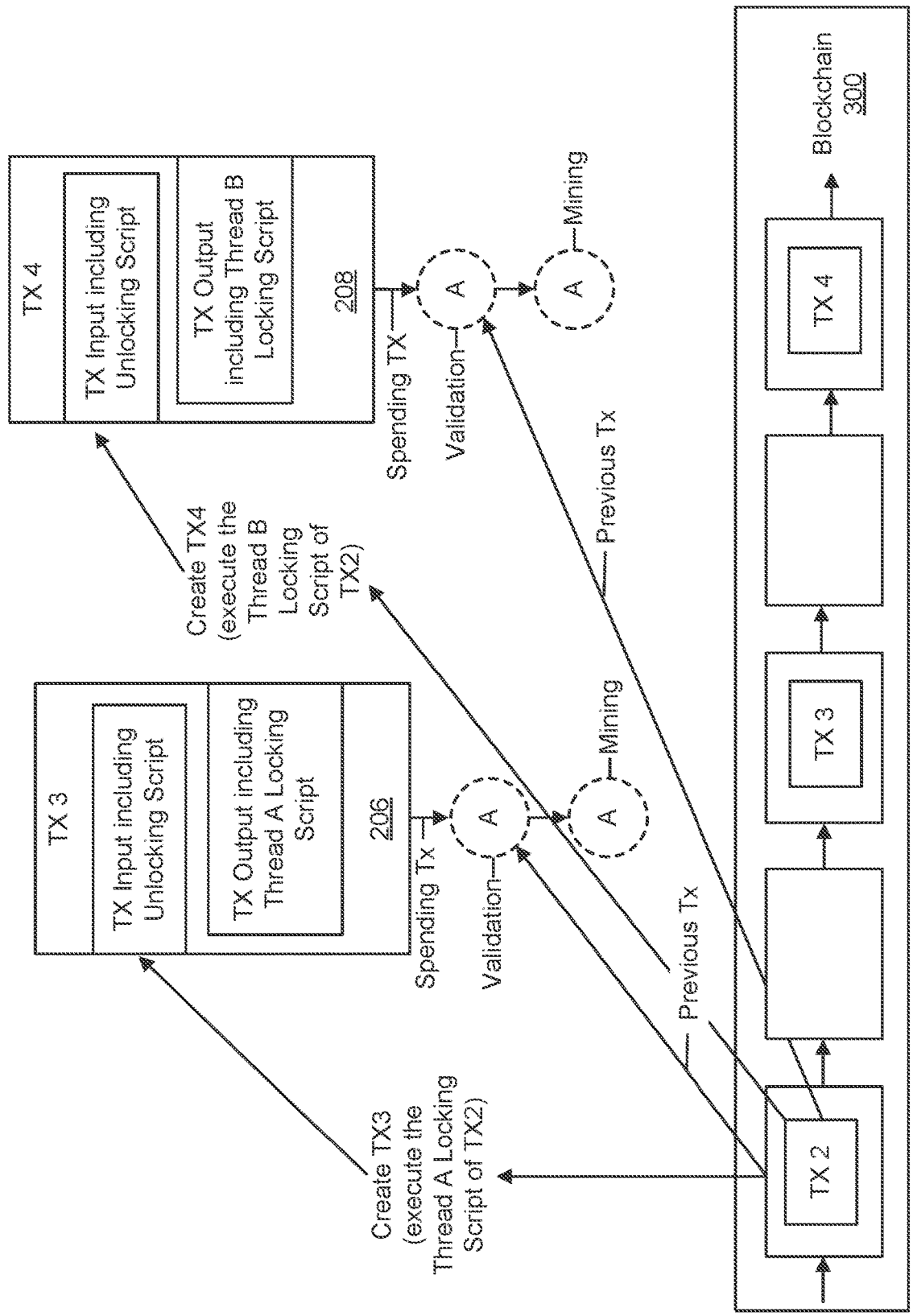

FIG. 3B illustrates the creation, validation and mining of the blockchain transaction TX3 206 of FIG. 2 where execution of the Thread A Locking Script of the previous blockchain transaction TX2 is continued. In this case, the blockchain transaction TX3 206 is created as shown, which includes a single transaction input and a single transaction output that includes the continuation of the Thread A Locking Script. The transaction input includes an unlocking script for the Thread A Locking Script of the previous blockchain transaction TX2. The transaction output for the continuation of the Thread A Locking Script (or part thereof) is replicated from the transaction output of the previous blockchain transaction TX2 for the Thread A Locking Script. Once created, the blockchain transaction TX3 206 is sent or broadcast to the blockchain network for validation. Upon successful validation, the blockchain transaction TX3 206 can be mined by the mining nodes of the blockchain network for storage in the blockchain 300.

In embodiments, the creation and/or validation of the blockchain transaction TX3 206 can involve processing the transaction output of the blockchain transaction TX3 206 to check that the locking script of the transaction output of the blockchain transaction TX3 206 matches the locking script of the transaction output of the previous blockchain transaction TX2 for the Thread A Locking Script. If the check for the transaction output of the blockchain transaction TX3 206 fails, a failure condition can be raised and the blockchain transaction TX3 206 can be deemed invalid. If the check for the transaction output of the blockchain transaction TX3 206 passes, the execution state of the locking script of the transaction output of the blockchain transaction TX3 206 can be checked to ensure that it corresponds to a specified execution state. If this further check fails, and the blockchain transaction TX3 206 can be deemed invalid. If this further check passes and any additional checks are satisfied, the blockchain transaction TX3 206 can be deemed valid.

FIG. 3B also illustrates the creation, validation and mining of the blockchain transaction TX4 208 of FIG. 2 where execution of the Thread B Locking Script of the previous blockchain transaction TX2 continues. In this case, the blockchain transaction TX4 208 is created as shown, which includes a single transaction input and a single transaction output for the continuation of the Thread B Locking Script. The transaction input includes an unlocking script for the Thread B Locking Script for the previous blockchain transaction TX2. The transaction output for the continuation of the Thread B Locking Script (or part thereof) is replicated from the transaction output of the previous blockchain transaction TX2 for the Thread B Locking Script. Once created, the blockchain transaction TX4 208 is sent or broadcast to the blockchain network for validation. Upon successful validation, the blockchain transaction TX4 208 can be mined by the mining nodes of the blockchain network for storage in the blockchain 300.

In embodiments, the creation and/or validation of the blockchain transaction TX4 208 can involve processing the transaction output of the blockchain transaction TX4 208 to check that the locking script of the transaction output of the blockchain transaction TX4 208 matches the locking script of the transaction output of the previous blockchain transaction TX2 for the Thread B Locking Script. If the check for the transaction output of the blockchain transaction TX4 208 fails, a failure condition can be raised and the blockchain transaction TX4 208 can be deemed invalid. If the check for the transaction output of the blockchain transaction TX4 208 passes, the execution state of the locking script of the transaction output of the blockchain transaction TX4 208 can be checked to ensure that it corresponds to a specified execution state. If this further check fails, a failure condition can be raised and the blockchain transaction TX4 208 can be deemed invalid. If this further check passes and any additional checks are satisfied, the blockchain transaction TX4 208 can be deemed valid.

Figure 3C:
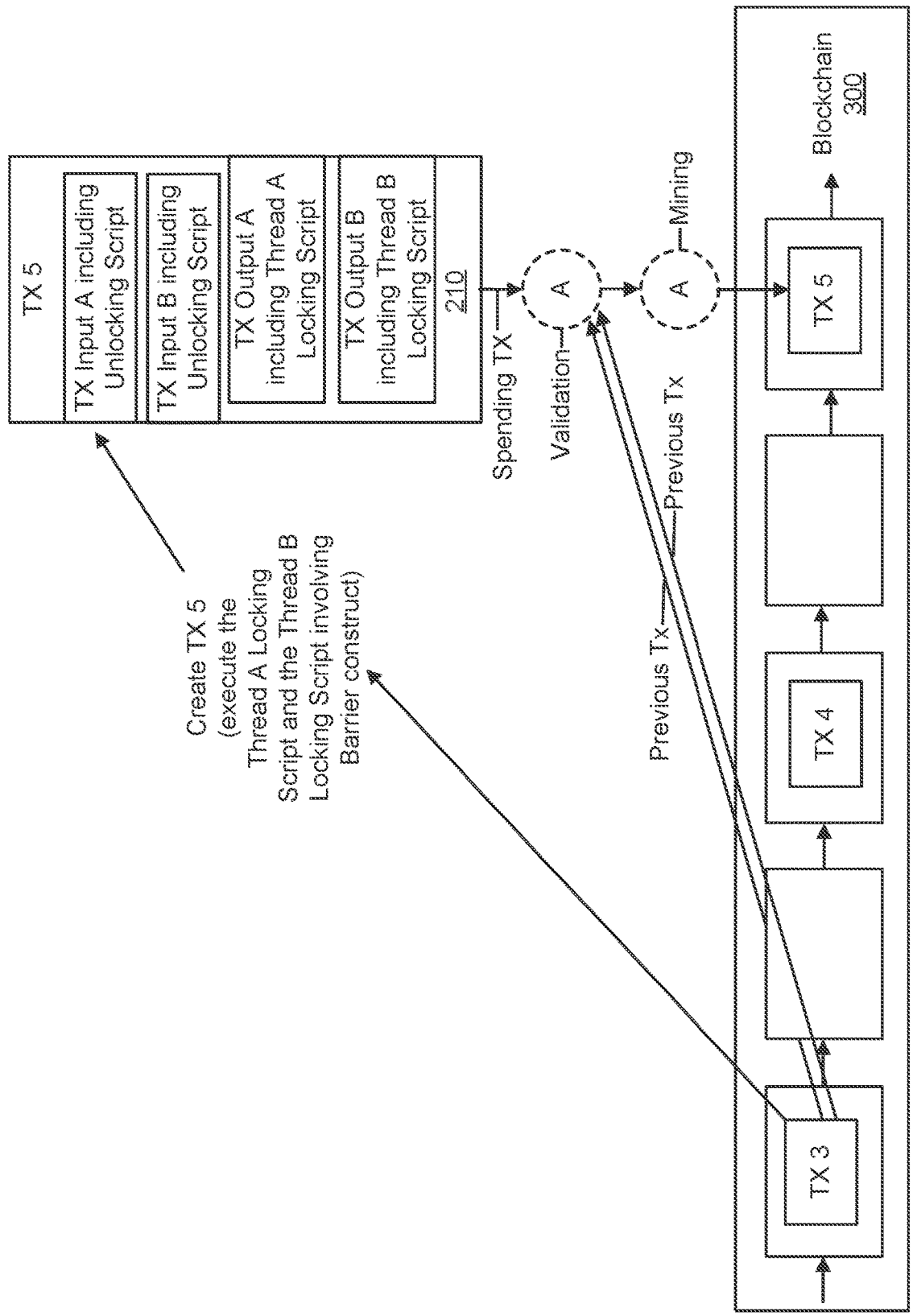

FIG. 3C illustrates the creation, validation and mining of the blockchain transaction TX5 210 of FIG. 2, which involves execution of the Thread A Locking Script of the previous blockchain transaction TX3 and the execution of the Thread B Locking Script of the previous blockchain transaction TX4 under the control of a barrier construct. In this case, the blockchain transaction TX5 210 is created as shown, which includes two transaction inputs (one that includes an unlocking script for the Thread A Locking Script for the previous blockchain transaction TX3 and another that includes an unlocking script for the Thread B Locking Script for the previous blockchain transaction TX4) and two transaction outputs for the Thread A Locking Script and the Thread B Locking Script. The transaction output A for the Thread A Locking Script (or part thereof) is replicated from the transaction output of the previous blockchain transaction TX3. The transaction output B for the Thread B Locking Script (or part thereof) is replicated from the transaction output of the previous blockchain transaction TX4. Once created, the blockchain transaction TX5 210 is sent or broadcast to the blockchain network for validation. Upon successful validation, the blockchain transaction TX5 210 can be mined by the mining nodes of the blockchain network for storage in the blockchain 300.

In embodiments, the creation or validation of the blockchain transaction TX5 210 can involve processing each transaction output of the blockchain transaction TX5 210 to check that the locking script of the transaction output of the blockchain transaction TX5 210 matches the locking script of the corresponding transaction output of the previous blockchain transaction (e.g., TX3 or TX4 in this example). If this check fails for any one of the transaction outputs of the blockchain transaction TX5 210, a failure condition can be raised and the blockchain transaction TX5 210 can be deemed invalid. If this check passes, the barrier construct can continue where the execution state of the locking script of the transaction output of the blockchain transaction TX5 210 can be checked to ensure that it corresponds to a specified execution state. The resultant execution state can be dictated by one or more parameters of the barrier construct. Such parameters can involve constraining a thread for execution to be at a specific point of execution, or stalling (waiting) or sleeping the execution of one thread of execution (e.g., Thread B Locking Script) until released by another thread of execution (e.g., Thread A Locking Script), or other thread synchronization conditions. Such controls can be used to avoid race conditions where the multiple threads of execution race against one other to complete their tasks. If this further check fails for any one of the transaction outputs of the blockchain transaction TX5210, a failure condition can be raised and the blockchain transaction TX5 210 can be deemed invalid. If this further check passes for all transaction outputs of the blockchain transaction TX5 210 and any additional checks are satisfied, the blockchain transaction TX5 210 can be deemed valid.

Figure 3D:
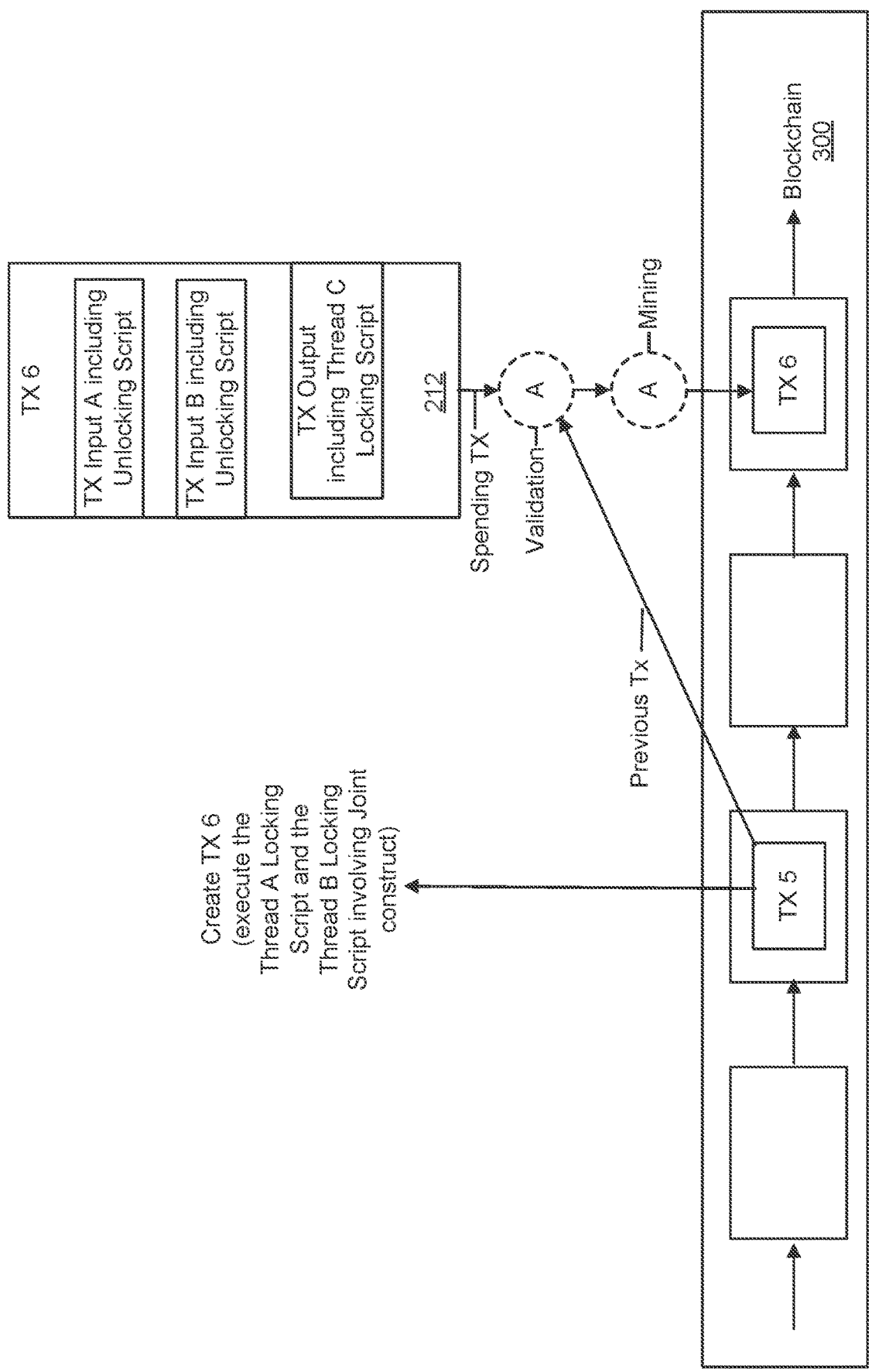

FIG. 3D illustrates the creation, validation and mining of the blockchain transaction TX6 212 of FIG. 2 where multiple execution threads (the Thread A Locking Script and Thread B Locking Script) of the previous blockchain transaction TX5 are joined into a single execution thread (Thread C Locking Script) of the blockchain transaction TX6 212 under control of a join construct. In this case, the blockchain transaction TX6 212 is created as shown, which includes two transaction inputs (one that includes an unlocking script for the Thread A Locking Script of the previous blockchain transaction TX5 and another that includes an unlocking script for the Thread B Locking Script of the previous blockchain transaction TX5) and one transaction output for a new Thread C Locking Script. The transaction output for the Thread C Locking Script can be determined from the execution of the join construct. It is contemplated that there can be different scenarios for the Thread C Locking Script as described below in more detail. Once created, the blockchain transaction TX6 212 is sent or broadcast to the blockchain network for validation. Upon successful validation, the blockchain transaction TX6 212 can be mined by the mining nodes of the blockchain network for storage in the blockchain 300.

In one scenario (referred to as "Join with Replicated Thread"), the operations for the new Thread C Locking Script are replicated from the common operations of the Thread A Locking Script and the Thread B Locking Script. In this scenario, the creation and/or validation of the blockchain transaction TX6 212 can involve processing the single transaction output of the blockchain transaction TX6 212 to check that the locking script of the transaction output matches the locking script for each one of the two transaction outputs (Thread A Locking Script and Thread B Locking Script) of the previous blockchain transaction TX5. If this check fails for any one of the parent locking scripts, a failure condition can be raised and the blockchain transaction TX6 212 can be deemed invalid. If this check passes, the join construct can continue where the Thread A Locking Script and Thread B Locking Script are executed to some statically defined, or dynamically deduced specific positions and then the resultant execution states can be combined or merged to derive an initial execution state for the execution of the Thread C Locking Script to some defined position. If this further check fails, a failure condition can be raised and the blockchain transaction TX6 212 can be deemed invalid. If this further check passes and any additional checks are satisfied, the blockchain transaction TX6 212 can be deemed valid.

In another scenario (referred to as "Join supporting Distinct Thread"), the operations for the new Thread C Locking Script can be the same or different (or distinct) from the operations of the Thread A Locking Script and the Thread B Locking Script. In this case, a collection of valid hash values corresponding to valid locking scripts can be statically stored (e.g., as part of the interpreter code of the locking script) or dynamically stored (e.g., in the bytecode sequence being interpreted as part of the locking script). The creation and/or validation of the blockchain transaction TX6 212 can involve determining the hash values for the Thread A Locking Script and the Thread B Locking Script of the previous blockchain transaction TX5 pointed to by the transaction inputs of the blockchain transaction TX6 212, and adding these hash values to the collection of hash values if desired. The transaction output of the blockchain transaction TX6 212 is processed to check that hashing the locking script of the transaction output of the blockchain transaction TX6 212 produces a hash value that matches one of the valid hash values of the collection. If this check fails, a failure condition can be raised and the blockchain transaction TX6 212 can be deemed invalid. If this check passes, the join construct can continue where the Thread A Locking Script and Thread B Locking Script are executed to some statically defined, or dynamically deduced specific positions and then the resultant execution states can be combined or merged to derive an initial execution state for the execution of the Thread C Locking Script to some defined position. If this further check fails, a failure condition can be raised and the blockchain transaction TX6 212 can be deemed invalid. If this further check passes and any additional checks are satisfied, the blockchain transaction TX6 212 can be deemed valid.

In all of these scenarios for the join construct, the specified execution state of the transaction TX6 212 can ensure that the Thread A Locking Script and/or the Thread B Locking Script have terminated execution and can involve combining or merging the resulting execution states of the Thread A Locking Script and the Thread B Locking Script. This can be useful where the smart contract needs to process the result data produced by the multiple threads of execution.

Figure 4:
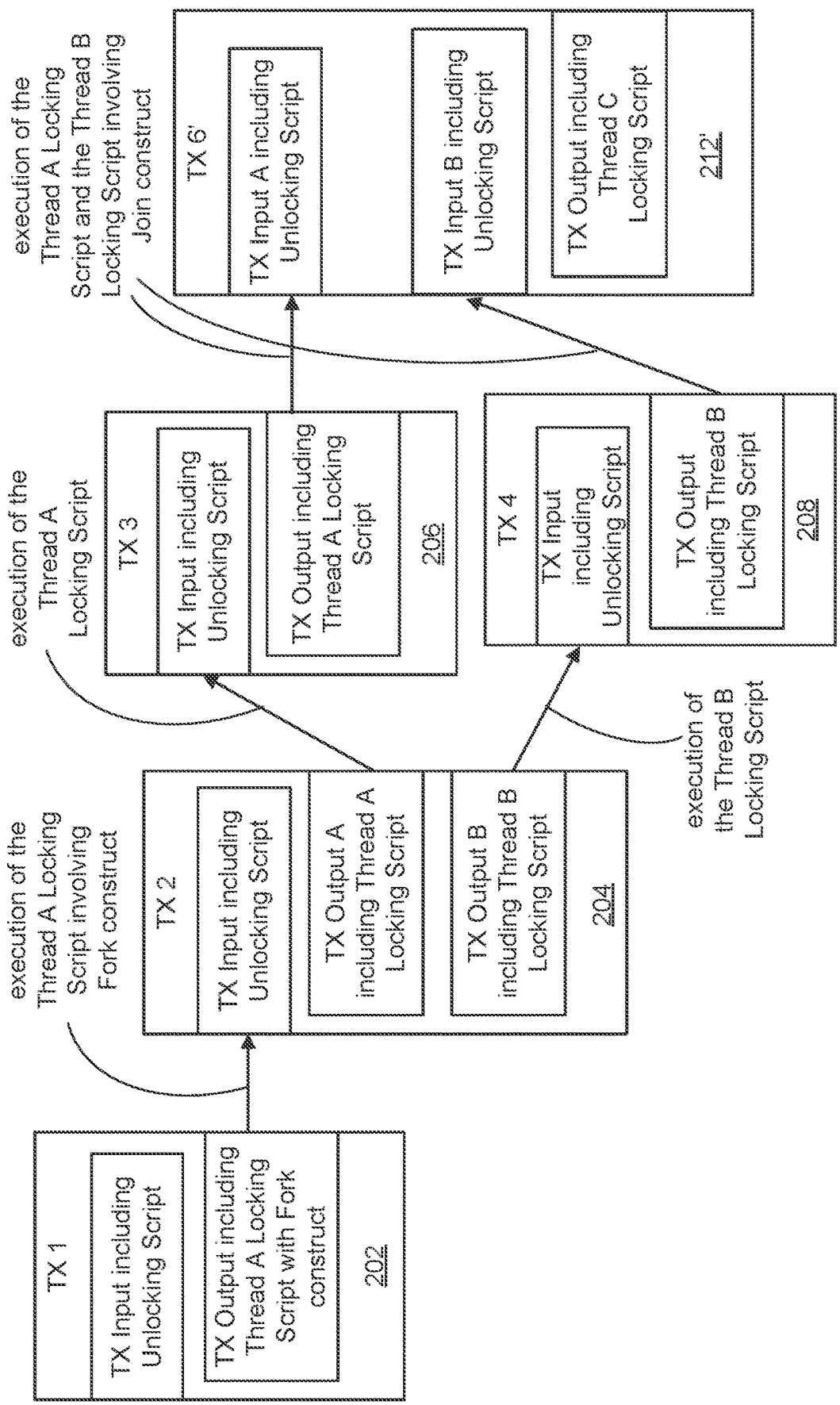
FIGS. 4 and 5 illustrate another sequence of blockchain transactions of a different smart contract, wherein the sequence of blockchain transactions i) forks execution of an execution thread to generate multiple execution threads under control of a fork construct or operation and ii) merges the multiple execution threads under control of a join construct or operation. This sequence of blockchain transactions avoids inter-thread communication and cooperation between the multiple execution threads under control of a barrier construct or operation. Note that the blockchain transactions TX3 and TX4 when committed to the blockchain can represent concurrent or asynchronous execution of the multiple threads of execution (e.g., Thread A Locking Script of TX3 and the Thread B Locking Script of TX4) represented by the sequence of blockchain transactions.

FIG. 4 illustrates another sequence of blockchain transactions of a different smart contract, wherein the sequence of blockchain transactions i) forks execution of an execution thread to generate multiple execution threads under control of a fork construct or operation and ii) merges the multiple execution threads under control of a join construct or operation. This sequence of blockchain transactions avoids inter-thread communication and cooperation between the multiple execution threads under control of a barrier construct or operation.

The blockchain transactions TX1, TX2, TX3, TX4 and TX6' of FIG. 4 can be created, validated and mined as described above with respect to FIGS. 3A-3B. Note that the blockchain transactions TX3 and TX4 when committed to the blockchain can represent concurrent or asynchronous execution of the multiple threads of execution (e.g., Thread A Locking Script of blockchain transaction TX3 and the Thread B Locking Script of blockchain transactionTX4) represented by the sequence of blockchain transactions.

Figure 5:
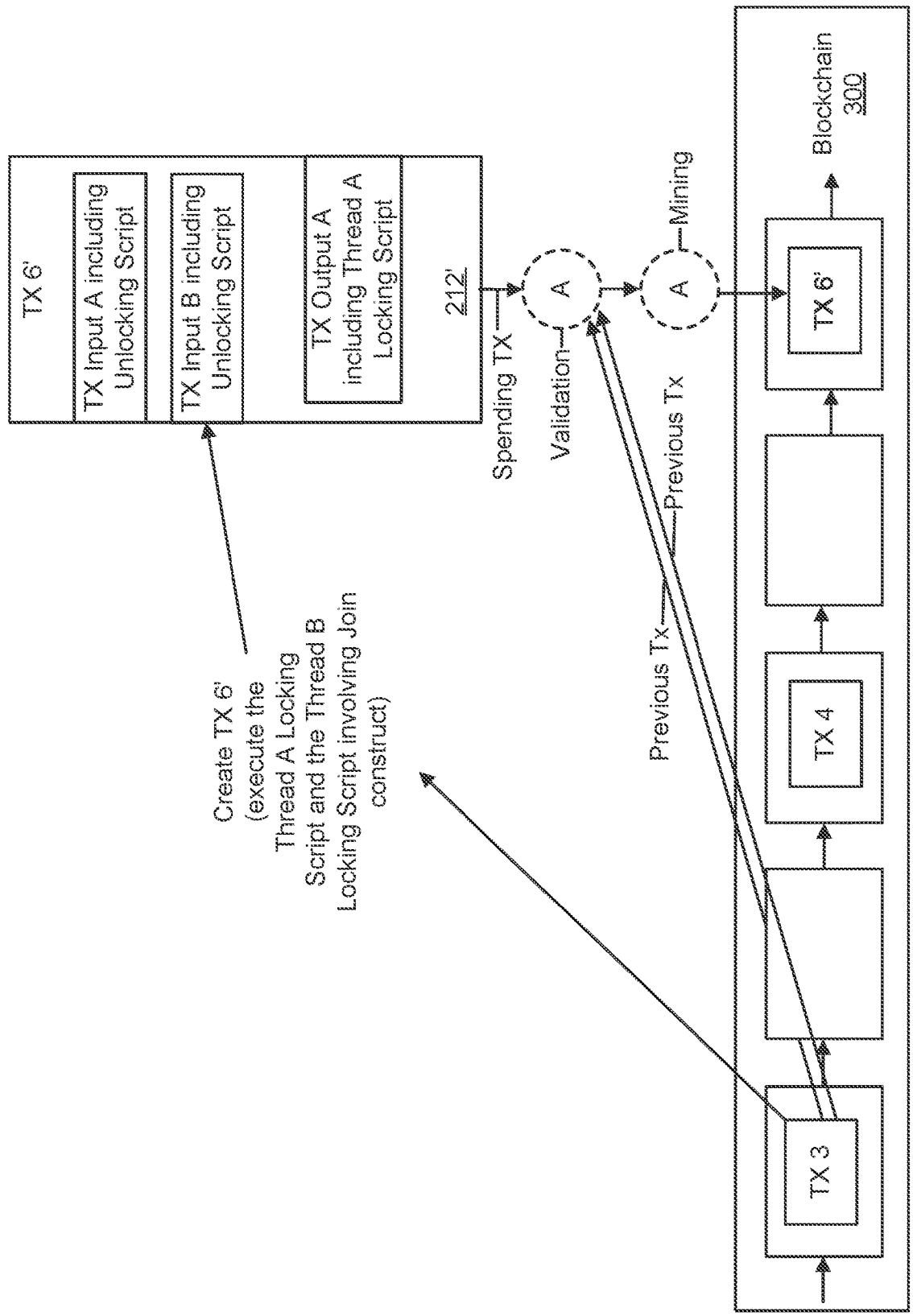

FIG. 5 illustrates the creation, validation and mining of the blockchain transaction TX6' 212' of FIG. 4, where the execution thread of the Thread A Locking Script of the previous blockchain transaction TX3 and the execution thread of the Thread B Locking Script of the previous blockchain transaction TX4 are joined into a single execution thread (Thread C Locking Script) of the blockchain transaction TX6' 212' under control of a join construct. In this case, the blockchain transaction TX6' 212' is created as shown, which includes two transaction inputs (one that includes an unlocking script for the Thread A Locking Script of previous blockchain transaction TX3 and another that includes an unlocking script for the Thread B Locking Script of previous blockchain transaction TX4) and one transaction output for the new Thread C Locking Script. The transaction output for the Thread C Locking Script can be determined from the execution of the join construct. It is contemplated that there can be different scenarios for the Thread C Locking Script as described below in more detail. Once created, the blockchain transaction TX6' 212' is sent or broadcast to the blockchain network for validation. Upon successful validation, the blockchain transaction TX6' 212' can be mined by the mining nodes of the blockchain network for storage in the blockchain 300.

In the "Join with Replicated Thread" scenario, the operations for the Thread C Locking Script are replicated from the common operations of the Thread A Locking Script and the Thread B Locking Script. In this scenario, the validation of the blockchain transaction TX6 can involve processing the single transaction output of the blockchain transaction TX6 to check that the locking script of the transaction output matches the Thread A Locking Script of the transaction output of the previous blockchain transaction TX3 and the Thread B Locking Script of the transaction output of the previous blockchain transaction TX4. If this checks fails for any one of the parent thread locking scripts, a failure condition can be raised and the blockchain transaction TX6' 212' can be deemed invalid. If this check passes, the join construct can continue where the execution state of the locking script of the transaction output of the blockchain transaction TX6' 212' can be checked to ensure that its corresponds to a specified execution state and the execution states of the parent threads of the Thread A Locking Script of the previous blockchain transaction TX3 and the Thread B Locking Script of the previous blockchain transaction TX4 can be merged together. If this further check fails, a failure condition can be raised and the blockchain transaction TX6' 212' can be deemed invalid. If this further check passes and any additional checks are satisfied, the blockchain transaction TX6' 212' can be deemed valid.

In the "Join supporting Distinct Thread" scenario, the operations for the new Thread C Locking Script can be the same or different (or distinct) from the operations of the Thread A Locking Script and the Thread B Locking Script. In this case, a collection of valid hash values corresponding to valid locking scripts can be statically stored (e.g., as part of the interpreter code of the locking script) or dynamically stored (e.g., in the bytecode sequence being interpreted as part of the locking script). The creation and/or validation of the blockchain transaction TX6' 212' can involve determining the hash values for the Thread A Locking Script of the previous blockchain transaction TX3 and the Thread B Locking Script of the previous blockchain transaction TX4 pointed to by the transaction inputs of the blockchain transaction TX6' 212', and adding these hash values to the collection of hash values if desired. The transaction output of the blockchain transaction TX6' 212 ' is processed to check that hashing the locking script of the transaction output of the blockchain transaction TX6' 212' produces a hash value that matches one of the valid hash values of the collection. If this check fails, a failure condition can be raised and the blockchain transaction TX6' 212' can be deemed invalid. If this check passes, the join construct can continue where the execution state of the locking script of the transaction output of the blockchain transaction TX6' 212' can be checked to ensure that it corresponds to a specified execution state and the execution states of the parent threads of the Thread A Locking Script of the previous blockchain transaction TX3 and the Thread B Locking Script of the previous blockchain transaction TX4 can be merged together. If this further check fails, a failure condition can be raised and the blockchain transaction TX6' 212' can be deemed invalid. If this further check passes and any additional checks are satisfied, the blockchain transaction TX6' 212' can be deemed valid.

In all of these scenarios for the join construct, the specified execution state of the transaction TX6' 212' can ensure that the Thread A Locking Script and/or the Thread B Locking Script have terminated execution and can involve combining or merging the resulting execution states of the Thread A Locking Script and the Thread B Locking Script. This can be useful where the smart contract needs to process the result data produced by the multiple threads of execution.

Figure 6:
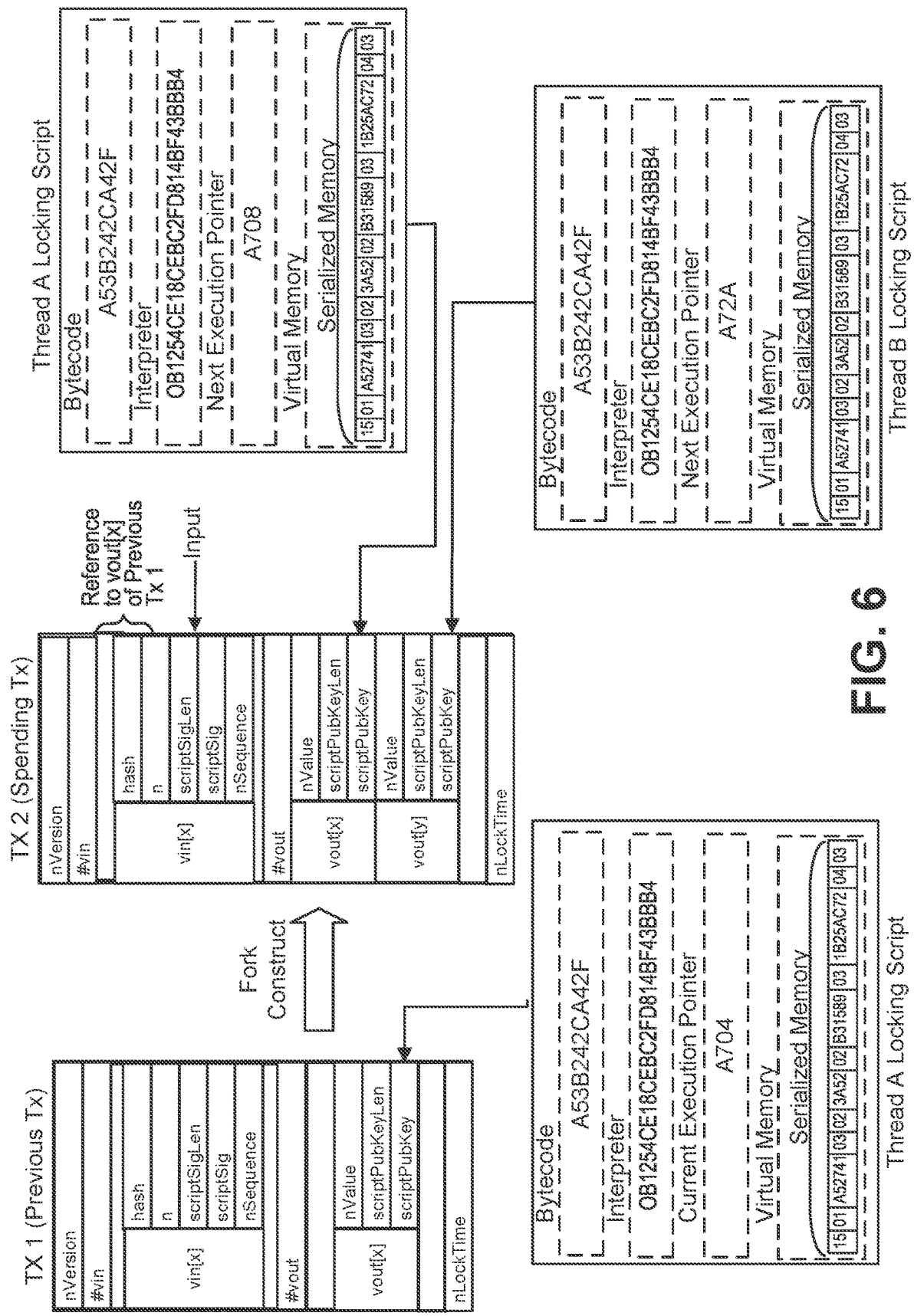
FIG. 6 illustrates the creation, validation and mining of the blockchain transaction TX2 of the sequence of FIGS. 2 and 3A-3D, wherein the resulting blockchain transaction TX2 is a spending transaction that forks execution of an execution thread (i.e., the Thread A Locking Script) that is executed as the locking script of the previous blockchain transaction TX1 to generate multiple execution threads (i.e., continuation of the Thread A Locking Script and a new Thread B Locking Script) under control of a fork construct or operation that is executed as part of a Thread A Locking Script of the previous blockchain transaction TX1. The continuation of the Thread A Locking Script and a new Thread B Locking Script are executed as locking scripts of the spending blockchain transaction TX2.

FIG. 6 illustrates exemplary details of the blockchain transaction TX2 of FIG. 2 where execution of the locking script of the previous blockchain transaction TX1 involves execution of the fork construct. The fork construct forks execution of an execution thread (i.e., the Thread A Locking Script) that is executed as the locking script of the previous blockchain transaction TX1 to generate multiple execution threads (i.e., a continuation of the Thread A Locking Script and a new Thread B Locking Script).

As illustrated schematically, the previous blockchain transaction TX1 has a single transaction input Vin[x] that includes an unlocking script (labeled "scriptSig"). The previous blockchain transaction TX1 also has a transaction output Vout[x] representing a Thread A Locking Script (labeled "scriptPubKey") that includes a bytecode sequence and interpreter code. The bytecode sequence is a computer program that can be thought of as a state machine that embodies a set of state rules with a well-defined set of states, whereby execution of the bytecodes of the bytecode sequence (computer program) provide for transitions between the states of the state machine. The interpreter code supports interpretation of the bytecode sequence of the Thread A Locking Script. The Thread A Locking Script also includes a current state execution pointer (or "current execution pointer") and serialized state data (labeled "virtual memory") that together represent a current state within the states of the state machine represented by the bytecode sequence of the Thread A Locking Script. The current execution pointer included as part of the Thread A Locking Script refers to an execution point of the bytecode sequence corresponding to the current state. The serialized state data includes as part of the Thread A Locking Script represents the state of the state machine represented by the bytecode sequence at the execution point referred to by the current execution pointer included in the Thread A Locking Script.

As can be seen in the example of FIG. 6, the spending blockchain transaction TX2 has a single transaction input Vin[x], and two separate transaction outputs, one Vout[x] representing the Thread A Locking Script and the other Vout[y] representing the Thread B Locking Script. The single transaction input Vin[x] of the spending blockchain transaction TX2 includes a pointer to the transaction output Vout[x] of the previous blockchain transaction TX1 and an unlocking script ("scriptSig") for the Thread A Locking Script of the transaction output Vout[x] of the previous blockchain transaction TX1. Both transaction outputs Vout[x] and Vout[y] include a bytecode sequence and interpreter code. The bytecode sequence and interpreter code of the Thread A Locking Script of Vout[x] of the spending blockchain transaction TX2 can be replicated from bytecode sequence and interpreter code of the Thread A Locking Script of Vout[x] of the previous blockchain transaction TX1.

The Thread A Locking Script of the transaction output Vout[x] of the spending blockchain transaction TX2 also includes a next state execution pointer (or "next execution pointer") and serialized state data (labeled "virtual memory") that together represent a next state within the states of the state machine represented by the bytecode sequence of the Thread A Locking Script. The next execution pointer included as part of the Thread A Locking Script refers to an execution point of the bytecode sequence of the Thread A Locking Script corresponding to this next state. The serialized state data includes as part of the Thread A Locking Script represents the state of the state machine represented by the bytecode sequence at the execution point referred to by the next execution pointer included in the Thread A Locking Script.

Note that the serialized state data that is included in the Thread A Locking Script of the spending blockchain transaction TX2 can be determined when creating the spending blockchain transaction TX2 by generating or accessing the next execution pointer that is included in the Thread A Locking Script of the spending blockchain transaction TX2, using the serialized state data of the Thread A Locking Script of the previous blockchain transaction TX1 to restore the current state of execution of the bytecode sequence of the Thread A Locking Script, and then executing the bytecode sequence of the Thread A Locking Script. Such execution begins at the point (or operation) corresponding to the current execution pointer of the Thread A Locking Script that is included in the previous blockchain transaction TX1 and terminates at the point (or operation) corresponding to the next execution pointer of the Thread A Locking Script. Such execution can also use input determined by execution of the unlocking script ("scriptSig") of Vin[x] of the spending blockchain transaction TX2.

Note that the number of bytecode operations of the Thread A Locking Script of the spending blockchain transaction TX2 that will be executed when creating and validating the spending blockchain transaction TX2 is dictated by the difference between the current execution pointer of the Thread A Locking Script as included in the previous blockchain transaction TX1 and the next execution pointer of the Thread A Locking Script of the spending blockchain transaction TX2. This difference in execution pointers can be varied by design by selecting or varying the next execution pointer of the Thread A Locking Script of the spending blockchain transaction TX2. In this manner, the number of bytecode operations of the Thread A Locking Script of the spending blockchain transaction TX2 that will be executed when creating and validating the spending blockchain transaction TX2 can be either constrained or be used in parameterizing a constraint on the spending transaction. This parameterized constraint can be used to limit the number of bytecode operations executed between transactions (for example, to avoid inefficient operation of the bytecode sequence of the smart contract), to logically partition the bytecode sequence of the smart contract into distinct segments that are executed over a sequence of spending transactions, to calculate a reward for the entity creating the new transaction based on the parameterized constraint, or for other possible uses.

The transaction output Vout[y] of the spending blockchain transaction TX2 for the new Thread B Locking Script is determined from the execution of the fork construct. It is contemplated that there can be different scenarios for new Thread B Locking Script as described below in more detail.

In the "Fork with Replicated Threads" scenario, the bytecode sequence and interpreter code for the new Thread B Locking Script can be replicated from the bytecode sequence and interpreter code of the Thread A Locking Script of Vout[x] of the previous blockchain transaction TX1. In this case, two distinct execution threads (the Thread A Locking Script of Vout[x] of the spending blockchain transaction TX2 and Thread B Locking Script of Vout[y] of the pending blockchain transaction TX2) that share the same operations might execute with different input data. This is variant useful in common MapReduce type situations. In this scenario, the Thread B Locking Script of the transaction output Vout[y] of the spending blockchain transaction TX2 also includes a next state execution pointer (or "next execution pointer") and serialized state data (labeled "virtual memory") that together represent a next state within the states of the state machine represented by the bytecode sequence of the Thread B Locking Script. The next execution pointer included as part of the Thread B Locking Script refers to an execution point of the bytecode sequence of the Thread B Locking Script corresponding to this next state. The serialized state data includes as part of the Thread B Locking Script represents the state of the state machine represented by the bytecode sequence at the execution point referred to by the next execution pointer included in the Thread B Locking Script.

Note that the serialized state data that is included in the Thread B Locking Script of the spending blockchain transaction TX2 can be determined when creating the spending blockchain transaction TX2 by generating or accessing the next execution pointer that is included in the Thread B Locking Script of the spending blockchain transaction TX2, using the serialized state data of the Thread A Locking Script of the previous blockchain transaction TX1 to restore the current state of execution of the bytecode sequence of the Thread B Locking Script, and then executing the bytecode sequence of the Thread B Locking Script. Such execution begins at the point (or operation) corresponding to the current execution pointer of the Thread A Locking Script that is included in the previous blockchain transaction TX1 and terminates at the point (or operation) corresponding to the next execution pointer of the Thread B Locking Script. Such execution can also use input determined by execution of the unlocking script ("scriptSig") of Vin[x] of the spending blockchain transaction TX2.

In the "Fork with Replicated Threads" scenario, the number of bytecode operations of the Thread B Locking Script of the spending blockchain transaction TX2 that will be executed when creating and validating the spending blockchain transaction TX2 can be dictated by the difference between the current execution pointer of the Thread A Locking Script as included in the previous blockchain transaction TX1 and the next execution pointer of the Thread B Locking Script of the spending blockchain transaction TX2. This difference in execution pointers can be varied by design by selecting or varying the execution pointer of the next execution pointer of the Thread B Locking Script of the spending blockchain transaction TX2. In this manner, the number of bytecode operations of the Thread B Locking Script of the spending blockchain transaction TX2 that will be executed when creating and validating the spending blockchain transaction TX2 can be either constrained or be used in parameterizing a constraint on the spending transaction. This parameterized constraint can be used to limit the number of bytecode operations executed between transactions (for example, to avoid inefficient operation of the bytecode sequence of the smart contract), to logically partition the bytecode sequence of the smart contract into distinct segments that are executed over a sequence of spending transactions, to calculate a reward for the entity creating the new transaction based on the parameterized constraint, or for other possible uses.

In the "Fork with Replicated Threads" scenario, the creation and/or validation of the blockchain transaction TX2 can involve processing each transaction output of the spending blockchain transaction TX2 to check that the bytecode sequence and interpreter code (or a hash value of a combination of such data) of the locking script of the given transaction output matches the bytecode sequence and interpreter code (or a hash value of a combination of such data) of the Thread A Locking Script of the single transaction output Vout[x] of the previous blockchain transaction TX1. If this check fails for any one of the transaction outputs, a failure condition can be raised and the blockchain transaction TX2 can be deemed invalid. If this check passes, the fork construct can continue where the execution state of the bytecode sequence of the locking script of the transaction output of the blockchain transaction TX2 can be checked to ensure that it corresponds to a specified execution state, which can be the same or different for the two locking scripts of the transaction outputs of the spending blockchain transaction TX2. If this further check fails for any one of the transaction outputs, a failure condition can be raised and the blockchain transaction TX2 can be deemed invalid. If this further check passes for all the transaction outputs of the spending blockchain transaction TX2 and any additional checks are satisfied, the spending blockchain transaction TX2 can be deemed valid.

Note that in other embodiments, a spending blockchain transaction can include more than two transaction outputs representing more than two child execution threads that are forked from the parent execution thread of the locking script of the previous blockchain transaction. In the "Fork with Replicated Thread" scenario, the locking scripts of the transaction outputs of the spending blockchain transaction represent a plurality of execution threads each replicated from the locking script of the previous blockchain transaction. In embodiments, the locking script for each transaction output can include a number of elements including:

A child thread bytecode sequence to be executed;
    Interpreter code to interpret and execute the child thread bytecode sequence
    Next Execution Pointer representing a position of execution in the child thread bytecode sequence; and
    A copy or snapshot of virtual memory that represents the execution state of the child thread bytecode sequence at the Next Execution Pointer.

In other embodiments, the locking script for each transaction output can include additional or other data elements. Furthermore, the unlocking script ("scriptSig") of the transaction input of the spending blockchain transaction (which points to the parent execution thread of the locking script of the previous blockchain transaction that is forked by the forked construct) can contain the following: i) a copy of part of the spending blockchain transaction itself, and ii) a copy of the previous blockchain transaction pointed to the transaction input. Note that when validating the spending blockchain transaction, the unlocking script is placed first in virtual memory (stack) and thus accessible for use later by the specific interpreter virtual bytecodes of the corresponding locking script. By including these two items as part of the unlocking script ("scriptSig") of the transaction input of the spending blockchain transaction, validation of the spending blockchain transaction and the fork construct can take place.

Table A below provides pseudocode describing a virtual bytecode (VOP_FORK_DUP) of a fork construct that follows the "Fork with Replicated Threads" scenario described herein. The virtual bytecode VOP_FORK_DUP can be included in the bytecode sequence of a locking script and interpreted using the interpreter code included in the locking script to carry out the operations of Table A. The virtual bytecode VOP_FORK_DUP can be interpreted when creating and/or validating a spending blockchain transaction as described herein. In this case, the operations extract the locking script of the previous blockchain transaction as stored in the unlocking script of the transaction input of the spending blockchain transaction and pointed to by the transaction input. The operations loop through the set of transaction outputs of the spending blockchain transaction, which can be represented by a parameter that is statically stored (e.g., as part of the interpreter code of the locking script) or dynamically stored (e.g., in the bytecode sequence being interpreted as part of the locking script). For each transaction output, the operations check that the bytecode sequence and interpreter code (or a hash value for a combination of such data) of the locking script included in the transaction output matches the bytecode sequence and interpreter code (or a hash value for a combination of such data) of the locking script of the previous blockchain transaction as stored in the unlocking script of the transaction input of the spending blockchain transaction. If this check fails for any one of the transaction outputs, a failure condition can be raised and the blockchain transaction can be deemed invalid. If this check passes, the interpretation of the join construct can continue where the Next Execution Pointer for the bytecode sequence of the locking script for the transaction output is checked to be at a specific position. The Next Execution Pointers for the bytecode sequences of the locking scripts for the transaction outputs can be either the same or different. If this further check fails for any one of the transaction outputs, a failure condition can be raised and the blockchain transaction can be deemed invalid. If this further check passes for all transaction outputs and any additional checks are satisfied, the blockchain transaction can be deemed valid. If the validation of the VOP_FORK_DUP virtual bytecode succeeds, the execution of one or more bytecodes of the child thread locking script of the spending blockchain transaction can continue and checked to ensure that is matches the snapshot of virtual memory that represents the execution state of the child thread bytecode sequence at the Next Execution Pointer for validation of the spending blockchain transaction.

TABLE A

// VOP_FORK_DUP

1. Extract the Locking Script of the Previous Tx as stored in the Unlocking Script of the Input of the Spending Tx
2. Loop through set of Outputs in Spending Tx
    // Check forking constraints
    a. Extract Locking Script included in the Output of the Spending Tx
    b. Check that the bytecode sequence and interpreter code (or the hash value for a combination of such data) for the Locking Script included in the Output of the Spending Tx matches the bytecode sequence and interpreter code (or the hash value for a combination of such data) for the Locking Script of the Previous Tx
        i. If false, VOP fails and script fails
    c. Extract Next Execution Pointer for the Locking Script included in the Output of the Spending Tx
    // Check the positions of execution. This can be either be derived by an additional following parameter, or a specific fixed position.
    d. Check Next Execution Pointer == A Specific Position
        i. If false, VOP fails and script fails
3. Continue execution.

In another scenario (referred to "Fork supporting Distinct Threads"), the bytecode sequence and/or interpreter code for the new Thread B Locking Script can be the same or different (or distinct) with respect to the bytecode sequence and interpreter code of the Thread A Locking Script of the previous blockchain transaction T1. In this scenario, a collection of valid hash values corresponding to valid bytecode sequences and interpreter code can be statically stored (e.g., as part of the interpreter code of the locking script) or dynamically stored (e.g., in the bytecode sequence being interpreted as part of the locking script). The Thread B Locking Script of the transaction output Vout[y] of the spending blockchain transaction TX2 also includes a next state execution pointer (or "next execution pointer") and serialized state data (labeled "virtual memory") that together represent a next state within the states of the state machine represented by the bytecode sequence of the Thread B Locking Script. The next execution pointer included as part of the Thread B Locking Script refers to an execution point of the bytecode sequence of the Thread B Locking Script corresponding to this next state. The serialized state data includes as part of the Thread B Locking Script represents the state of the state machine represented by the bytecode sequence at the execution point referred to by the next execution pointer included in the Thread B Locking Script.

In this "Fork supporting Distinct Threads" scenario, the serialized state data that is included in the Thread B Locking Script of the spending blockchain transaction TX2 can be determined when creating the spending blockchain transaction TX2 by generating or accessing the next execution pointer that is included in the Thread B Locking Script of the spending blockchain transaction TX2, initializing the current state of execution of the bytecode sequence of the Thread B Locking Script, and then executing the bytecode sequence of the Thread B Locking Script. Such execution terminates at the point (or operation) corresponding to the next execution pointer of the Thread B Locking Script. Such execution can also use input determined by execution of the unlocking script ("scriptSig") of Vin[x] of the spending blockchain transaction TX2.

In the "Fork supporting Distinct Threads" scenario, the number of bytecode operations of the Thread B Locking Script of the spending blockchain transaction TX2 that will be executed when creating and validating the spending blockchain transaction TX2 can be dictated by the difference between an initial execution pointer of the bytecode sequence of the Thread B Locking Script and the next execution pointer of the Thread B Locking Script of the spending blockchain transaction TX2. This difference in execution pointers can be varied by design by selecting or varying the next execution pointer of the Thread B Locking Script of the spending blockchain transaction TX2. In this manner, the number of bytecode operations of the Thread B Locking Script of the spending blockchain transaction TX2 that will be executed when creating and validating the spending blockchain transaction TX2 can be either constrained or be used in parameterizing a constraint on the spending transaction. This parameterized constraint can be used to limit the number of bytecode operations executed between transactions (for example, to avoid inefficient operation of the bytecode sequence of the smart contract), to logically partition the bytecode sequence of the smart contract into distinct segments that are executed over a sequence of spending transactions, to calculate a reward for the entity creating the new transaction based on the parameterized constraint, or for other possible uses.

In the "Fork supporting Distinct Threads" scenario, the creation and validation of the spending blockchain transaction TX2 can involve determining the hash value for the combination of bytecode sequence and interpreter code of the Thread A Locking Script of the previous blockchain transaction TX1 202, and adding this hash value to the collection set, if need be. The processing then loops through the transaction outputs (Vout[x] and Vout[y]) of the spending blockchain transaction TX2 where each iteration of the loop checks that hashing the combination of the bytecode sequence and interpreter code of the locking script of the particular transaction output produces a hash value that matches one of the valid hash values of the collection. If this check fails for any one of the transaction outputs, a failure condition can be raised and the blockchain transaction can be deemed invalid. If this check passes, the fork construct can continue where the execution state of the bytecode sequence of the locking script of the transaction output can be checked to ensure that it corresponds to a specified execution state. The specified execution states for the bytecode sequences of the locking scripts of the transaction outputs can be the same or different. If this further check fails for any one of the transaction outputs, a failure condition can be raised and the spending blockchain transaction TX2 can be deemed invalid. If these further checks pass and any additional checks are satisfied, the spending blockchain transaction TX2 can be deemed valid.

Note that in other embodiments, a spending blockchain transaction that involves a fork construct can include more than two transaction outputs representing more than two child execution threads that are forked from the parent execution thread of the locking script of the previous blockchain transaction. In the "Fork supporting Distinct Threads" scenario, the locking scripts of the transaction outputs of the spending blockchain transaction represent the distinct execution threads of the spending blockchain transaction. In embodiments, the locking script of each transaction output can include a number of elements including:

A child thread bytecode sequence to be executed;
Interpreter code to interpret and execute the child thread bytecode sequence;
Next Execution Pointer representing a position of execution in the child thread bytecode sequence; and
A copy or snapshot of virtual memory that represents the execution state of the child thread bytecode sequence at the Next Execution Pointer.

In other embodiments, the locking script for each transaction output can include additional or other data elements. Furthermore, the unlocking script ("scriptSig") of the transaction input of the spending blockchain transaction (which points to the parent execution thread of the locking script of the previous blockchain transaction that is forked by the forked construct) can contain the following: i) a copy of part of the spending blockchain transaction itself, and ii) a copy of the previous blockchain transaction pointed to the transaction input. Note that when validating the spending blockchain transaction, the unlocking script is placed first in virtual memory (stack) and thus accessible for use later by the specific interpreter virtual bytecodes of the corresponding locking script. By including these two items as part of the unlocking script ("scriptSig") of the transaction input of the spending blockchain transaction, validation of the spending blockchain transaction and the fork construct can take place.

Table B below provides pseudocode describing a virtual bytecode (VOP_FORK_DISTINCT) of a fork construct that follows the "Fork supporting Distinct Threads" scenario described herein. The virtual bytecode VOP_FORK_DISTINCT can be included in the bytecode sequence of a locking script and interpreted using the interpreter code included in the locking script to carry out the operations of Table B. The virtual bytecode VOP_FORK_DISTINCT can be interpreted when creating and/or validating a spending blockchain transaction as described herein. The operations extract the locking script of the previous blockchain transaction as stored in the unlocking script of the transaction input of the spending transaction. The operations loop through the set of child thread locking scripts (which corresponds to the set of transaction outputs) of the spending blockchain transaction, which can be represented by a parameter that is statically stored (e.g., as part of the interpreter code of the locking script) or dynamically stored (e.g., in the bytecode sequence being interpreted as part of the locking script). The operations read the hash values corresponding to the combination of bytecode sequence and interpreter code of each child thread locking script (or transaction output). In embodiments, these hash values can be statically stored (e.g., as part of the interpreter code of the locking script) or dynamically stored (e.g., in the bytecode sequence being interpreted as part of the locking script). For example, in conjunction with the VOP_FORK_DISTINCT virtual bytecode, the bytes of data that follow the virtual bytecode can specify the set of child thread locking scripts (and thus the set of bytecode sequence/interpreter hash values and corresponding transaction outputs) along with character delimiters used for determining the bounds of the bytecode sequence/interpreter hash values for the set of child thread locking scripts. The operations initialize a collection of hash values corresponding to valid bytecode sequences and interpreter code combinations. This collection of hash values can be represented by data that is statically stored (e.g., as part of the interpreter code of the locking script) or dynamically stored (e.g., in the bytecode sequence being interpreted as part of the locking script). Then, the hash value for the combination of bytecode sequence and interpreter code of the locking script of the previous blockchain transaction is computed and added to the collection. The operations then loop through the set of transaction outputs of the spending blockchain transaction. For each transaction output, the operations extract the locking script from the corresponding output of the spending blockchain transaction, computes the hash value of the combination of bytecode sequence and interpreter code of the extracted locking script, and checks that the computed hash value exists in the collection of hash values. If this check fails for any one of the transaction outputs, a failure condition can be raised and the spending blockchain transaction can be deemed invalid. If this check passes, the fork construct can continue where the execution state of the locking script of the transaction output of the spending blockchain transaction can be checked to ensure that it corresponds to a specified execution state, which can be the same or different for the locking scripts of the transaction outputs of the spending blockchain transaction. If this further check fails for any one of the transaction outputs, a failure condition can be raised and the blockchain transaction can be deemed invalid. If this further check passes for all of the transaction outputs and any additional checks are satisfied, the spending blockchain transaction can be deemed valid. If the validation of the VOP_FORK_DISTINCT virtual bytecode succeeds, the execution of one or more bytecodes of the child thread locking script of the spending blockchain transaction can continue and checked to ensure that is matches the snapshot of virtual memory that represents the execution state of the child thread bytecode sequence at the Next Execution Pointer for validation of the spending blockchain transaction.

In addition, it is also possible to have the child thread bytecode sequences of the outputs of the spending blockchain transaction included in the parent thread bytecode sequence of the previous blockchain transaction. In this case, it is possible to then just check that the child thread bytecode sequence exists in the parent thread bytecode sequence and then continue executing the bytecode sequence from a specific position to which is containing the child thread operations.

TABLE B

// VOP_FORK_DISTINCT

1. Extract the Locking Script of the Previous Tx as stored in the Unlocking Script of the Input of the Spending Tx
2. Initialize collection of hash values corresponding to valid combinations of bytecode sequences and interpreter code
3. Compute the hash value for the combination of bytecode sequence and interpreter code of the Locking Script of the Previous Tx, and add this hash value to the collection of hash values
4. Determine (e.g., from the bytecode sequence of the Locking Script of the Previous Tx) the number of child thread Locking Scripts
5. Loop through the set of child thread Locking Scripts
   a. Determine (e.g., from the parent thread bytecode sequence of the Locking Script of the Previous Tx) the hash value for the combination of bytecode sequence and interpreter code corresponding to the child thread Locking Script, and add this hash value to the collection of hash values
6. Loop through the set of Outputs of the Spending Tx
   // Check forking constraints
   a. Extract the Locking Script from the Output of the Spending Tx
   b. Compute the hash value for the combination of bytecode sequence and interpreter code of the extracted Locking Script
   c. Check that the computed hash value exists in the collection of hash values
      i. If false, VOP fails and script fails
   d. Extract the Next Execution Pointer in the Locking Script of the Output of the Spending Tx
   // Check the positions of execution. This can be either be derived by an additional following parameter, or a specific fixed position.
   e. Check Next Execution Pointer == A Specific Position
      i. If false, VOP fails and script fails
7. Continue execution.

Figure 7:
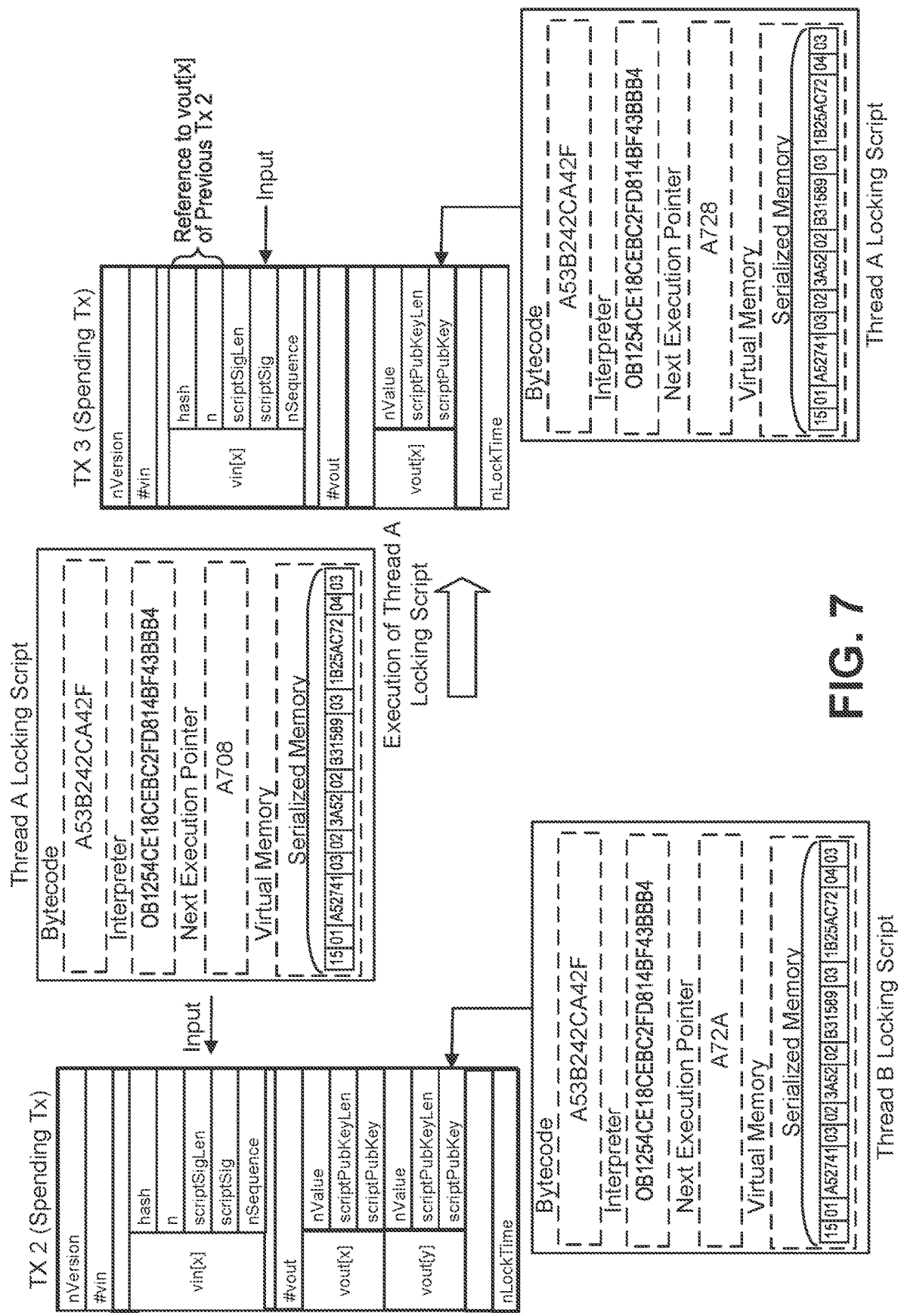
FIG. 7 illustrates the creation, validation and mining of the blockchain transaction TX3 of the sequence of FIGS. 2 and 3A-3D, wherein the resulting blockchain transaction TX3 is a spending transaction with a single execution thread (i.e., the Thread A Locking Script) that logically follows the blockchain transaction TX2 of FIG. 6.

FIG. 7 illustrates exemplary details of the blockchain transaction TX3 of FIG. 2 which continues execution of the Thread A Locking Script of the previous blockchain transaction TX2. As illustrated schematically, the previous blockchain transaction TX2 has a single transaction input Vin[x] and a two separate transaction outputs, one transaction output Vout[x] representing the Thread A Locking Script and the other transaction output Vout[y] representing the Thread B Locking Script. Both transaction outputs include a bytecode sequence and interpreter code. The transaction input Vin[x] of the previous blockchain transaction TX2 includes a pointer to the transaction output Vout[x] of the previous blockchain transaction TX1 and an unlocking script ("scriptSig").

Note that the Thread A Locking Script of the transaction output Vout[x] of the previous blockchain transaction TX2 includes a current state execution pointer (or "current execution pointer") and serialized state data (labeled "virtual memory") that together represent a current state within the states of the state machine represented by the bytecode sequence of the Thread A Locking Script. The current execution pointer included as part of the Thread A Locking Script refers to an execution point of the bytecode sequence of the Thread A Locking Script corresponding to this current state. The serialized state data includes as part of the Thread A Locking Script represents the state of the state machine represented by the bytecode sequence at the execution point referred to by the current execution pointer included in the Thread A Locking Script.

As can be seen in the example of FIG. 7, the spending blockchain transaction TX3 has a single transaction input Vin[x] and a single transaction output Vout[x]. The transaction input Vin[x] includes a pointer to the transaction output Vout[x] of the previous blockchain transaction TX2 and an unlocking script (labeled "scriptSig") for the Thread A Locking Script of the transaction output Vout[x] of the previous blockchain transaction TX2. The transaction output Vout[x] represents the Thread A Locking Script (labeled "scriptPubKey") that includes a bytecode sequence and interpreter code. The interpreter code supports interpretation of the bytecode sequence of the Thread A Locking Script. The bytecode sequence and interpreter code of the Thread A Locking Script of Vout[x] of the spending blockchain transaction TX3 can be replicated from bytecode sequence and interpreter code of the Thread A Locking Script of Vout[x] of the previous blockchain transaction TX2.

The Thread A Locking Script of the spending blockchain transaction TX3 also includes a next state execution pointer (or "next execution pointer") and serialized state data (labeled "virtual memory") that together represent a next state within the states of the state machine represented by the bytecode sequence of the Thread A Locking Script. The next execution pointer included as part of the Thread A Locking Script refers to an execution point of the bytecode sequence of the Thread A Locking Script corresponding to the next state. The serialized state data includes as part of the Thread A Locking Script represents the state of the state machine represented by the bytecode sequence at the execution point referred to by the next execution pointer included in the Thread A Locking Script.

The serialized state data that is included in the Thread A Locking Script of the spending blockchain transaction TX3 can be determined when creating the spending blockchain transaction TX3 by generating or accessing the next execution pointer that is included in the Thread A Locking Script of the spending blockchain transaction TX3, using the serialized state data of the Thread A Locking Script of the previous blockchain transaction TX2 to restore the current state of execution of the bytecode sequence of the Thread A Locking Script, and then executing the bytecode sequence of the Thread A Locking Script. Such execution begins at the point (or operation) corresponding to the current execution pointer of the Thread A Locking Script that is included in the previous blockchain transaction TX2 and terminates at the point (or operation) corresponding to the next execution pointer of the Thread A Locking Script. Such execution can also use input determined by execution of the unlocking script ("scriptSig") of Vin[x] of the spending blockchain transaction TX3.

Note that the number of bytecode operations of the Thread A Locking Script of the spending blockchain transaction TX3 that will be executed when creating and validating the spending blockchain transaction TX3 is dictated by the difference between the current execution pointer of the Thread A Locking Script as included in the previous blockchain transaction TX2 and the next execution pointer of the Thread A Locking Script of the spending blockchain transaction TX3. This difference in execution pointers can be varied by design by selecting or varying the next execution pointer of the Thread A Locking Script of the spending blockchain transaction TX3. In this manner, the number of bytecode operations of the Thread A Locking Script of the spending blockchain transaction TX3 that will be executed when creating and validating the spending blockchain transaction TX3 can be either constrained or be used in parameterizing a constraint on the spending transaction. This parameterized constraint can be used to limit the number of bytecode operations executed between transactions (for example, to avoid inefficient operation of the bytecode sequence of the smart contract), to logically partition the bytecode sequence of the smart contract into distinct segments that are executed over a sequence of spending transactions, to calculate a reward for the entity creating the new transaction based on the parameterized constraint, or for other possible uses.

The creation and/or validation of the spending blockchain transaction TX3 can involve processing the transaction output Vout[x] of the spending blockchain transaction TX3 to check that the bytecode sequence and interpreter code (or a hash of a combination of such data) of the Thread A Locking Script of the transaction output Vout[x] matches the bytecode sequence and interpreter code (or a hash of a combination of such data) of the Thread A Locking Script of the transaction output Vout[x] of the previous blockchain transaction TX2. If this check fails, a failure condition can be raised and the blockchain transaction can be deemed invalid. If this check passes, the operations can continue where execution state of the Thread A Locking Script of the spending blockchain transaction TX3 can be checked to ensure that it corresponds to a specified execution state. If this further check fails, a failure condition can be raised and the blockchain transaction can be deemed invalid. If this further check passes and any additional checks are satisfied, the blockchain transaction can be deemed valid.

Figure 8:
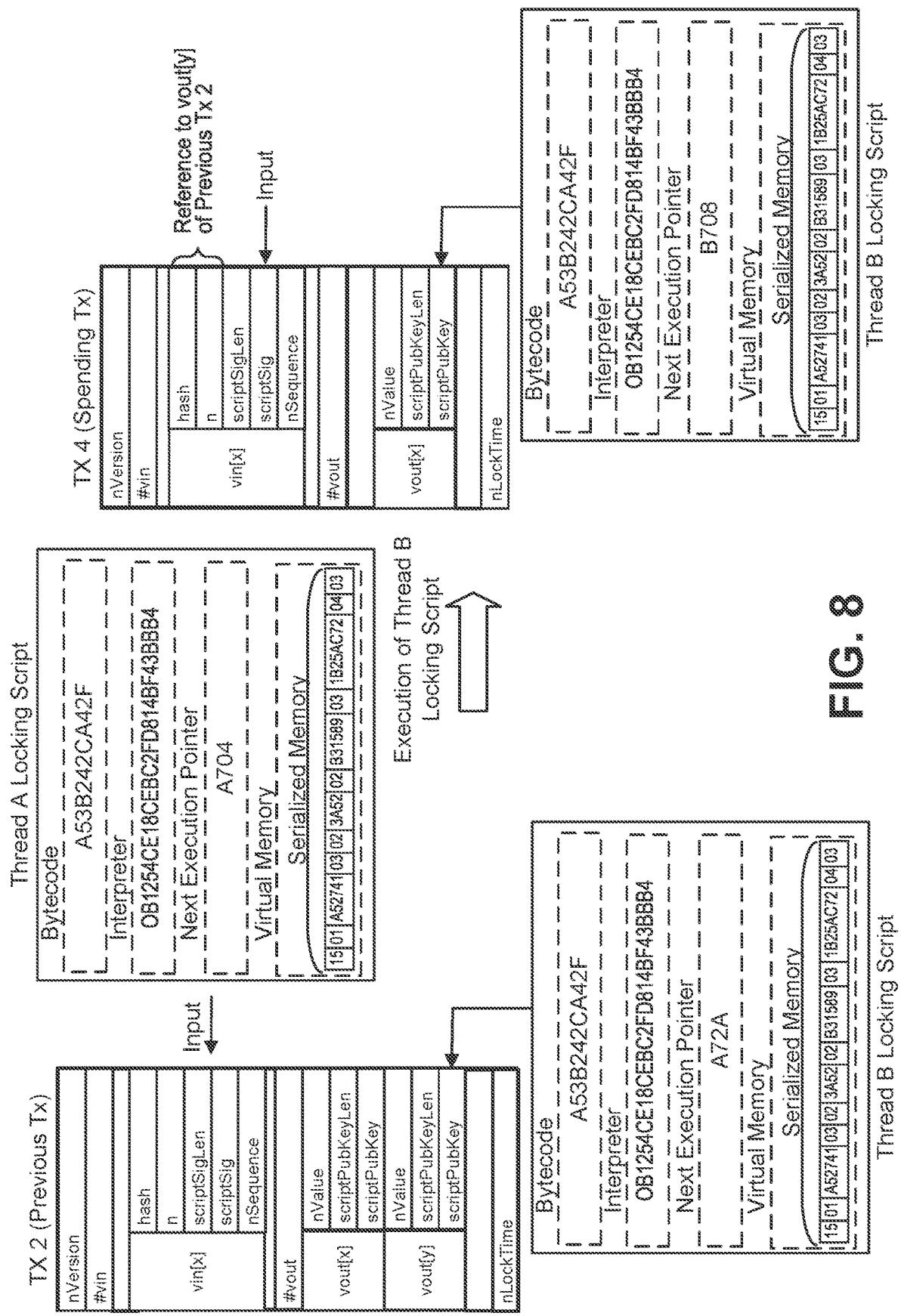
FIG. 8 illustrates the creation, validation and mining of the blockchain transaction TX4 of the sequence of FIGS. 2 and 3A-3D, wherein the resulting blockchain transaction TX4 is a spending transaction with a single execution thread (i.e., the Thread B Locking Script) that logically follows the blockchain transaction TX2 of FIG. 6.

FIG. 8 illustrates exemplary details of the blockchain transaction TX4 of FIG. 2 which continues execution of the Thread B Locking Script of the previous blockchain transaction TX2. As illustrated schematically, the previous blockchain transaction TX2 has a single transaction input Vin[x] and two separate transaction outputs, one transaction output Vout[x] representing the Thread A Locking Script and the other transaction output Vout[y] representing the Thread B Locking Script. Both transaction outputs include a bytecode sequence and interpreter code. The single transaction input Vin[x] of the previous blockchain transaction TX2 includes a pointer to the transaction output Vout[x] of the previous blockchain transaction TX1 and an unlocking script ("scriptSig").

Note that the Thread B Locking Script of the transaction output Vout[y] of the previous blockchain transaction TX2 includes a current state execution pointer (or "current execution pointer") and serialized state data (labeled "virtual memory") that together represent a current state within the states of the state machine represented by the bytecode sequence of the Thread B Locking Script. The current execution pointer included as part of the Thread B Locking Script refers to an execution point of the bytecode sequence of the Thread B Locking Script corresponding to this current state. The serialized state data includes as part of the Thread B Locking Script represents the state of the state machine represented by the bytecode sequence at the execution point referred to by the current execution pointer included in the Thread B Locking Script.

As can be seen in the example of FIG. 8, the spending blockchain transaction TX4 has a single transaction input Vin[x] and a single transaction output Vout[x]. The transaction input Vin[x] includes a pointer to the transaction output Vout[y] of the Thread B Locking Script of the previous blockchain transaction TX2 and an unlocking script (labeled "scriptSig") for the Thread B Locking Script of the previous blockchain transaction TX2. The transaction output Vout[x] represents the Thread B Locking Script (labeled "scriptPubKey") that includes a bytecode sequence and interpreter code. The interpreter code supports interpretation of the bytecode sequence of the Thread B Locking Script. The bytecode sequence and interpreter code of the Thread B Locking Script of Vout[x] of the spending blockchain transaction TX4 can be replicated from bytecode sequence and interpreter code of the Thread B Locking Script of Vout[y] of the previous blockchain transaction TX2.

The Thread B Locking Script of Vout[x] of the spending blockchain transaction TX4 also includes a next state execution pointer (or "next execution pointer") and serialized state data (labeled "virtual memory") that together represent a next state within the states of the state machine represented by the bytecode sequence of the Thread B Locking Script. The next execution pointer included as part of the Thread B Locking Script refers to an execution point of the bytecode sequence of the Thread B Locking Script corresponding to the next state. The serialized state data includes as part of the Thread B Locking Script represents the state of the state machine represented by the bytecode sequence at the execution point referred to by the next execution pointer included in the Thread B Locking Script.

The serialized state data that is included in the Thread B Locking Script of the spending blockchain transaction TX4 can be determined when creating the spending blockchain transaction TX4 by generating or accessing the next execution pointer that is included in the Thread B Locking Script of the spending blockchain transaction TX4, using the serialized state data of the Thread B Locking Script of the previous blockchain transaction TX2 to restore the current state of execution of the bytecode sequence of the Thread B Locking Script, and then executing the bytecode sequence of the Thread B Locking Script. Such execution begins at the point (or operation) corresponding to the current execution pointer of the Thread B Locking Script that is included in the previous blockchain transaction TX2 and terminates at the point (or operation) corresponding to the next execution pointer of the Thread B Locking Script. Such execution can also use input determined by execution of the unlocking script ("scriptSig") of Vin[x] of the spending blockchain transaction TX4.

Note that the number of bytecode operations of the Thread B Locking Script of the spending blockchain transaction TX4 that will be executed when creating and validating of the spending blockchain transaction TX4 is dictated by the difference between the current execution pointer of the Thread B Locking Script as included in the previous blockchain transaction TX2 and the next execution pointer of the Thread B Locking Script of the spending blockchain transaction TX4. This difference in execution pointers can be varied by design by selecting or varying the next execution pointer of the Thread B Locking Script of the spending blockchain transaction TX4. In this manner, the number of bytecode operations of the Thread B Locking Script of the spending blockchain transaction TX4 that will be executed when creating and validating the spending blockchain transaction TX4 can be either constrained or be used in parameterizing a constraint on the spending transaction. This parameterized constraint can be used to limit the number of bytecode operations executed between transactions (for example, to avoid inefficient operation of the bytecode sequence of the smart contract), to logically partition the bytecode sequence of the smart contract into distinct segments that are executed over a sequence of spending transactions, to calculate a reward for the entity creating the new transaction based on the parameterized constraint, or for other possible uses.

The creation and/or validation of the spending blockchain transaction TX4 can involve processing the transaction output Vout[x] of the spending blockchain transaction TX4 to check that the bytecode sequence and interpreter code (or a hash of a combination of such data) of the Thread B Locking Script of the transaction output Vout[x] matches the bytecode sequence and interpreter code (or a hash of a combination of such data) of the Thread B Locking Script of the transaction output Vout[y] of the previous blockchain transaction TX2. If this check fails, a failure condition can be raised and the blockchain transaction can be deemed invalid. If this check passes, the operations can continue where execution state of the Thread B Locking Script of the spending blockchain transaction TX4 can be checked to ensure that it corresponds to a specified execution state. If this further check fails, a failure condition can be raised and the blockchain transaction can be deemed invalid. If this further check passes and any additional checks are satisfied, the blockchain transaction can be deemed valid.

Figure 9A:
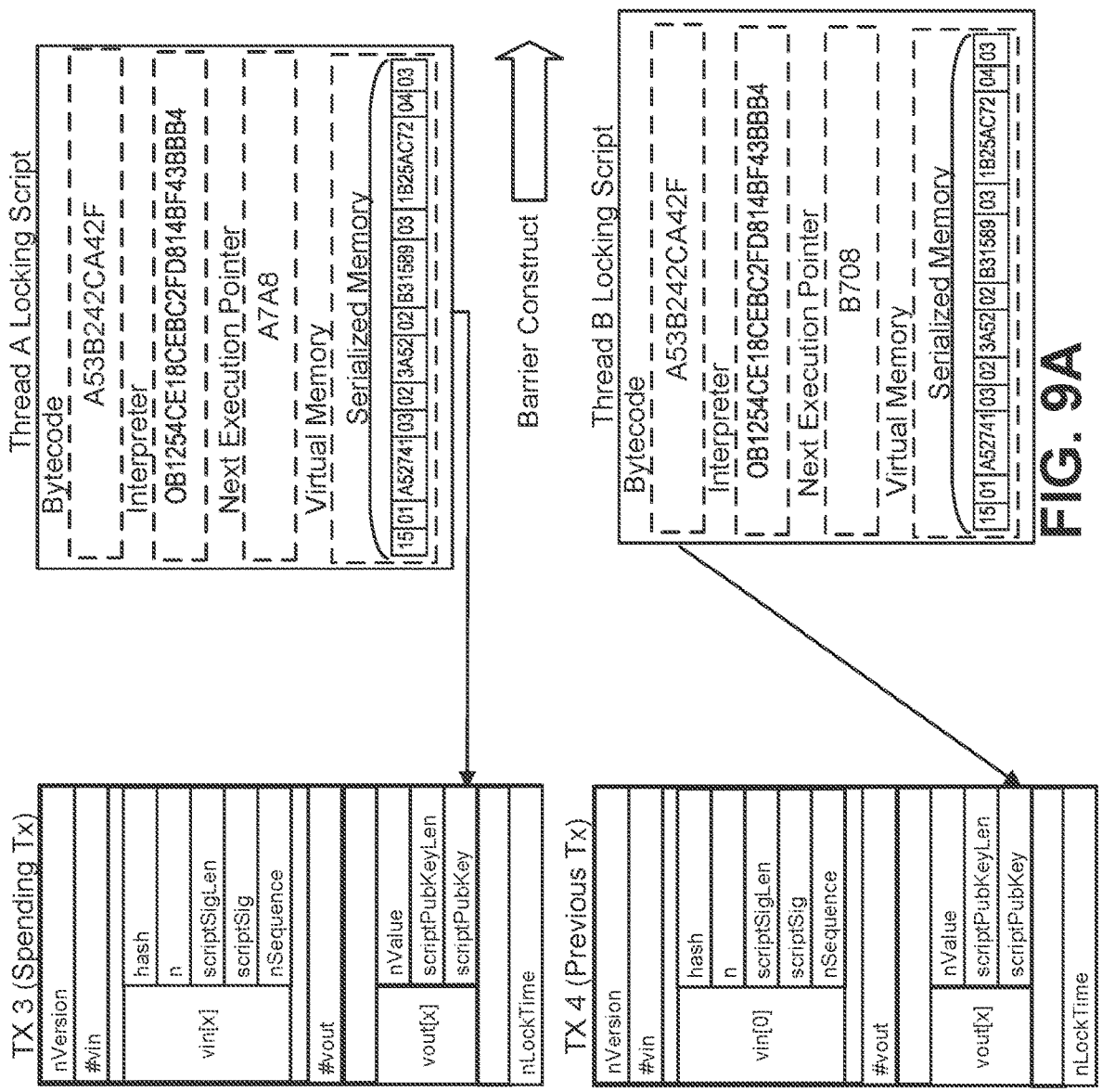
FIG. 9 illustrates the creation, validation and mining of the blockchain transaction TX5 of the sequence of FIGS. 2 and 3A-3D, wherein the resulting blockchain transaction TX5 is a spending transaction with multiple execution threads (i.e., Thread A Locking Script and Thread B Locking Script) that employ inter-thread communication and cooperation between the multiple execution threads under control of a barrier construct or operation that is executed as part of the locking script(s) (i.e., Thread A Locking Script and/or Thread B Locking Script) of the previous blockchain transactions TX3 and TX4.
Figure 9B:
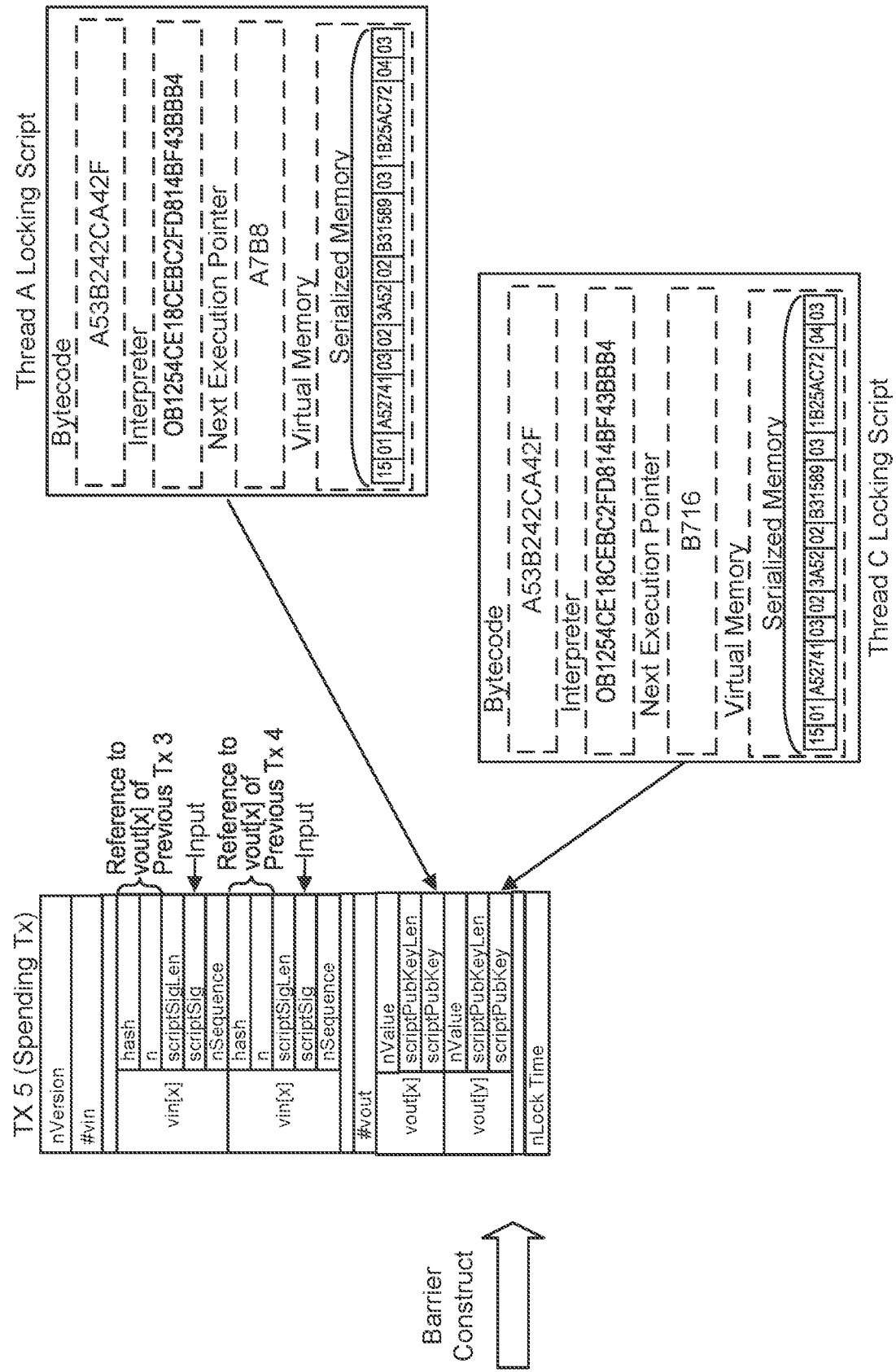

FIG. 9 illustrates exemplary details of the blockchain transaction TX5 of FIG. 2 which continues execution of the Thread A Locking Script of the previous blockchain transaction TX3 and execution of the Thread B Locking Script of the previous blockchain transaction TX4 under control of the barrier construct.

As illustrated schematically, the previous blockchain transaction TX3 has a single transaction input Vin[x] that includes an unlocking script (labeled "scriptSig"). The previous blockchain transaction TX3 also has a transaction output Vout[x] representing the Thread A Locking Script (labeled "scriptPubKey") that includes a bytecode sequence and interpreter code. The interpreter code supports interpretation of the bytecode sequence of the Thread A Locking Script. The Thread A Locking Script also includes a current state execution pointer (or "current execution pointer") and serialized state data (labeled "virtual memory") that together represent a current state within the states of the state machine represented by the bytecode sequence of the Thread A Locking Script. The current execution pointer included as part of the Thread A Locking Script refers to an execution point of the bytecode sequence corresponding to the current state. The serialized state data includes as part of the Thread A Locking Script represents the state of the state machine represented by the bytecode sequence at the execution point referred to by the current execution pointer included in the Thread A Locking Script.

As illustrated schematically, the previous blockchain transaction TX4 has a single transaction input Vin[x] that includes an unlocking script (labeled "scriptSig"). The previous blockchain transaction TX4 also has a transaction output Vout[x] representing the Thread B Locking Script (labeled "scriptPubKey") that includes a bytecode sequence and interpreter code. The interpreter code supports interpretation of the bytecode sequence of the Thread B Locking Script. The Thread B Locking Script also includes a current state execution pointer (or "current execution pointer") and serialized state data (labeled "virtual memory") that together represent a current state within the states of the state machine represented by the bytecode sequence of the Thread B Locking Script. The current execution pointer included as part of the Thread B Locking Script refers to an execution point of the bytecode sequence corresponding to the current state. The serialized state data includes as part of the Thread B Locking Script represents the state of the state machine represented by the bytecode sequence at the execution point referred to by the current execution pointer included in the Thread B Locking Script.

As can be seen in the example of FIG. 9, the spending blockchain transaction TX5 has two separate transaction inputs Vin[x], Vin[y] and two corresponding transaction outputs Vout[x], Vout[y]. The transaction input Vin[x] of the spending blockchain transaction TX5 includes a pointer to the transaction output Vout[x] for the Thread A Locking Script of the previous blockchain transaction TX3 and an unlocking script ("scriptSig") for the Thread A Locking Script of Vout[x] of the previous blockchain transaction TX3. The transaction input Vin[y] of the spending blockchain transaction TX5 includes a pointer to the transaction output Vout[x] for the Thread B Locking Script of the previous blockchain transaction TX4 and an unlocking script ("scriptSig") for the Thread B Locking Script of Vout[x] of the previous blockchain transaction TX3. The transaction output Vout[x] represents the Thread A Locking Script. The transaction output Vout[y] represents the Thread B Locking Script. Both transaction outputs include a bytecode sequence and interpreter code. The interpreter code supports interpretation of the bytecode sequence of the given transaction output.

The bytecode sequence and interpreter code of the Thread A Locking Script of Vout[x] of the spending blockchain transaction TX5 can be replicated from the bytecode sequence and interpreter code of the Thread A Locking Script of Vout[x] of the previous blockchain transaction TX3. The Thread A Locking Script of Vout[x] of the spending blockchain transaction TX5 also includes a next state execution pointer (or "next execution pointer") and serialized state data (labeled "virtual memory") that together represent a next state within the states of the state machine represented by the bytecode sequence of the Thread A Locking Script. The next execution pointer included as part of the Thread A Locking Script refers to an execution point of the bytecode sequence of the Thread A Locking Script corresponding to the next state. The serialized state data includes as part of the Thread A Locking Script represents the state of the state machine represented by the bytecode sequence at the execution point referred to by the next execution pointer included in the Thread A Locking Script.

Note that the serialized state data that is included in the Thread A Locking Script of the spending blockchain transaction TX5 can be determined when creating the spending blockchain transaction TX5 by generating or accessing the next execution pointer that is included in the Thread A Locking Script of the spending blockchain transaction TX5, using the serialized state data of the Thread A Locking Script of the previous blockchain transaction TX3 to restore the current state of execution of the bytecode sequence of the Thread A Locking Script, and then executing the bytecode sequence of the Thread A Locking Script. Such execution begins at the point (or operation) corresponding to the current execution pointer of the Thread A Locking Script that is included in the previous blockchain transaction TX3 and terminates at the point (or operation) corresponding to the next execution pointer of the Thread A Locking Script. Such execution can also use input determined by execution of the unlocking script ("scriptSig") of Vin[x] of the spending blockchain transaction TX5.

Note that the number of bytecode operations of the Thread A Locking Script of the spending blockchain transaction TX5 that will be executed when creating and validating of the spending blockchain transaction TX5 is dictated by the difference between the current execution pointer of the Thread A Locking Script as included in the previous blockchain transaction TX3 and the next execution pointer of the Thread A Locking Script of the spending blockchain transaction TX5. This difference in execution pointers can be varied by design by selecting or varying the next execution pointer of the Thread A Locking Script of the spending blockchain transaction TX5. In this manner, the number of bytecode operations of the Thread A Locking Script of the spending blockchain transaction TX5 that will be executed when creating and validating the spending blockchain transaction TX5 can be either constrained or be used in parameterizing a constraint on the spending transaction. This parameterized constraint can be used to limit the number of bytecode operations executed between transactions (for example, to avoid inefficient operation of the bytecode sequence of the smart contract), to logically partition the bytecode sequence of the smart contract into distinct segments that are executed over a sequence of spending transactions, to calculate a reward for the entity creating the new transaction based on the parameterized constraint, or for other possible uses.

The bytecode sequence and interpreter code of the Thread B Locking Script of Vout[y] of the spending blockchain transaction TX5 can be replicated from the bytecode sequence and interpreter code of the Thread B Locking Script of Vout[x] of the previous blockchain transaction TX4.

The Thread B Locking Script of Vout[y] of the spending blockchain transaction TX5 also includes a next state execution pointer (or "current execution pointer") and serialized state data (labeled "virtual memory") that together represent a next state within the states of the state machine represented by the bytecode sequence of the Thread B Locking Script. The next execution pointer included as part of the Thread B Locking Script refers to an execution point of the bytecode sequence of the Thread B Locking Script corresponding to the next state. The serialized state data includes as part of the Thread B Locking Script represents the state of the state machine represented by the bytecode sequence at the execution point referred to by the next execution pointer included in the Thread B Locking Script.

Note that the serialized state data that is included in the Thread B Locking Script of the spending blockchain transaction TX5 can be determined when creating the spending blockchain transaction TX5 by generating or accessing the next execution pointer that is included in the Thread B Locking Script of the spending blockchain transaction TX5, using the serialized state data of the Thread B Locking Script of the previous blockchain transaction TX4 to restore the current state of execution of the bytecode sequence of the Thread B Locking Script, and then executing the bytecode sequence of the Thread B Locking Script. Such execution begins at the point (or operation) corresponding to the current execution pointer of the Thread B Locking Script that is included in the previous blockchain transaction TX4 and terminates at the point (or operation) corresponding to the next execution pointer of the Thread B Locking Script. Such execution can also use input determined by execution of the unlocking script ("scriptSig") of Vin[y] of the spending blockchain transaction TX5.

Note that the number of bytecode operations of the Thread B Locking Script of the spending blockchain transaction TX5 that will be executed when creating and validating of the spending blockchain transaction TX5 is dictated by the difference between the current execution pointer of the Thread B Locking Script included in the previous blockchain transaction TX4 and the next execution pointer of the Thread B Locking Script of the spending blockchain transaction TX5. This difference in execution pointers can be varied by design by selecting or varying the next execution pointer of the Thread B Locking Script of the spending blockchain transaction TX5. In this manner, the number of bytecode operations of the Thread B Locking Script of the spending blockchain transaction TX5 that will be executed when creating and validating the spending blockchain transaction TX5 can be either constrained or be used in parameterizing a constraint on the spending transaction. This parameterized constraint can be used to limit the number of bytecode operations executed between transactions (for example, to avoid inefficient operation of the bytecode sequence of the smart contract), to logically partition the bytecode sequence of the smart contract into distinct segments that are executed over a sequence of spending transactions, to calculate a reward for the entity creating the new transaction based on the parameterized constraint, or for other possible uses.

Note that execution state of the Thread A Locking Script and/or the execution state of the Thread B Locking Script that results from the execution of these locking scripts during creation and validation of the spending blockchain transaction TX5 can be dictated by one or more parameters of the barrier construct or operation. Such parameters can involve constraining a thread for execution to be at a specific point of execution, or stalling (waiting) or sleeping the execution of one thread of execution (e.g., Thread B Locking Script) until released by another thread of execution (e.g., Thread A Locking Script), or other thread synchronization conditions. Such controls can be used to avoid race conditions where the multiple threads of execution race against one other to complete their tasks.

The creation and/or validation of the blockchain transaction TX5 can involve processing the transaction output Vout[x] of the blockchain transaction TX5 to check that the locking script of the transaction output Vout[x] matches the locking script of the corresponding transaction output Vout[x] of the previous blockchain transaction TX3 for the Thread A Locking Script, and processing the transaction output Vout[y] of the blockchain transaction TX5 to check that the locking script of the transaction output Vout[y] matches the locking script of the corresponding transaction output Vout[x] of the previous blockchain transaction TX4 for the Thread B Locking Script. If the check for any one of the transaction outputs of the blockchain transaction TX5 fails, a failure condition can be raised and the blockchain transaction TX5 can be deemed invalid. If this check passes, the barrier construct can continue where the execution states of the Thread A Locking Script and Thread B Locking Scripts of the transaction outputs of the blockchain transaction TX5 can be checked to ensure that they correspond to specified execution states. The resultant execution state of the Thread A Locking Script and/or the resultant execution state of the Thread B Locking Script can be dictated by one or more parameters of the barrier construct or operation. Such parameters can involve constraining a thread for execution to be at a specific point of execution, or stalling (waiting) or sleeping the execution of one thread of execution (e.g., Thread B Locking Script) until released by another thread of execution (e.g., Thread A Locking Script), or other thread synchronization conditions. Such controls can be used to avoid race conditions where the multiple threads of execution race against one other to complete their tasks. If this further check fails, a failure condition can be raised and the spending blockchain transaction TX5 can be deemed invalid. If this further check passes and any additional checks are satisfied, the spending blockchain transaction TX5 can be deemed valid.

Note that in other embodiments, a spending blockchain transaction that involves a barrier construct can include more than two transaction inputs and corresponding transaction outputs representing more than two execution threads that are managed or controlled. For the spending blockchain transaction that involves the barrier construct, the locking scripts of the transaction outputs of the spending blockchain transaction represent the resultant execution threads. In embodiments, the locking script for each transaction output can contain a number of elements including:

A thread bytecode sequence to be executed;
Interpreter code to interpret and execute the thread bytecode sequence;
Next Execution Pointer representing a position of execution in the thread bytecode sequence; and
A copy or snapshot of virtual memory that represents the execution state of the thread bytecode sequence at the Next Execution Pointer.

In other embodiments, the locking script for each transaction output can include additional or other data elements. Furthermore, the unlocking scripts ("scriptSig") of the transaction inputs of the spending blockchain transaction (which point to the multiple execution threads of the locking scripts of the previous blockchain transactions that are the subject of the barrier construct) each contain the following: i) a copy of part of the spending blockchain transaction itself, and ii) a copy of the previous blockchain transaction pointed to the respective transaction input. Note that when validating the spending blockchain transaction, the unlocking script is placed first in virtual memory (stack) and thus accessible for use later by the specific interpreter virtual bytecodes of the corresponding locking script. By including these two items as part of the unlocking scripts ("scriptSig") of the transaction inputs of the spending blockchain transaction, validation of the spending blockchain transaction and the barrier construct can take place.

Table C below provides pseudocode describing a virtual bytecode (VOP_BARRIER) of a barrier construct as described herein. The virtual bytecode VOP_BARRIER can be included in the bytecode sequence of a locking script and interpreted using the interpreter code included in the locking script to carry out the operations of Table C. The virtual bytecode VOP_BARRIER can be interpreted when creating and/or validating a spending blockchain transaction as described herein. Note that the barrier construct can constrain another thread to be a specific point or further in its execution for the execution of that thread to continue. If the validation of the VOP_BARRIER virtual bytecode succeeds, the execution of one or more bytecodes of the child thread locking scripts for the respective transaction outputs of the spending blockchain transaction can continue and checked to ensure that is matches the snapshot of virtual memory that represents the execution state of the child thread bytecode sequence at the Next Execution Pointer for validation of the spending blockchain transaction.

TABLE C

// VOP_BARRIER

1. Loop through set of Input/Output Index Pairs in Spending Tx
   a. Extract the Locking Script of the Previous Tx as stored in the Unlocking Script of the corresponding Input of the Spending Tx
   b. Extract the Locking Script for the corresponding Output of the Spending Tx
   c. Check that the bytecode sequence and interpreter code (or a hash value of a combination of such data) of the Locking Script for the corresponding Output of the Spending Tx matches the bytecode sequence and interpreter code (or hash value of a combination of such data) of the Locking Script of the Previous Tx as stored in the Unlocking Script of the corresponding Input
     i. If false, script fails
   d. Extract Current State of Previous Tx and append to list of Current States
// Check the positions of execution. This can be either be derived by an additional following parameter, or a specific fixed position.
2. Loop through set of Outputs in Spending Tx
   a. Extract Locking Script of the corresponding Output of the Spending Tx
   b. Determine Next Execution Pointer from Current Execution Pointer and State Data of Previous Tx
   c. Check Next Execution Pointer == Next Execution Pointer in the Locking Script of the Spending Tx
     i. If false, script fails
3. Continue execution.

Figure 10:
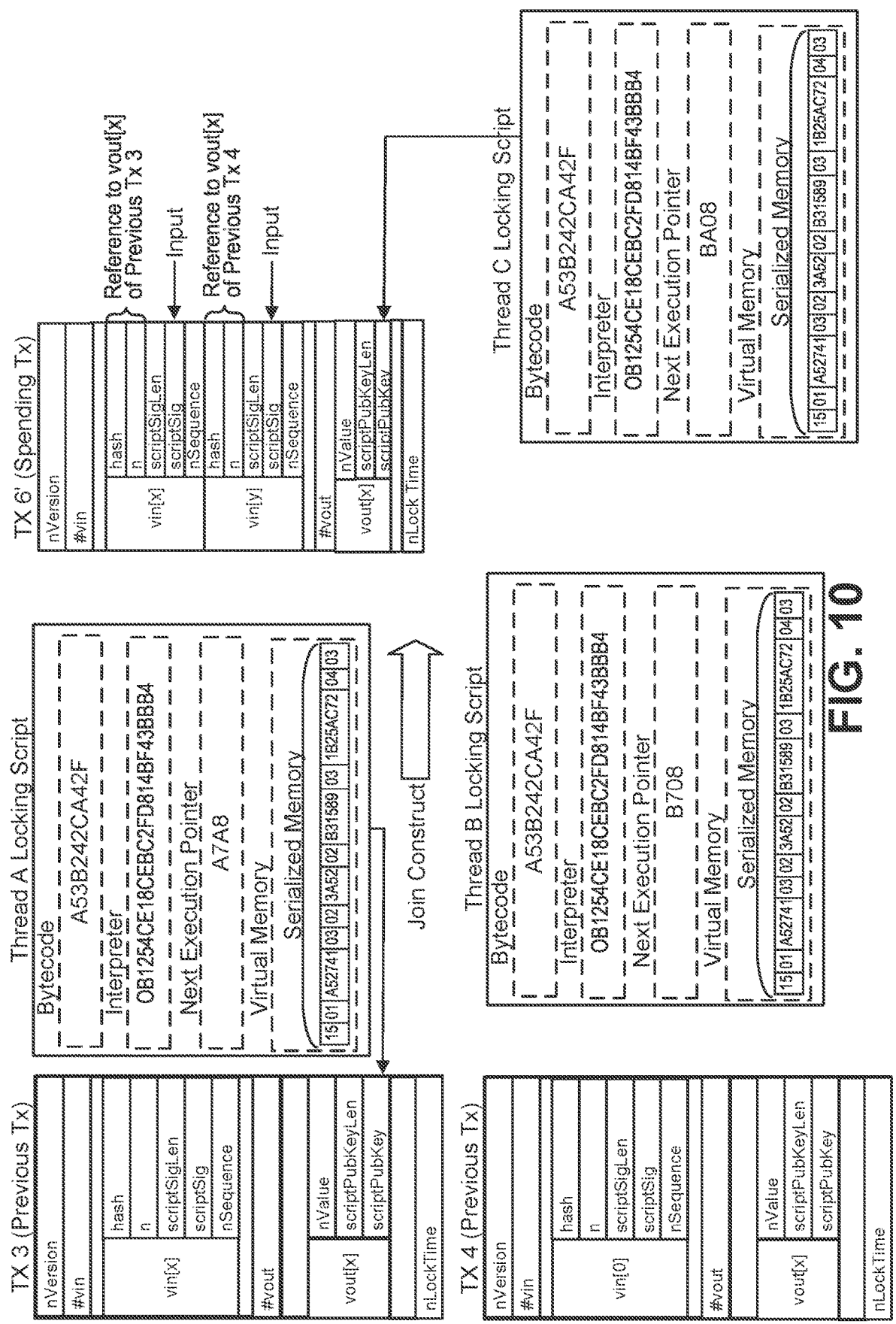
FIG. 10 illustrates the creation, validation and mining of the blockchain transaction TX6' of the sequence of FIGS. 4 and 5, wherein the resulting blockchain transaction TX6' is a spending transaction with a single execution thread (e.g., Thread C Locking Script) that is executed under control of a join construct or operation that is executed as part of the locking script(s) (e.g., Thread A Locking Script and/or Thread B Locking Script) of the previous blockchain transactions TX3 and TX4. The new Thread C Locking Script is executed as the locking script of the spending blockchain transaction TX6'.

FIG. 10 illustrates exemplary details of the blockchain transaction TX6' 212' of FIG. 5 which joins execution of the Thread A Locking Script of the previous blockchain transaction TX3 and execution of the Thread B Locking Script of the previous blockchain transaction TX4 under control of a join construct as described herein.

As illustrated schematically, the previous blockchain transaction TX3 has a single transaction input Vin[x] that includes an unlocking script (labeled "scriptSig"). The previous blockchain transaction TX3 also has a transaction output Vout[x] representing the Thread A Locking Script (labeled "scriptPubKey") that includes a bytecode sequence and interpreter code. The interpreter code supports interpretation of the bytecode sequence of the Thread A Locking Script. The Thread A Locking Script of the transaction output Vout[x] also includes a current state execution pointer (or "current execution pointer") and serialized state data (labeled "virtual memory") that together represent a current state within the states of the state machine represented by the bytecode sequence of the Thread A Locking Script. The current execution pointer included as part of the Thread A Locking Script refers to an execution point of the bytecode sequence corresponding to the current state. The serialized state data includes as part of the Thread A Locking Script represents the state of the state machine represented by the bytecode sequence at the execution point referred to by the current execution pointer included in the Thread A Locking Script.

As illustrated schematically, the previous blockchain transaction TX4 has a single transaction input Vin[x] that includes an unlocking script (labeled "scriptSig"). The previous blockchain transaction TX4 also has a transaction output Vout[x] representing the Thread B Locking Script (labeled "scriptPubKey") that includes a bytecode sequence and interpreter code. The interpreter code supports interpretation of the bytecode sequence of the Thread B Locking Script. The Thread B Locking Script of the transaction output Vout[x] also includes a current state execution pointer (or "current execution pointer") and serialized state data (labeled "virtual memory") that together represent a current state within the states of the state machine represented by the bytecode sequence of the Thread B Locking Script. The current execution pointer included as part of the Thread B Locking Script refers to an execution point of the bytecode sequence corresponding to the current state. The serialized state data includes as part of the Thread B Locking Script represents the state of the state machine represented by the bytecode sequence at the execution point referred to by the current execution pointer included in the Thread B Locking Script.

As can be seen in the example of FIG. 10, the spending blockchain transaction TX6' 212' has two separate transaction inputs Vin[x], Vin[y] for the two threads to be joined and one transaction output Vout[x] that represents the Thread C Locking Script. The transaction input Vin[x] of the spending blockchain transaction TX6' 212' includes a pointer to the transaction output Vout[x] for the Thread A Locking Script of Vout[x] of the previous blockchain transaction TX3 and an unlocking script ("scriptSig") for the Thread A Locking Script of Vout[x] of the previous blockchain transaction TX3. The transaction input Vin[y] of the spending blockchain transaction TX6' 212' includes a pointer to the transaction output Vout[x] for the Thread B Locking Script of Vout[x] of the previous blockchain transaction TX4 and an unlocking script ("scriptSig") for the Thread B Locking Script of Vout[x] of the previous blockchain transaction TX4.

The transaction output Vout[x] of the spending blockchain transaction TX6' 212' includes a bytecode sequence and interpreter code. The interpreter code supports interpretation of the bytecode sequence of the Thread C Locking Scrip of the transaction output Vout[x]. The Thread C Locking Script of Vout[x] of the spending blockchain transaction TX6' 212' also includes a next state execution pointer (or "current execution pointer") and serialized state data (labeled "virtual memory") that together represent a next state within the states of the state machine represented by the bytecode sequence of the Thread C Locking Script. The next execution pointer included as part of the Thread C Locking Script refers to an execution point of the bytecode sequence of the Thread C Locking Script corresponding to the next state. The serialized state data includes as part of the Thread C Locking Script represents the state of the state machine represented by the bytecode sequence at the execution point referred to by the next execution pointer included in the Thread C Locking Script. The transaction output Vout[x] of the spending blockchain transaction TX6' 212' for the new Thread C Locking Script is determined from the execution of the join construct. It is contemplated that there can be different scenarios for new Thread C Locking Script as described below in more detail.

In the "Join with Replicated Thread" scenario, the bytecode sequence and interpreter code for the new Thread C Locking Script can be replicated from the bytecode sequence and interpreter code of the Thread A Locking Script of Vout[x] of the previous blockchain transaction TX3 or from the bytecode sequence and interpreter code of the Thread B Locking Script of Vout[y] of the previous blockchain transaction TX4.

In the "Join with Replicated Thread" scenario, the serialized state data that is included in the Thread C Locking Script of the spending blockchain transaction TX6' 212' can be determined when creating the spending blockchain transaction TX6' 212' by executing the Thread A Locking Script and Thread B Locking Script to some statically defined, or dynamically deduced specific positions and then combining or merging the resultant execution states to derive an initial execution state for the bytecode sequence of the Thread C Locking Script, and then executing the bytecode sequence of the Thread C Locking Script. Such execution terminates at the point (or operation) corresponding to the next execution pointer of the Thread C Locking Script. Such execution can also use input determined by execution of the unlocking script ("scriptSig") of Vin[x] and/or the execution of the unlocking script ("scriptSig") of Vin[y] of the spending blockchain transaction TX6' 212'.

In the "Join with Replicated Thread" scenario, the number of bytecode operations of the Thread C Locking Script of the spending blockchain transaction TX6' 212' that will be executed when creating and validating of the spending blockchain transaction TX6' 212' can be dictated by the difference between the current execution pointer of the Thread A Locking Script as included in the previous blockchain transaction TX3 (or the current execution pointer of the Thread B Locking Script as included in the previous blockchain transaction TX4) and the next execution pointer of the Thread C Locking Script of the spending blockchain transaction TX6' 212'. This difference in execution pointers can be varied by design by selecting or varying the next execution pointer of the Thread C Locking Script of the spending blockchain transaction TX6' 212'. In this manner, the number of bytecode operations of the Thread C Locking Script of the spending blockchain transaction TX6' 212' that will be executed when creating and validating the spending blockchain transaction TX6' 212' can be either constrained or be used in parameterizing a constraint on the spending transaction. This parameterized constraint can be used to limit the number of bytecode operations executed between transactions (for example, to avoid inefficient operation of the bytecode sequence of the smart contract), to logically partition the bytecode sequence of the smart contract into distinct segments that are executed over a sequence of spending transactions, to calculate a reward for the entity creating the new transaction based on the parameterized constraint, or for other possible uses.

In the "Join with Replicated Thread" scenario, the creation and/or validation of the blockchain transaction TX6' 212' can involve processing the transaction output Vout[x] of the blockchain transaction TX6' 212' to check that the bytecode sequence and interpreter code (or a hash of a combination of such data) of the Thread C Locking Script of the transaction output matches the bytecode sequence and interpreter code (or a hash of a combination of such data) of the Thread A Locking Script of the transaction output Vout[x] of the previous blockchain transaction TX3 and/or matches the bytecode sequence and interpreter code (or a hash of a combination of such data) of the Thread B Locking Script of the single transaction output Vout[x] of the previous blockchain transaction TX4. If this check fails, a failure condition can be raised and the blockchain transaction can be deemed invalid. If this check passes, the join construct can continue where the execution states of the locking scripts of the transaction inputs of the blockchain transaction can be checked to ensure that they correspond to specified execution states and then such execution states can be combined or merged together. If this further check fails, a failure condition can be raised and the spending blockchain transaction TX6' 212' can be deemed invalid. If this further check passes and any additional checks are satisfied, the spending blockchain transaction TX6' 212' can be deemed valid.

Note that in other embodiments, a spending blockchain transaction that involves a join construct can include more than two transaction inputs representing more than two parent execution threads that are merged together to form the child execution thread of the locking script of the spending blockchain transaction. In the "Join with Replicated Thread" scenario, the locking script of the spending blockchain transaction that joins the multiple execution threads of the locking scripts of the previous blockchain transaction(s) can include a number of elements including:

A child thread bytecode sequence to be executed;
Interpreter code to interpret and execute the child thread bytecode sequence;
Next Execution Pointer representing a position of execution in the child thread bytecode sequence; and
A copy or snapshot of virtual memory that represents the execution state of the child thread bytecode sequence at the Next Execution Pointer.

In other embodiments, the locking script of the spending blockchain transaction that joins the multiple execution threads of the locking scripts of the previous blockchain transaction(s) can include additional or other data elements. Furthermore, the unlocking scripts ("scriptSig") of the transaction inputs of the spending blockchain transaction (which point to the multiple execution threads of the locking scripts of the previous blockchain transactions to be joined by the join construct) each contain the following: i) a copy of part of the spending blockchain transaction itself, and ii) a copy of the previous blockchain transaction pointed to the respective transaction input. Note that when validating the spending blockchain transaction, the unlocking script is placed first in virtual memory (stack) and thus accessible for use later by the specific interpreter virtual bytecodes of the corresponding locking script. By including these two items as part of the unlocking scripts ("scriptSig") of the transaction inputs of the spending blockchain transaction, validation of the spending blockchain transaction and the join construct can take place.

Table D below provides pseudocode describing a virtual bytecode (VOP_JOIN_DUP) for joining the execution threads of the locking scripts of multiple previous blockchain transactions under control of a join construct that follows the "Join with Replicated Thread" scenario. The virtual bytecode VOP_JOIN_DUP can be included the bytecode sequence of a locking script and interpreted using the interpreter code included in the locking script to carry out the operations of Table D. The virtual bytecode VOP_JOIN_DUP can be interpreted when creating and/or validating a spending blockchain transaction as described herein. The operations extract the locking script of the of the spending blockchain transaction as stored in the unlocking script of a transaction input. The operations loop through the set of transaction inputs of the spending blockchain transaction. For each transaction input, the operations extract the locking script of the previous blockchain transaction as stored in the unlocking script of the corresponding transaction input and pointed to be the transaction input, and checks that the bytecode sequence and interpreter code (or a hash value of a combination of such data) of the locking script of the spending blockchain transaction matches that contained in the locking script of the previous blockchain transaction as stored in the unlocking script of the corresponding transaction input. If this check fails for any one of the transaction inputs, a failure condition can be raised and the blockchain transaction can be deemed invalid. If this check passes, the operations of the join construct can continue wherein the Next Execution Pointer for the locking script of the spending blockchain transaction is checked against some statically defined, or dynamically deduced specific position. If the Next Execution Pointer is correct, the execution states for the locking scripts of the previous blockchain transactions are extracted and the virtual memory instances are merged together to form a single virtual memory state for the resultant thread of execution. If the Next Execution Pointer is incorrect, a failure condition can be raised and the spending blockchain transaction can be deemed invalid. If the validation of the VOP_JOIN_DUP virtual bytecode succeeds, the execution of one or more bytecodes of the child thread locking script of the spending blockchain transaction can continue and checked to ensure that is matches the snapshot of virtual memory that represents the execution state of the child thread bytecode sequence at the Next Execution Pointer for validation of the spending blockchain transaction.

TABLE D

| // VOP_JOIN_DUP |
| --- |
| 1. Extract the Locking Script of the Spending Tx as stored in the Unlocking Script of an Input of the Spending Tx |
| 2. Loop through the set of Inputs in the Spending Tx |
|     a. Extract the Locking Script of the Previous Tx as stored in the Unlocking Script of the corresponding Input of the Spending Tx |
|     b. Check that the bytecode sequence and interpreter code (or a hash value of a combination of such data) of the Locking Script of the Spending Tx matches the bytecode sequence and interpreter code (or a hash of a combination of such data) for the Locking Script of the Previous Tx |
|        i. If false, VOP fails and script fails |
|    // Check the positions of execution. This can be either be derived by an additional following parameter, or a specific fixed position. |
| 3. Extract Next Execution Pointer for the Locking Script of the Spending Tx |
| 4. Check Next Execution Pointer == A Specific Position |
|     c. If false, VOP fails and script fails |
| 5. Extract virtual memory for each parent thread locking script |
|    // Merge the virtual memory for the parent thread locking scripts to a single virtual memory state |
| 6. Merge virtual memory instances |
| 7. Continue execution. |

In a "Join supporting Distinct Thread" scenario, the bytecode sequence and/or interpreter code for the new Thread C Locking Script can be the same or different (or distinct) from the bytecode sequence and/or interpreter code of the Thread A Locking Script of the previous blockchain transaction T3 and the bytecode sequence of the Thread B Locking Script of the previous blockchain transaction T4. In this scenario, the bytecode sequence and interpreter code for the new Thread C Locking Script can be copied from a collection of valid bytecode sequences and interpreter code used in the locking scripts.

In the "Join supporting Distinct Thread" scenario, the serialized state data that is included in the Thread C Locking Script of the spending blockchain transaction TX6' 212' can be determined when creating the spending blockchain transaction TX6' 212' by executing the Thread A Locking Script and Thread B Locking Script to some statically defined, or dynamically deduced specific positions and then combining or merging the resultant execution states to derive an initial execution state for the bytecode sequence of the Thread C Locking Script, and then executing the bytecode sequence of the Thread C Locking Script. Such execution terminates at the point (or operation) corresponding to the next execution pointer of the Thread C Locking Script. Such execution can also use input determined by execution of the unlocking script ("scriptSig") of Vin[x] and/or the execution of the unlocking script ("scriptSig") of Vin[y] of the spending blockchain transaction TX6' 212'.

In the "Join supporting Distinct Thread" scenario, the number of bytecode operations of the Thread C Locking Script of the spending blockchain transaction TX6' 212' that will be executed when creating and validating of the spending blockchain transaction TX6' 212' can be dictated by the next execution pointer of the Thread C Locking Script of the spending blockchain transaction TX6' 212'. In this manner, the number of bytecode operations of the Thread C Locking Script of the spending blockchain transaction TX6' 212' that will be executed when creating or validating the spending blockchain transaction TX6' 212' can be either constrained or be used in parameterizing a constraint on the spending transaction. This parameterized constraint can be used to limit the number of bytecode operations executed between transactions (for example, to avoid inefficient operation of the bytecode sequence of the smart contract), to logically partition the bytecode sequence of the smart contract into distinct segments that are executed over a sequence of spending transactions, to calculate a reward for the entity creating the new transaction based on the parameterized constraint, or for other possible uses.

In the "Join supporting Distinct Thread" scenario, a collection of valid hash values corresponding to valid locking scripts can be accessed or maintained. The creation and/or validation of the spending blockchain transaction TX6' 212' can involve processing the transaction output Vout[x] of the spending blockchain transaction TX6' 212' to check that Thread C Locking Script of the transaction output Vout[x] produces a hash value that matches one of the valid hash values of the collection. If this check fails, a failure condition can be raised and the blockchain transaction TX6' 212' can be deemed invalid. If this check passes, the operations of the join construct can continue wherein the Next Execution Pointer for the new thread of execution that is to be joined is checked against some statically defined, or dynamically deduced specific position. If the Next Execution Pointer is correct, the execution states for the threads of execution of the locking scripts of the previous blockchain transactions are extracted and merged together. If the Next Execution Pointer is incorrect, a failure condition can be raised and the blockchain transaction can be deemed invalid.

In all of these scenarios, the join construct can ensure that the Thread A Locking Script and/or the Thread B Locking Script have terminated execution and can involve combining or merging the resulting execution states of the Thread A Locking Script and the Thread B Locking Script. This can be useful where the smart contract needs to process the result data produced by the multiple threads of execution.

Note that in other embodiments, a spending blockchain transaction that involves a join construct can include more than two transaction inputs representing more than two parent execution threads that are merged together to form the child execution thread of the locking script of the spending blockchain transaction. In the "Join with Distinct Thread" scenario, the locking script of the spending blockchain transaction that joins the multiple execution threads of the locking scripts of the previous blockchain transaction(s) can include a number of elements including:

A child thread bytecode sequence to be executed;
Interpreter code to interpret and execute the child thread bytecode sequence;
Next Execution Pointer representing a position of execution in the child thread bytecode sequence; and
A copy or snapshot of virtual memory that represents the execution state of the child thread bytecode sequence at the Next Execution Pointer.

In other embodiments, the locking script of the spending blockchain transaction that joins the multiple execution threads of the locking scripts of the previous blockchain transaction(s) can include additional or other data elements. Furthermore, the unlocking scripts ("scriptSig") of the transaction inputs of the spending blockchain transaction (which point to the multiple execution threads of the locking scripts of the previous blockchain transactions to be joined by the join construct) each contain the following: i) a copy of part of the spending blockchain transaction itself, and ii) a copy of the previous blockchain transaction pointed to the respective transaction input. Note that when validating the spending blockchain transaction, the unlocking script is placed first in virtual memory (stack) and thus accessible for use later by the specific interpreter virtual bytecodes of the corresponding locking script. By including these two items as part of the unlocking scripts ("scriptSig") of the transaction inputs of the spending blockchain transaction, validation of the spending blockchain transaction and the join construct can take place.

Table E below provides pseudocode describing a virtual bytecode (VOP_JOIN_DISTINCT) for joining the execution threads of the locking scripts of multiple previous blockchain transactions under control of a join construct that follows the "Join supporting Distinct Thread" scenario. The virtual bytecode VOP_JOIN_DISTINCT can be included the bytecode sequence of a locking script and interpreted using the interpreter code included in the locking script to carry out the operations of Table E. The virtual bytecode VOP_JOIN_DISTINCT can be interpreted when creating and/or validating a spending blockchain transaction as described herein. The operations loop through the number of parent thread locking scripts (which corresponds to the number of transaction inputs) of the spending blockchain transaction, which can be represented by a parameter that is statically stored (e.g., as part of the interpreter code of the locking script) or dynamically stored (e.g., in the bytecode sequence being interpreted as part of the locking script). The operations read the hash values corresponding to the combination of bytecode sequence and interpreter code of each parent thread locking script. In embodiments, these hash values can be statically stored (e.g., as part of the interpreter code of the locking script) or dynamically stored (e.g., in the bytecode sequence being interpreted as part of the locking script). For example, in conjunction with the VOP_JOIN_DISTINCT virtual bytecode, the bytes of data that follow the virtual bytecode can specify the number of parent thread locking scripts (and thus the number of bytecode sequence/interpreter hash values and corresponding transaction inputs) along with character delimiters used for determining the bounds of the bytecode sequence/interpreter hash values for the number of number of parent thread locking scripts. The operations initialize a collection of hash values corresponding to valid bytecode sequences and interpreter code combinations. This collection of hash values can be represented by data that is statically stored (e.g., as part of the interpreter code of the locking script) or dynamically stored (e.g., in the bytecode sequence being interpreted as part of the locking script). Then, the hash value for the combination of bytecode sequence and interpreter code of the parent thread locking scripts of the previous blockchain transactions is computed and added to the collection. The operations then loop through the set of transaction inputs of the spending blockchain transaction. For each transaction input, the operations extract the locking script of the spending blockchain transaction as stored in the unlocking script of the corresponding transaction input, extract the locking script of the previous blockchain transaction as stored in the unlocking script of the corresponding transaction input of the spending blockchain transaction, and checks that a hash value for a combination of the bytecode sequence and interpreter code of the locking script of the spending blockchain transactions exists in the collection of hash values and that a hash value for a combination the bytecode sequence and interpreter code of the locking script of the previous blockchain transaction (which corresponds to the transaction input) exists in the collection of hash values. If this check fails for any one of the transaction inputs, a failure condition can be raised and the blockchain transaction can be deemed invalid. If this check passes, the operations for the join construct can continue wherein the Next Execution Pointer for the locking script of the spending blockchain transaction is checked against some statically defined, or dynamically deduced specific position. If the Next Execution Pointer is correct, the execution states for the parent thread locking scripts of the previous blockchain transactions are extracted and merged together to form single virtual memory state for the child thread of execution. If the Next Execution Pointer is incorrect, a failure condition can be raised and the spending blockchain transaction can be deemed invalid. If the validation of the VOP_JOIN_DISTINCT virtual bytecode succeeds, the execution of one or more bytecodes of the child thread locking script of the spending blockchain transaction can continue and checked to ensure that is matches the snapshot of virtual memory that represents the execution state of the child thread bytecode sequence at the Next Execution Pointer for validation of the spending blockchain transaction.

TABLE E

// VOP_JOIN_DISTINCT

1. Extract the Locking Script of the Spending Tx as stored in the Unlocking Script of an Input of the Spending Tx
2. Initialize collection of hash values corresponding to valid combinations of bytecode sequences and interpreter code
3. Loop through the set of Inputs of the Spending Tx
    // Check Previous Threads
    a. Extract the Locking Script of the Previous Tx as stored in the Unlocking Script of the corresponding Input of the Spending Tx
    b. Determine hash value for the combination of the bytecode sequence and interpreter code of the Previous Tx Locking Script, and add this hash value to the collection of hash values
4. Determine the hash value of the combination of the bytecode sequence and interpreter code in the Locking Script of the Spending Tx
5. Check that the hash value for the combination the bytecode sequence and interpreter code of the Locking Script of the Previous TABLE E-continued

// VOP_JOIN_DISTINCT

Tx exists in the collection of has values
    i. If false, VOP fails and script fails
    // Check the positions of execution. This can be either be derived by an additional following parameter, or a specific fixed position.
6. Extract Next Execution Pointer for the Locking Script of the Spending Tx
7. Check Next Execution Pointer == A Specific Position
    c. If false, VOP fails and script fails
8. Extract virtual memory for each parent thread locking script
    // Merge the virtual memory for the parent thread locking scripts to a single virtual memory state
9. Merge virtual memory instances
10. Continue execution.

In an example case of the "Join with Replicated Thread" scenario, we can assume that one or more previous blockchain transaction have locking scripts representing the execution of a collection of threads from the same bytecode. Both threads are at a state in which, to continue to the next state, they need to merge. The new spending transaction is created, an example of which is shown in FIG. 7. The new spending transaction includes a single transaction output that includes a locking script, which contains the following:
    the same bytecode sequence as the other two parent threads of execution, which is an encapsulation the whole program being executed on the blockchain;
    Interpreter code that is used to interpret and execute the bytecode sequence.
    Next Execution Pointer representing a position of execution in the bytecode sequence, and
    A copy or snapshot of virtual memory that represents the execution state of the bytecode sequence at the Next Execution Pointer.
This spending blockchain transaction merges the two threads of execution represented by the locking scripts of the previous blockchain transaction(s) and thus includes multiple transaction inputs, one that points to each thread of execution being merged.

Figure 11:
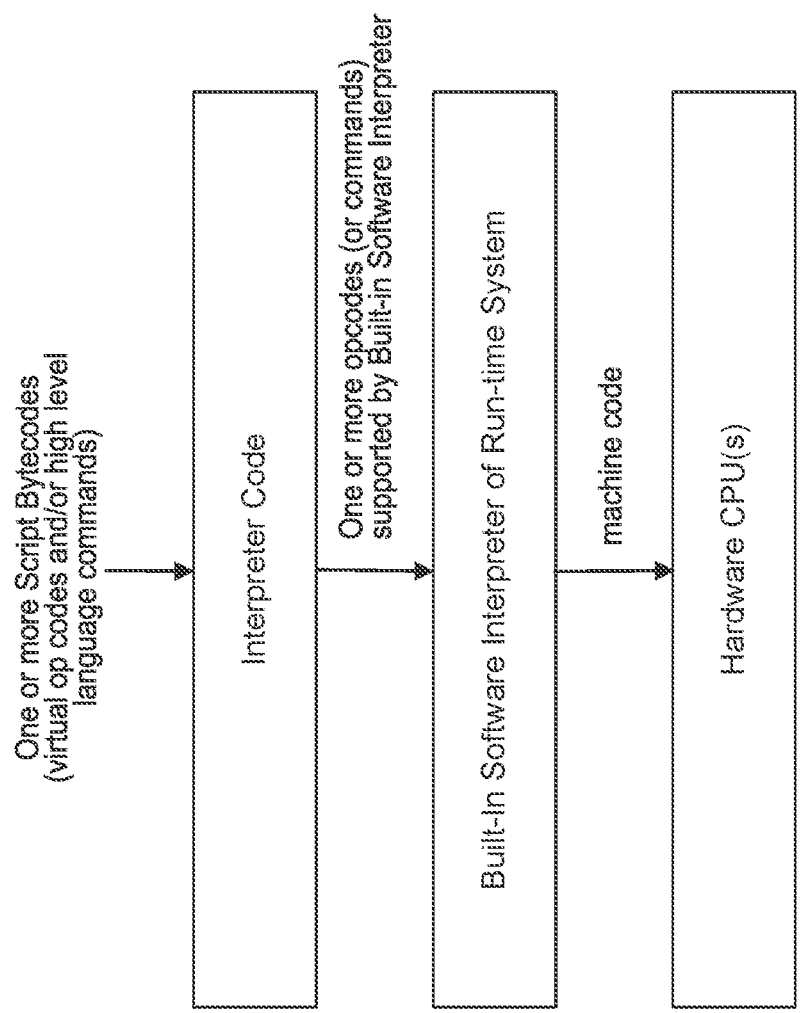
FIG. 11 is a schematic representation that illustrates the execution of the interpreter code of the locking script of a blockchain transaction, which cooperates with the execution of a built-in software interpreter of the run-time system (e.g., blockchain client) of a validation node in order to interpret the bytecode sequence of the locking script in accordance with an embodiment.

In embodiments, the bytecode sequence of the thread-specific locking scripts of the blockchain transactions as described herein are computer instructions that are designed for interpretation by the execution of the interpreter code which is included in the respective blockchain transactions. The execution of the interpreter code translates the bytecodes of the bytecode sequence of the thread-specific locking script into op-codes or commands that are supported by the software interpreter of the run-time system (e.g., blockchain client) of the validation node, which translates such opcodes or commands to machine code that is executed on the CPU hardware of the validation node as shown in FIG. 11. The execution of the interpreter code can support the translation of high-level bytecodes or commands that extend or supplement the low-level bytecode operations that are supported by the software interpreter of the run-time system of the validation node. For example, the interpreter code can support the translation of virtual bytecodes that represent the fork construct (such as variations of VOP_FORK_DUP or VOP_FORK_DISTINCT virtual bytecodes as described above), the barrier construct (such as the VOP_BARRIER virtual bytecode described above) and/or the join construct (such as the variations of VOP_JOIN_DUP or VOP_JOIN_DISTINCT virtual bytecodes described above) into combinations of bytecode operations that are supported by the software interpreter of the run-time system of the validation node. In this case, the interpreter code can support the translation of such virtual bytecode operations into op_codes or commands that belong to the Bitcoin Script language and supported by the software interpreter of the run-time system of the validation node. In another example, the interpreter code can support the translation of script bytecode operations written in a high-level programming language for interpretation by the software interpreter of the run-time system of the validation node. In this case, the interpreter code can support the translation of the script bytecode operations written in a high-level programming language into op_codes or commands that belong to the Bitcoin Script language and supported by the software interpreter of the run-time system of the validation node. The execution of the software interpreter can translate the opcodes' or commands into machine code sequentially one bytecode at a time (e.g., simple interpretation) or possibly employ just-in-time compilation methods where the bytecode sequence segment (or portions thereof) are compiled into machine code as necessary at runtime and then the resulting machine code is executed. The resulting machine code can possibly be cached and reused later without needing to be recompiled.

Note that the locking scripts of the blockchain transactions described herein can often contain state, which is updated during execution. In the context of a smart contract, this state can be broken down in two types, "global shared state" which is used across the thread-specific locking scripts of the smart contract, or "private state" which is used internally by one thread-specific locking script of the smart contract. To support forking and joining threads of execution, appropriate strategies can be used to support both "global shared state" and "private state." These strategies can be either:

Static—the appropriate actions to take with state is dealt with by the interpreter in a single static fashion, which is applied in the same way for each fork or join during the execution of the thread-specific locking scripts of the blockchain transactions of the smart contract.
  Dynamic—the appropriate actions are taken on a case-by-case basis. How state is shared with new threads at forking and used during the joining of threads is explicitly defined in the bytecode sequence being executed by the interpreter.

Thus, an embodiment of the invention may provide a computer-implemented method comprising: creating and/or validating a spending blockchain transaction that includes i) a plurality of locking scripts each representing an instance of an execution thread (which can be execution threads forked from an execution thread represented by a locking script of a previous blockchain transaction and/or execution threads of at least one previous blockchain transaction that are managed and/or controlled for inter-thread communication and control) or ii) a locking script representing an instance of an execution thread joined from a plurality of execution thread instances represented by at least one previous blockchain transaction; and
  communicating the spending blockchain transaction on a blockchain network for storage in a blockchain.

The spending blockchain transaction can be created by a node of the blockchain network; and/or the spending blockchain transaction can point to a locking script of a previous blockchain transaction which represents an execution thread. Additionally or alternatively, the spending blockchain transaction includes a plurality of locking scripts each representing an instance of an execution thread forked from the execution thread represented by the locking script of the previous blockchain transaction. Additionally or alternatively, the node sends the spending blockchain transaction to other nodes of the blockchain network for validation and storage in the blockchain.

The execution thread represented by the locking script of the previous blockchain transaction includes a bytecode sequence, and at least one of the execution thread instances represented by plurality of locking scripts of the spending blockchain transaction is generated by replicating the bytecode sequence of the locking script of the previous blockchain transaction.

Alternatively, the execution thread represented by the locking script of the previous transaction includes a bytecode sequence and interpreter code, and at least one of the execution thread instances represented by plurality of locking scripts of the spending blockchain transaction is generated by replicating the bytecode sequence and the interpreter code of the locking script of the previous blockchain transaction. Alternatively, the node stores or accesses a collection of valid bytecode sequences, and at least one of the execution thread instances represented by plurality of locking scripts of the spending blockchain transaction is generated by replicating a valid bytecode sequence of the collection. In yet another alternative, the node stores or accesses a collection of valid bytecode sequences and valid interpreter code, and at least one of the execution thread instances represented by plurality of locking scripts of the spending blockchain transaction is generated by replicating a valid bytecode sequence and valid interpreter code of the collection.

Additionally or alternatively, the creation of the spending blockchain transaction involves generating execution state information (such as next execution pointers) for the plurality of locking scripts of the spending blockchain transaction that represent the execution thread instances and including the execution state information (such as next execution pointers) into the plurality of locking scripts of the spending blockchain transaction.

The spending blockchain transaction can be received by a node of the blockchain network. Additionally or alternatively, the spending blockchain transaction points to a locking script of a previous blockchain transaction which represents an execution thread. Additionally or alternatively, the spending blockchain transaction includes a plurality of locking scripts each representing an instance of an execution thread forked from the execution thread represented by the locking script of the previous blockchain transaction. Additionally or alternatively, the node validates the spending blockchain transaction by verifying the locking script of the spending blockchain transaction against one or more conditions.

In some embodiments, the verifying involves matching at least one of the plurality of locking scripts of the spending blockchain transaction to the locking script of the previous blockchain transaction. Additionally or alternatively, the verifying involves checking execution state information (such as next execution pointers) of the execution thread instances representing by the plurality of locking scripts of the spending blockchain transaction. Additionally or alternatively, the execution thread represented by the locking script of the previous blockchain transaction includes a bytecode sequence and possibly interpreter code, and the plurality of locking scripts of the spending blockchain transaction are each required to include the same bytecode sequence and possibly the same interpreter code for validation of the spending blockchain transaction to succeed. Additionally or alternatively, the verifying involves matching the bytecode sequence and possibly interpreter code for each one of the plurality of locking scripts of the spending blockchain transaction to the bytecode sequence and possibly interpreter code of the locking script of the previous blockchain transaction, whereby validation of the spending blockchain transaction is determined based on the results of such matching. The execution thread represented by the locking script of the previous blockchain transaction includes a bytecode sequence and possibly interpreter code, and the plurality of locking scripts of the spending blockchain transaction can be i) the same bytecode sequence and possibly the same interpreter code of the locking script of the previous blockchain transaction or ii) a distinct bytecode sequence and possibly interpreter code that belongs to a collection of valid locking scripts for validation of the spending blockchain transaction to succeed.

Additionally or alternatively, the verifying involves generating a hash data value that corresponds the locking script of the previous blockchain transaction, adding the hash data value to a collection of hash data values that correspond to the collection of valid locking scripts, and comparing a hash data value is generated for each locking script of the spending transaction to the collection of hash data values, whereby validation of the spending blockchain transaction is determined based on the results of such hash data value comparisons.

The spending blockchain transaction can be created by a node of the blockchain network; and/or the spending blockchain transaction points to a plurality of locking scripts of one or more previous blockchain transactions, wherein the plurality of locking scripts each represent an instance of an execution thread; and/or the spending blockchain transaction includes a locking script representing an execution thread joined from the execution thread instances pointed to by the spending blockchain transaction; and/or the spending blockchain transaction is sent by the node to other nodes of the blockchain network for validation and storage in a blockchain.

The locking script representing the execution thread joined from the execution thread instances pointed to by the spending blockchain transaction can be generated by replicating a bytecode sequence of the plurality of locking scripts of the one or more previous blockchain transactions; or the locking script representing the execution thread joined from the execution thread instances pointed to by the spending blockchain transaction is generated by replicating a bytecode sequence and interpreter code of the plurality of locking scripts of the one or more previous blockchain transactions; or the node stores or accesses a collection of valid bytecode sequences, and the locking script representing the execution thread joined from the execution thread instances pointed to by the spending blockchain transaction is generated by replicating a valid bytecode sequence of the collection; or the node stores or accesses a collection of valid bytecode sequences and valid interpreter code, and the locking script representing the execution thread joined from the execution thread instances pointed to by the spending blockchain transaction is generated by replicating a valid bytecode sequence and valid interpreter code of the collection.

Additionally or alternatively, the creation of the spending blockchain transaction involves generating execution state information (such as a next execution pointer) for the execution thread joined from the execution thread instances pointed to by the spending blockchain transaction and including the execution state information (such as the next execution pointer) into the locking script of the spending blockchain transaction.

The spending blockchain transaction can be received by a node of the blockchain network; and/or the spending blockchain transaction points to a plurality of locking scripts of one or more previous blockchain transactions, wherein the plurality of locking scripts each represent an instance of an execution thread; and/or the spending blockchain transaction includes a locking script representing an execution thread joined from the execution thread instances pointed to by the spending blockchain transaction; and/or the node validates the spending blockchain transaction by verifying the locking script of the spending blockchain transaction against one or more conditions.

In one or more embodiments, the verifying involves matching the locking script of the spending blockchain transaction to the plurality of locking scripts of the one or more previous blockchain transactions; and/or the verifying involves checking execution state information (such as the next execution pointers) for the plurality of locking scripts of the one or more previous blockchain transactions and then merging or combining such execution state information; and/or the plurality of locking scripts of the at least one previous blockchain transaction include a common bytecode sequence and possibly interpreter code, and the locking script of the spending blockchain transaction is required to include the common bytecode sequence and possibly the same interpreter code for validation of the spending blockchain transaction to succeed; and/or the verifying involves matching the bytecode sequence and possibly interpreter code for the locking script of the spending blockchain transaction to the bytecode sequence and possibly interpreter code of each one of the plurality of locking scripts of the previous blockchain transaction, whereby validation of the spending blockchain is determined based on the results of such matching; and/or the locking script of the spending blockchain transaction can be the same bytecode sequence and possibly the same interpreter code of the plurality of locking scripts of the one or more previous blockchain transactions, or can be a distinct bytecode sequence and possibly interpreter code that corresponds to a collection of valid locking scripts; and/or the verifying can involve generating a hash data value that corresponds the locking script of the previous blockchain transaction, adding the hash data value to a collection of hash data values that correspond to the collection of valid locking scripts, generating a hash data value is generated for each locking script of the spending transaction and comparing it to the collection of hash data values, whereby validation of the spending blockchain is determined based on the results of such hash data value comparisons.

The spending blockchain transaction can be created by a node of the blockchain network; and/or the spending blockchain transaction points to a plurality of locking scripts of one or more previous blockchain transactions each representing an instance of an execution thread; and/or the spending blockchain transaction includes a corresponding plurality of locking scripts whose execution involves inter-thread communication or control between the execution thread instances pointed to by the spending blockchain transaction; and/or the spending blockchain transaction is sent to other nodes of the blockchain network for validation and storage in a blockchain.

The plurality of locking scripts of the spending blockchain transaction can be generated by replicating bytecode sequences of the plurality of locking scripts of the one or more previous blockchain transactions; or the plurality of locking scripts of the spending blockchain transaction is generated by replicating a bytecode sequences and interpreter code of the plurality of locking scripts of the one or more previous blockchain transactions; and/or the creation of the spending blockchain transaction involves generating execution state information (such as next execution pointers) for the execution thread instances of the locking scripts of the spending blockchain transaction and including the execution state information (such as next execution pointers) into the plurality of locking scripts of the spending blockchain transaction.

Additionally or alternatively, the invention can comprise a computer-implemented method, comprising:

the spending blockchain transaction is received by a node of the blockchain network; and/or the spending blockchain transaction points to a plurality of locking scripts of one or more previous blockchain transactions each representing an instance of an execution thread; and/or the spending blockchain transaction includes a corresponding plurality of locking scripts whose execution involves inter-thread communication or control between the execution thread instances pointed to by the spending blockchain transaction; and the node validates the spending blockchain transaction by verifying the plurality of locking scripts of the spending blockchain transaction against one or more conditions.

The verifying may involve matching the plurality of locking scripts of the spending blockchain transaction to the plurality of locking scripts of the one or more previous blockchain transactions; and/or the verifying involves checking execution state information (such as the next execution pointers) for the plurality of locking scripts of the one or more previous blockchain transactions in order to provide the inter-thread communication or control between the execution thread instances pointed to by the spending blockchain transaction; and/or the plurality of locking scripts of the at least one previous blockchain transaction include a bytecode sequence and possibly interpreter code, and the plurality of locking scripts of the spending blockchain transaction are required to include the bytecode sequence and the interpreter code of the plurality of locking scripts of the one or more previous blockchain transactions for validation of the spending blockchain transaction to succeed; and/or the verifying involves matching the bytecode sequence and possibly interpreter code for each locking script of the spending blockchain transaction to the bytecode sequence and possibly interpreter code of the corresponding locking script of the one or more previous blockchain transactions, whereby validation of the spending blockchain is determined based on the results of such matching.

We turn now to FIG. 12. FIG. 12 is an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 12, the computing device 2600 may include one or more processors 2602 that may be configured to communicate with, and are operatively coupled to, a number of peripheral subsystems via a bus subsystem 2604. The processors 2602 may be utilized for the processing of the unlocking and locking scripts as part of validating a spending transaction as described herein. These peripheral subsystems may include a storage subsystem 2606, comprising a memory subsystem 2608 and a file/disk storage subsystem 2610, one or more user interface input devices 2612, one or more user interface output devices 2614, and a network interface subsystem 2616. Such storage subsystem 2606 may be used for temporary or long-term storage of information, such as details associated with transactions described in the present disclosure.

The bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses. The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a wireless network such that the data technician may be able to transmit and receive data while in a remote location, such as a user data centre. The bus subsystem 2604 may be utilized for communicating data such as details, search terms, and so on to the supervised model of the present disclosure, and may be utilized for communicating the output of the supervised model to the one or more processors 2602 and to merchants and/or creditors via the network interface subsystem 2616.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600. The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. The storage subsystem 2606 may comprise a memory subsystem 2608 and a file/disk storage subsystem 2610.

The memory subsystem 2608 may include a number of memories, including a main random-access memory (RAM) 2618 for storage of instructions and data during program execution and a read only memory (ROM) 2620 in which fixed instructions may be stored. The file/disk storage subsystem 2610 may provide a non-transitory persistent (non-volatile) storage for program and data files and may include a hard disk drive, a floppy disk drive along with associated removable media, a Compact Disk Read Only Memory (CD-ROM) drive, an optical drive, removable media cartridges, and other like storage media.

The computing device 2600 may include at least one local clock 2624. The local clock 2624 may be a counter that represents the number of ticks that have transpired from a particular starting date and may be located integrally within the computing device 2600. The local clock 2624 may be used to synchronize data transfers in the processors for the computing device 2600 and all of the subsystems included therein at specific clock pulses and may be used to coordinate synchronous operations between the computing device 2600 and other systems in a data centre. In one embodiment, the local clock 2624 is an atomic clock. In another embodiment, the local clock is a programmable interval timer.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 12 is intended only as a specific example for purposes of illustrating the preferred embodiment of the device. Many other configurations having more or fewer components than the system depicted in FIG. 12 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including," and "containing" are to be construed as open-ended terms (i.e., meaning "including, but not limited to") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B or C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B or C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises,"" "having," and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. Unless otherwise stated or clear from context, the term "and/or" in a list of items indicates the presence of at least one item in the list without excluding or requiring any items of the list to be present. Embodiments of this disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
    storing a previous blockchain transaction in a blockchain maintained by a blockchain network, the previous blockchain transaction including a locking script representing an instance of a parent execution thread;
    creating a first blockchain transaction that includes a plurality of locking scripts each representing an instance of a child execution thread which is forked from the parent execution thread in response to a corresponding first construct or operation included in the locking script of the previous blockchain transaction;
    validating the first blockchain transaction by matching at least one of the plurality of locking scripts of the first blockchain transaction to the locking script of the previous blockchain transaction; and
    communicating the first blockchain transaction on the blockchain network for storage in the blockchain, wherein the first blockchain transaction points to the locking script of the previous blockchain transaction which represents the parent execution thread.

2. The computer-implemented method of claim 1, wherein
    the locking script of the previous blockchain transaction includes a bytecode sequence and optionally interpreter code, and at least one of the plurality of locking scripts of the first blockchain transaction includes a copy of the bytecode sequence and optionally a copy of the interpreter code of the locking script of the previous blockchain transaction, or
    the locking script of the previous blockchain transaction includes a bytecode sequence and optionally interpreter code, and the plurality of locking scripts of the first blockchain transaction include i) a copy of the bytecode sequence and optionally a copy of the interpreter code of the locking script of the previous blockchain transaction or ii) a distinct bytecode sequence and optionally interpreter code that belongs to a collection of valid locking scripts.

3. The computer-implemented method of claim 2, further comprising:
    validating the first blockchain transaction by matching the bytecode sequence and optionally interpreter code for each one of the plurality of locking scripts of the first blockchain transaction to the bytecode sequence and optionally interpreter code of the locking script of the previous blockchain transaction, whereby validation of the first blockchain transaction is determined based on results of such matching; and/or
    validating the first blockchain transaction by generating a hash data value that corresponds the locking script of the previous blockchain transaction, adding the hash data value to a collection of hash data values that correspond to the collection of valid locking scripts, and comparing a hash data value generated for each locking script of the first blockchain transaction to the collection of hash data values, whereby validation of the first blockchain transaction is determined based on results of such hash data value comparisons; and/or
    validating the first blockchain transaction by checking execution state information of child execution thread instances represented by the plurality of locking scripts of the first blockchain transaction.

4. The computer-implemented method of claim 2, further comprising:
    validating a second blockchain transaction by matching a locking script of at least one other previous blockchain transaction to the locking script of the second blockchain transaction; and/or
    validating the second blockchain transaction by matching the bytecode sequence and optionally interpreter code of a locking script of the at least one other previous blockchain transaction to the bytecode sequence and optionally interpreter code of the locking script of the second blockchain transaction, whereby validation of the second blockchain transaction is determined based on the results of such matching; and/or
    validating the second blockchain transaction by generating a hash data value that corresponds a locking script of the at least one other previous blockchain transaction, adding the hash data value to a collection of hash data values that correspond to the collection of valid locking scripts, and comparing a hash data value generated for the locking script of the second blockchain transaction to the collection of hash data values, whereby validation of the second blockchain transaction is determined based on results of such hash data value comparisons; and/or
    validating the second blockchain transaction by checking execution state information of the child execution thread represented by the locking script of the second blockchain transaction.

5. The computer-implemented method of claim 2, further comprising:
    validating a third blockchain transaction by matching a locking script of at least one other previous blockchain transaction to a locking script of the third blockchain transaction; and/or
    validating the third blockchain transaction by matching the bytecode sequence and optionally interpreter code of a locking script of at least one other previous blockchain transaction to the bytecode sequence and optionally interpreter code of a locking script of the third blockchain transaction, whereby validation of the third blockchain transaction is determined based on the results of such matching; and/or
    validating the third blockchain transaction by generating a hash data value that corresponds a locking script of the at least one other previous blockchain transaction, adding the hash data value to a collection of hash data values that correspond to the collection of valid locking scripts, and comparing a hash data value generated for a locking script of the third blockchain transaction to the collection of hash data values, whereby validation of the third blockchain transaction is determined based on results of such hash data value comparisons; and/or validating the third blockchain transaction by checking execution state information of the execution threads, wherein the execution threads are managed and controlled by the third blockchain transaction.

6. The computer-implemented method of claim 1, wherein:

the plurality of locking scripts of the first blockchain transaction each include execution state information for a respective child execution thread.

7. The computer-implemented method of claim 1, further comprising:

creating and/or validating a second blockchain transaction that includes a locking script representing an instance of a child execution thread joined from a plurality of parent execution thread instances represented by locking scripts of at least one other previous blockchain transaction stored in the blockchain in response to a corresponding second construct or operation included in at least one locking script of the at least one other previous blockchain transaction; and communicating the second blockchain transaction on the blockchain network for storage in the blockchain.

8. The computer-implemented method of claim 7, wherein:

the second blockchain transaction points to a plurality of locking scripts of the at least one other previous blockchain transaction, wherein the plurality of locking scripts represent the plurality of parent execution thread instances joined by the second block transaction.

9. The computer-implemented method of claim 8, wherein:

the plurality of locking scripts of the at least one other previous blockchain transaction each include a bytecode sequence and optionally interpreter code, and the locking script of the second blockchain transaction includes a copy of the bytecode sequence and optionally the interpreter code of one of the locking scripts of the one or more previous blockchain transaction, or the plurality of locking scripts of the at least one other previous blockchain transactions each include a bytecode sequence and optionally interpreter code, and the locking script of the second blockchain transaction includes i) a copy of the bytecode sequence and optionally the interpreter code of one of the locking scripts of the one or more previous blockchain transaction, or ii) a distinct bytecode sequence and optionally interpreter code that belongs to a collection of valid locking scripts.

10. The computer-implemented method of claim 7, wherein:

the locking script of the second blockchain transaction includes execution state information for the child execution thread joined from the plurality of parent execution thread instances.

11. A computer-implemented method according to claim 7, wherein the first blockchain transaction and/or the second blockchain transaction and/or a third blockchain transaction is part of a smart contract.

12. The computer-implemented method of claim 1, further comprising:

creating and/or validating a third blockchain transaction that includes a plurality of locking scripts representing execution threads of at least one other previous blockchain transaction stored in the blockchain for inter-thread communication and control in response to a corresponding third construct or operation included in at least one locking script of the least one other previous blockchain transaction; and communicating the third blockchain transaction on the blockchain network for storage in the blockchain.

13. The computer-implemented method of claim 12, wherein:

the third blockchain transaction points to a plurality of locking scripts of the at least one other previous blockchain transaction, wherein the plurality of locking scripts represent the plurality of execution threads that are managed or controlled by the third blockchain transaction.

14. The computer-implemented method of claim 13, wherein:

the plurality of locking scripts of the at least one other previous blockchain transaction each include a bytecode sequence and optionally interpreter code, and the plurality of locking scripts of the third blockchain transaction includes a copy of the bytecode sequence and optionally the interpreter code of one of the locking scripts of the at least one other previous blockchain transaction, or the plurality of locking scripts of the at least one other previous blockchain transaction each include a bytecode sequence and optionally interpreter code, and the locking scripts of the third blockchain transaction includes i) a copy of the bytecode sequence and optionally the interpreter code of one of the locking scripts of the at least one other previous blockchain transaction, or ii) a distinct bytecode sequence and optionally interpreter code that belongs to a collection of valid locking scripts.

15. The computer-implemented method of claim 12, wherein:

the locking scripts of the third blockchain transaction include execution state information for the execution threads managed and controlled by the third blockchain transaction.

16. A system, comprising:

a processor; and memory including executable instructions that, as a result of execution by the processor, causes the system to perform the computer-implemented method of claim 1.

17. A non-transitory computer-readable storage medium having stored thereon executable instructions that, as a result of being executed by a processor of a computer system, cause the computer system to perform the computer-implemented method of claim 1.

* * * * *